US007321594B2

(12) United States Patent
Murakami et al.

(10) Patent No.: US 7,321,594 B2
(45) Date of Patent: Jan. 22, 2008

(54) ROUTER APPARATUS PROVIDED WITH OUTPUT PORT CIRCUIT INCLUDING STORAGE UNIT, AND METHOD OF CONTROLLING OUTPUT PORT CIRCUIT OF ROUTER APPARATUS

(75) Inventors: Koso Murakami, Osaka (JP); Hideki Tode, Osaka (JP); Kazuhiko Kinoshita, Osaka (JP); Katsuya Minami, Tokyo (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 932 days.

(21) Appl. No.: 10/736,984

(22) Filed: Dec. 17, 2003

(65) Prior Publication Data
US 2004/0179542 A1 Sep. 16, 2004

(30) Foreign Application Priority Data
Dec. 17, 2002 (JP) ............................ P2002-365494

(51) Int. Cl.
*H04L 12/28* (2006.01)
*H04L 12/56* (2006.01)
(52) U.S. Cl. ................. 370/412; 370/395.41; 370/468; 370/230
(58) Field of Classification Search ...................... None
See application file for complete search history.

(56) References Cited

U.S. PATENT DOCUMENTS

2001/0033581 A1* 10/2001 Kawarai et al. ............ 370/468
2003/0064742 A1* 4/2003 Mandyam et al. .......... 455/522
2003/0210665 A1* 11/2003 Salmenkaita et al. ....... 370/330

OTHER PUBLICATIONS

Minami et al; "Per-Flow Buffer Management Scheme With Class-Based Priority in the Internet Router"; The Technical Report of the Institute of Electronics, Information and Communication Engineers in Japan (IEICE), SSE99-175, IN99-138, issued by IEICE, pp. 85-90, Mar. 2000.
Minami et al; "Buffer Control Scheme Considering Service Class of Flows"; Transactions on Communications of the Institute of Electronics, Information and Communication Engineers in Japan (IEICE), issued by IEICE, vol. E85-b, No. 1, pp. 98-106, Jan. 2002.

* cited by examiner

*Primary Examiner*—Chirag G. Shah
(74) *Attorney, Agent, or Firm*—Nixon & Vanderhye, P.C.

(57) ABSTRACT

An output port circuit is provided for a router apparatus which routes and transmits a received packet. Each flow is constituted by continuous packets and belongs to a bandwidth-guaranteed class or a best-effort class. A controller controls storage and reading of a packet into and from a storage unit. Upon allocating a basic volume that is a criterion of a memory size stored in the storage unit to each flow to which the packet to be transmitted belongs, the controller manages the basic volume of each flow of the packet belonging to the bandwidth-guaranteed class by individually allocating the basic volume by the memory size required by each flow, and manages the basic volume of each flow of the packets belonging to the best-effort class by collectively allocating the memory size obtained by subtracting a sum of respective basic volumes allocated to the bandwidth-guaranteed class from an entire memory size.

21 Claims, 43 Drawing Sheets

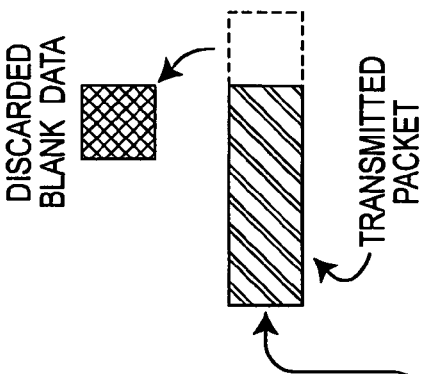
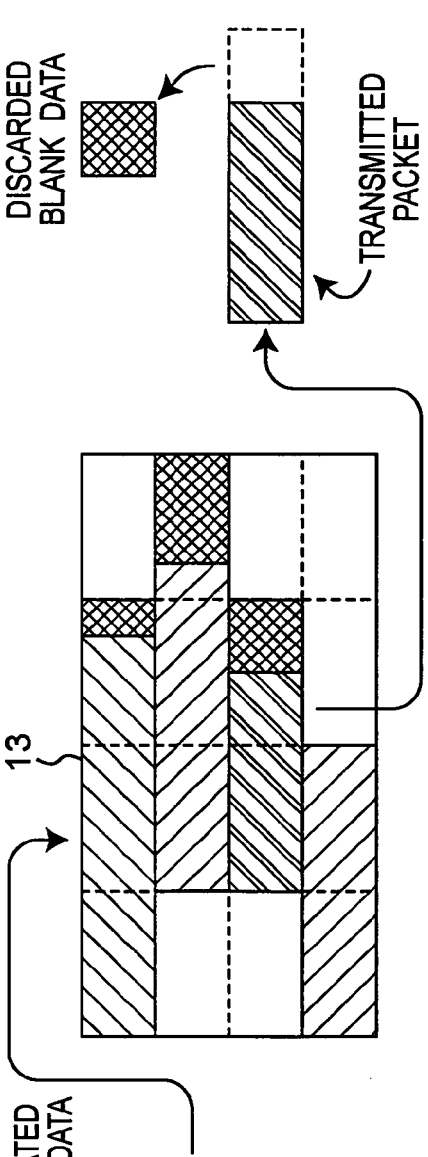
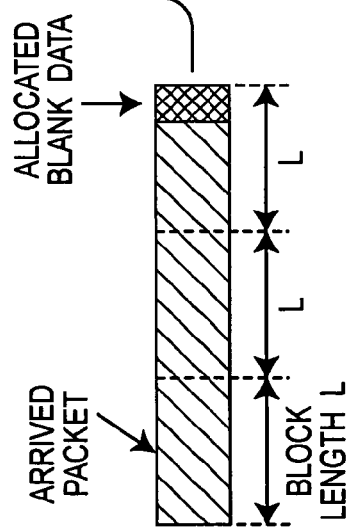

FREE-SPACE MANAGEMENT TABLE T1

| BLOCK NUMBER | NEXT BLOCK NUMBER |
|---|---|
| 1 | -1 |
| 2 | 3 |
| 3 | 5 |
| 4 | -1 |

STORAGE LOCATION MANAGEMENT TABLE T2

| BLOCK NUMBER | NEXT BLOCK NUMBER |
|---|---|
| 1 | 3 |
| 2 | 5 |
| 3 | 8 |
| 4 | -1 |
| ⋮ | ⋮ |
| 8 | -1 |

FLOW MANAGEMENT TABLE T3 FOR FLOWS
BELONGING TO BANDWIDTH-GUARANTEED CLASS

| FLOW ID | BASIC VOLUME | USED VOLUME | HEAD BLOCK NUMBER | TAIL BLOCK NUMBER | PRIORITY |
|---|---|---|---|---|---|
| 1 | 16 | 20 | 3 | 38 | 2 |
| 2 | 8 | 4 | 19 | 8 | 4 |
| 3 | 16 | 10 | 11 | 24 | 1 |

HEAD BLOCK AND TAIL BLOCK ARE MANAGED
USING FLOW MANAGEMENT TABLE T3

THEY ARE MANAGED USING STORAGE LOCATION
MANAGEMENT TABLE T2

Fig.10

CLASS MANAGEMENT TABLE T4

| FLOW ID | BASIC VOLUME | USED VOLUME | NUMBER OF FLOWS | PRIORITY |
|---|---|---|---|---|
| 0 | 32 | 28 | 4 | 10 |
| 1 | 16 | 20 | 6 | 12 |
| 2 | 10 | 25 | 10 | 10 |

Fig.11

PORT MANAGEMENT TABLE T5

| FLOW ID | BASIC VOLUME | USED VOLUME | NUMBER OF CLASSES | PRIORITY |
|---|---|---|---|---|
| 0 | 40 | 31 | 2 | 4 |
| 1 | 30 | 20 | 3 | 3 |
| 2 | 20 | 25 | 1 | 2 |

WRR FLOW ORDER MANAGEMENT TABLE T6

| FLOW ID | NEXT SERVICE FLOW ID |
|---------|----------------------|
| 1 | 3 |
| 2 | 5 |
| 3 | 4 |
| 4 | 1 |

PREVIOUS SERVICE FLOW MANAGEMENT TABLE T7

| CLASS ID | PREVIOUS SERVICE FLOW ID | NUMBER OF SERVICES HAVING REMAINING FLOWS |
|----------|--------------------------|-------------------------------------------|
| 0 | 3 | 2 |
| 1 | 5 | 3 |
| 2 | 8 | 6 |

WHEN NEW FLOW (FLOW 7) OCCURS

DATA UPDATE PROCESSING FOR INSERTING
NEW FLOW INTO FLOW NEXT TO PREVIOUS SERVICE
FLOW AND CHANGING PREVIOUS SERVICE FLOW ID TO 7

Fig. 19A

ONE EXAMPLE OF MOST EXCESSIVE FLOW MANAGEMENT

INITIAL STATE (a1) MOST EXCESSIVE FLOW MANAGEMENT TABLE T8

| FLOW ID | EXCESSIVELY USED VOLUME |
|---|---|
| 1 | 12 |

(a2) PRESENT STATE (CALCULATED VALUE)

| FLOW ID | EXCESSIVELY USED VOLUME |
|---|---|
| 1 | 12 |
| 2 | 0 |
| 3 | 11 |

Fig. 19B

WHEN FLOW 3 HAVING PACKET SIZE OF 2 ARRIVES (b1) MOST EXCESSIVE FLOW MANAGEMENT TABLE T8

| FLOW ID | EXCESSIVELY USED VOLUME |
|---|---|
| 3 | 13 |

(b2) PRESENT STATE (CALCULATED VALUE)

| FLOW ID | EXCESSIVELY USED VOLUME |
|---|---|
| 1 | 12 |
| 2 | 0 |
| 3 | 13 |

Fig. 19C

WHEN FLOW 3 HAVING PACKET SIZE OF 2 ARRIVES (c1) MOST EXCESSIVE FLOW MANAGEMENT TABLE T8

| FLOW ID | EXCESSIVELY USED VOLUME |
|---|---|
| 3 | 11 |

(c2) PRESENT STATE (CALCULATED VALUE)

| FLOW ID | EXCESSIVELY USED VOLUME |
|---|---|
| 1 | 12 |
| 2 | 0 |
| 3 | 11 |

Fig. 19D

WHEN FLOW 1 HAVING PACKET SIZE OF 2 ARRIVES (d1) MOST EXCESSIVE FLOW MANAGEMENT TABLE T8

| FLOW ID | EXCESSIVELY USED VOLUME |
|---|---|
| 1 | 14 |

(d2) PRESENT STATE (CALCULATED VALUE)

| FLOW ID | EXCESSIVELY USED VOLUME |
|---|---|
| 1 | 14 |
| 2 | 0 |
| 3 | 11 |

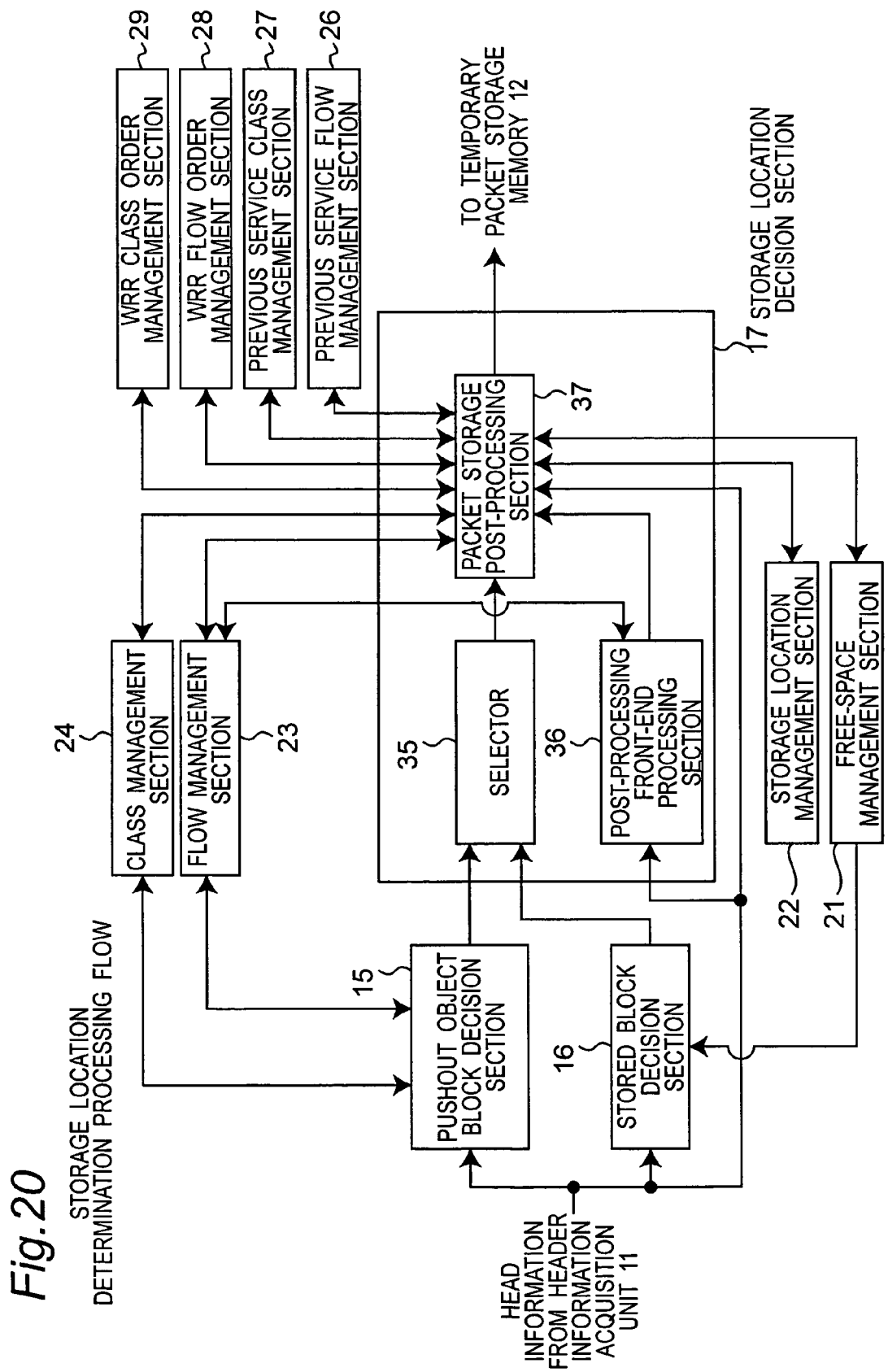

| BLOCK NUMBER | NEXT BLOCK NUMBER |
|---|---|
| 0 | −1 |
| 1 | 2 |
| 2 | 3 |
| ⋮ | ⋮ |
| $2^F-2$ | 427 |

~21c

| LIST HEAD BLOCK NUMBER | ~21d |
|---|---|
| 1 | |

| LIST TAIL BLOCK NUMBER | ~21e |
|---|---|
| 53 | |

| NUMBER OF FREE BLOCKS | ~21f |
|---|---|
| 148 | |

| BLOCK NUMBER | NEXT BLOCK NUMBER |
|---|---|
| 0 | 1 |
| 1 | 6 |
| 2 | 13 |
| ⋮ | ⋮ |
| $2^F$-2 | −1 |

| FLOW ID | BASIC VOLUME |
|---|---|
| 0 | 13 |
| 1 | 0 |
| 2 | 20 |
| ⋮ | ⋮ |
| $2^F-2$ | 0 |

| FLOW ID | USED VOLUME |
|---|---|
| 0 | 18 |
| 1 | 9 |
| 2 | 5 |
| ⋮ | ⋮ |
| $2^F-2$ | 0 |

| FLOW ID | HEAD BLOCK NUMBER |
|---|---|
| 0 | 0 |
| 1 | 19 |
| 2 | 23 |
| ⋮ | ⋮ |
| $2^F-2$ | -1 |

| FLOW ID | TAIL BLOCK NUMBER |
|---|---|
| 0 | 21 |
| 1 | 7 |
| 2 | 27 |
| ⋮ | ⋮ |
| $2^F-2$ | -1 |

| CLASS ID | USED VOLUME |
|---|---|
| 0 | 32 |
| 1 | 24 |
| 2 | 48 |
| ⋮ | ⋮ |
| $2^C-2$ | 12 |

| CLASS ID | NUMBER OF FLOWS |
|---|---|
| 0 | 4 |
| 1 | 8 |
| 2 | 10 |
| ⋮ | ⋮ |
| $2^C-2$ | 2 |

| CLASS ID | EXCESSIVELY USED VOLUME |
|---|---|
| 0 | 0 |
| 1 | 18 |
| 2 | 3 |
| ⋮ | ⋮ |
| $2^C-2$ | 0 |

~24i

| FLOW ID | NEXT SERVICE FLOW ID |
|---|---|
| 0 | 1 |
| 1 | 5 |
| 2 | 3 |
| ⋮ | ⋮ |
| 5 | 0 |
| ⋮ | ⋮ |
| $2^F-2$ | -1 |

28c

| CLASS ID | NEXT SERVICE CLASS ID |
|---|---|
| 0 | 1 |
| 1 | 0 |
| 2 | -1 |
| ⋮ | ⋮ |
| $2^C-2$ | 4 |

~29c

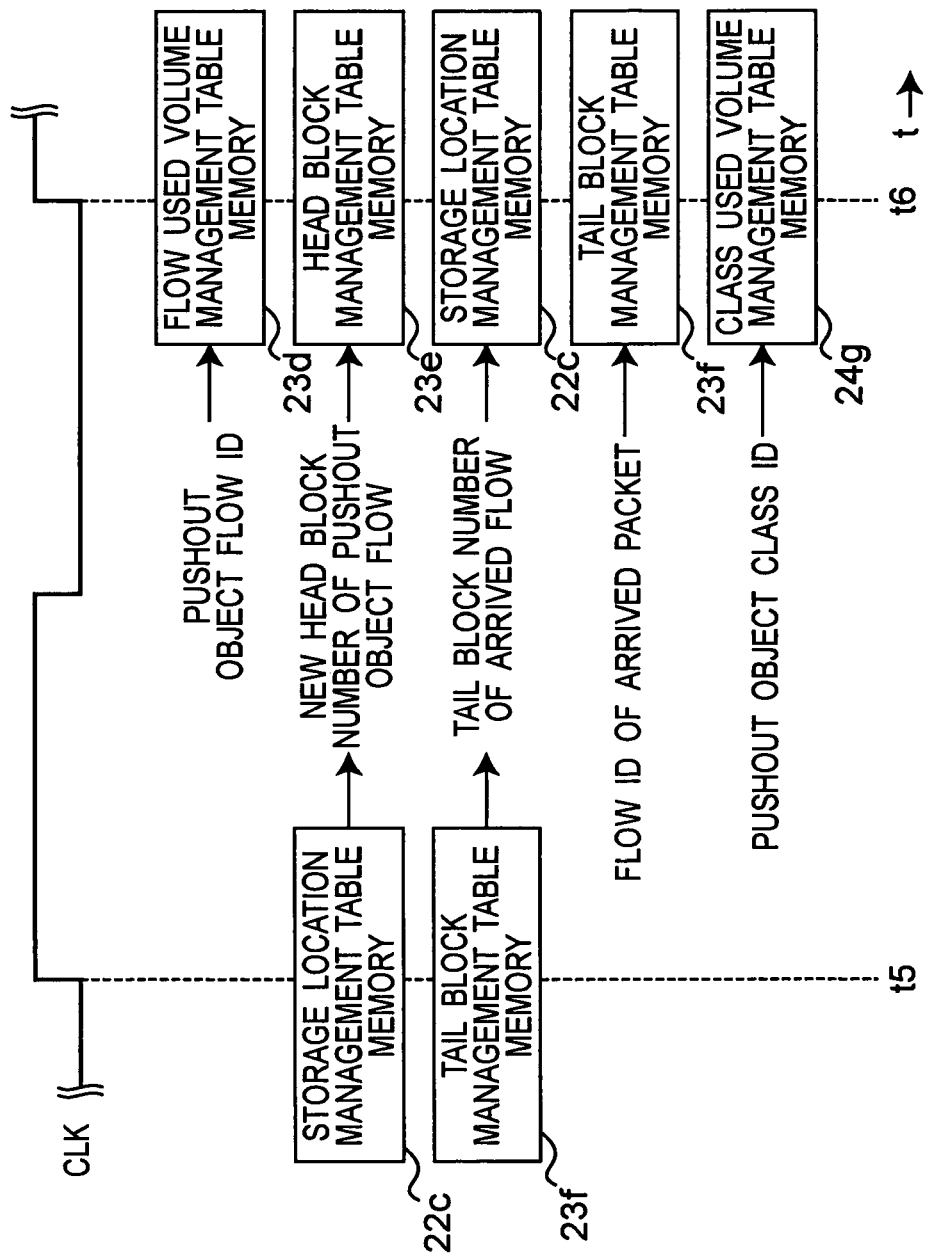

EXCESSIVELY USED VOLUME ARITHMETIC PROCESSING FOR FLOW BELONGING TO BEST-EFFORT CLASS

Fig. 43 EXCESSIVELY USED VOLUME ARITHMETIC PROCESSING FOR FLOW BELONGING TO BANDWIDTH-GUARANTEED CLASS

Fig.48A PRIOR ART

WHEN PORT P1 USES STORAGE AREA OF BUFFER MEMORY LARGER THAN BASIC VOLUME, CLASS C3 OF ARRIVED PACKET USES STORAGE AREA WITHIN BASIC VOLUME RANGE AND CLASS C2 OF ARRIVED PACKET USES STORAGE AREA LARGER THAN BASIC VOLUME

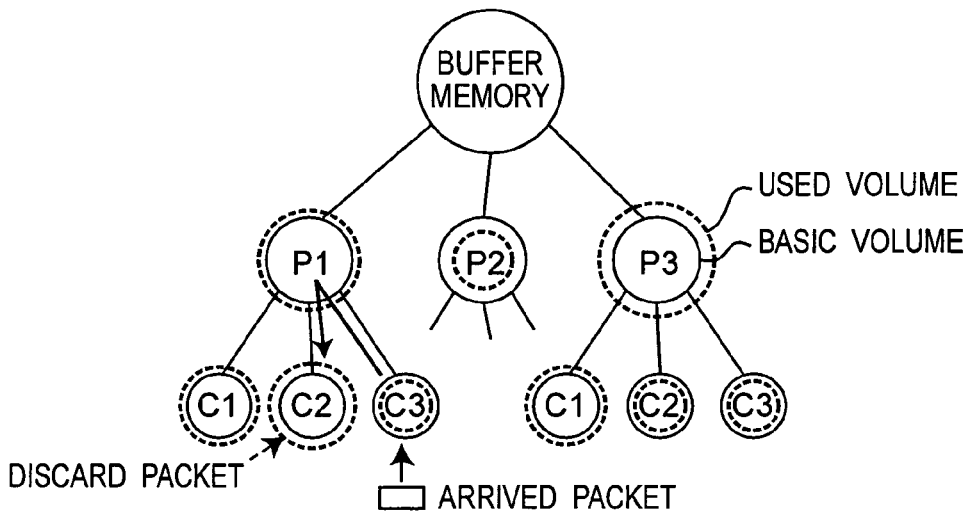

Fig.48B PRIOR ART

WHEN CLASS C3 OF ARRIVED PACKET AND PORT P1 USE STORAGE AREA OF BUFFER MEMORY WITHIN BASIC VOLUME RANGE, AND PORT P3 AND CLASS C1 OF PORT P3 USE STORAGE AREA LARGER THAN BASIC VOLUME

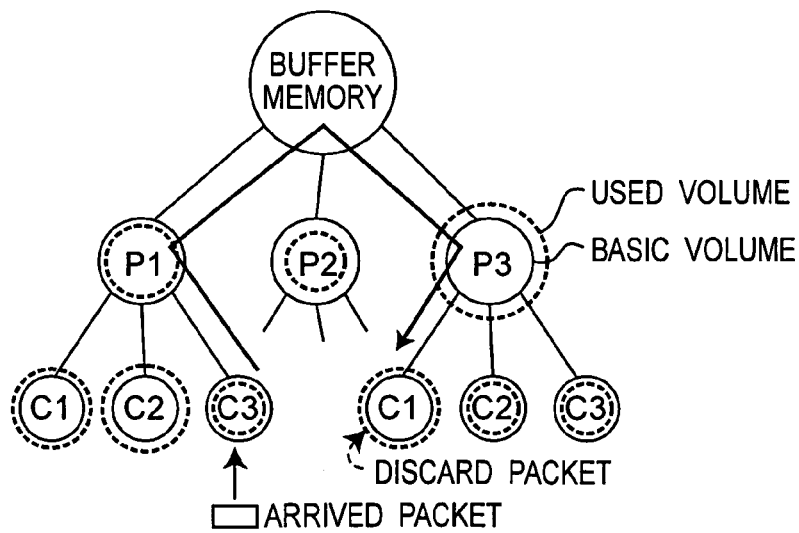

ROUTER APPARATUS PROVIDED WITH OUTPUT PORT CIRCUIT INCLUDING STORAGE UNIT, AND METHOD OF CONTROLLING OUTPUT PORT CIRCUIT OF ROUTER APPARATUS

BACKGROUND OF THE INVENTION

1. Field of the Invention

The present invention relates to a router apparatus which routes and transmits a packet, which is received from a packet switching network, e.g., the Internet through an input port circuit, to each adjacent node through each output port circuit, and relates the output port circuit of the router apparatus and a method of controlling the output port circuit thereof. In particular, the present invention relates to an output port circuit of a router apparatus that controls storage and reading out of a packet into and from a buffer memory of the output port circuit thereof, and a method of controlling the output port circuit thereof.

2. Description of the Related Art

Recently, as high-performance computers have begun to fulfill their functions as new information equipment in not only research organizations and businesses but also in the general consumer area, the use of network applications such as the WWW has remarkably increased, and this leads to that the traffic in the Internet and Intranet have rapidly and exponentially increased. Integration of voice traffic into conventional data traffic on the Internet, that is VoIP (Voice over IP) has begun in earnest. It is expected in the future that various types of traffic coexist which require different communication qualities such as stream type traffic having a fixed transfer speed like video and traffic for high-speed data transfer.

Accordingly, techniques including Diff-Serv (Differentiated Service) and MPLS (Multi-Protocol Label Switching) have been proposed and spread. The Diff-Serv defines different service classes for traffic having different attributes and requires an Internet router to offer services best suitable for the respective classes. The MPLS is a technique for accelerating a packet transfer speed. In order to realize differentiated services, a header of the MPLS packet includes a CoS (Class of Service) field. It is practical in the present communication situation to provide a repeater apparatus such as a router apparatus with a control function so as to realize a QoS (Quality of Service) control mechanism that guarantees diversified qualities under these circumstances. Further, following the recent acceleration of network speed, it is essential to allow the QoS control mechanism to operate at a high speed in the router apparatus.

A study of buffer memory read scheduling has been actively conducted as one of the techniques that are proposed to provide the QoS guarantee mechanism as mentioned above or a class-based priority control mechanism. For example, in an input and output buffer switch that arranges buffer memories at input and output ports, respectively, the problem of the static occupation of an output circuit by specific connections can be improved by a buffer memory read scheduling criterion such as Weighted Fair Queuing (WFQ), Weighted Round Robin (WRR), etc. However, it is impossible to ensure storing a high-priority traffic packet that arrives when a buffer load is high only by the use of one of these scheduling criterions, and it is difficult to realize QoS guarantee. In addition, it is highly likely that a plurality of ports is connected with an interface card of the router apparatus. If so, a buffer memory space is shared among the ports. However, no sufficient consideration has been given to buffer memory management that assumes connection of a plurality of ports. In a prior art document of Katsuya Minami et. al, "Per-Flow Buffer Management Scheme with Class-based Priority in the Internet Router", the Technical Report of The Institute of Electronics, Information and Communication Engineers in Japan (hereinafter referred to as "IEICE"), SSE99-175, IN99-138, issued by IEICE, pp. 85-90, March 2000, for example, there is proposed one method of dealing with this problem, which method will be referred to as "prior art" hereinafter.

A conventional method of managing a buffer memory will be described. A router apparatus logically secures a minimum size of a buffer memory which can be used by each flow (hereinafter, referred to as a "basic volume"). In an environment in which a buffer memory utilization rate is low, each flow is allowed to use an actually necessary storage area of the buffer memory irrespective of this basic volume. If this environment changes to a high-load environment and the buffer memory turns full, the router apparatus applies a pushout mechanism and discards (that is, pushes out) a specific packet in the buffer memory. The conventional method is used on the assumption of an environment in which one buffer memory is shared among a plurality of ports. Accordingly, in the conventional method, the basic volume is managed hierarchically in the order of ports, classes and flows and the WRR is hierarchically carried out as a scheduling criterion. Further, in the conventional method, bandwidth allocation is carried out so as to realize class-based priority control.

A conventional method of allocating basic volumes will be described. When the router apparatus senses a flow, a basic volume of the buffer memory in the router apparatus is allocated to the flow. The allocation method is as follows.

First of all, a total buffer memory size of the router apparatus is shared among a plurality of ports according to line speed ratios. Next, a fixed, necessary buffer memory volume calculated from a guaranteed bandwidth is allocated to flows that belong to a bandwidth-guaranteed (BG) class, irrespective of the basic volume allocated to the port to which the flow belongs. To each of flows that belong to the other best effort classes, volumes obtained by subtracting allocation volumes for the bandwidth-guaranteed class from the basic volume for the ports are allocated according to predetermined weighting factors. The allocated basic volume changes according to the detection of the flow and the discard of the flow. Namely, the basic volume is allocated only to the flows that actually use the buffer memory.

The allocation method will be concretely described with reference to FIG. 47. FIG. 47 is a schematic explanatory view for explaining a conventional method of allocating a storage area of the buffer memory. First of all, the router apparatus allocates a total buffer memory volume, i.e., buffer memory volumes $p_1, P_2, \ldots$ and $P_N$ to respective ports P1 to PN according to output line speed ratios, respectively. In the case of FIG. 47, the basic volume $p_1$ is allocated first to the port P1. Next, the basic volume $p_1$ is shared among classes that belong to the port P1. Allocation ratios of the classes dynamically change. This is because the router apparatus allocates the basic volume according to a reserved volume for the bandwidth-guaranteed class C2, to the class C2. The other classes of C1 and C0 are allocated a remaining volume of the basic volume $p_1$ according to their predetermined class weighting factors. In the case of FIG. 47, a necessary buffer memory volume $\alpha_1$ calculated from a reserved bandwidth is allocated first to the bandwidth-guaranteed class C2. This necessary buffer memory volume is a quantity with which all the packets of reserved traffic in a unit time interval that arrive in a burst at the router apparatus can be stored. Thereafter, a remaining buffer memory volume ($p_1$-$\alpha_1$) is allocated to the other classes. Procedures for the allocation are as follows. Priorities $w_{11}$ and $w_{10}$ and detected number of flows $f_{11}$ and $f_{10}$ of respective classes are used to obtain products of the priorities and the number of flows as weighting factors of the respective classes. The products are applied to the buffer memory volume ($p_1$-$\alpha_1$). In the case of the port P1 in FIG. 47, a weighting factor $W_{c1}$ of the class C1 and a weighting factor $W_{c0}$ of the class C0 are defined by the following Equations (1) and (2), respectively:

$$W_{c1} = f_{11} \times w_{11} \quad (1)$$

$$W_{c0} = f_{10} \times w_{10} \quad (2).$$

A ratio of the weighting factors $W_{c1}$ to $W_{c0}$ is applied to the buffer memory volume ($p_1$-$\alpha_1$) to acquire basic volumes of the classes C0 and C1. Namely, the basic volumes $\beta_1$ and $\gamma_1$ of the classes C1 and C0 are expressed by the following Equations (3) and (4), respectively:

$$\beta_1 = (p1 - \alpha 1) \times \frac{W_{C1}}{W_{C1} + W_{C0}} \quad (3)$$

$$\gamma_1 = (p1 - \alpha 1) \times \frac{W_{C0}}{W_{C1} + W_{C0}} \quad (4)$$

On the other hand, if a packet arrives at the router apparatus when the buffer memory is full, the router apparatus carries out the following operation as a pushout mechanism of discarding an excessive packet.

If a new packet that belongs to a flow that uses the buffer memory beyond its basic volume arrives, the packet is discarded as it is. If a packet that belongs to a flow that uses the buffer memory below its basic volume, the router apparatus employs the pushout mechanism to permit the packet arriving at the buffer memory to be stored in the buffer memory. When a pushout object packet search is finished, the arrived packet is overwritten on a pushout object packet at a position of the buffer memory at which the pushout object packet is present and the overwritten packet (that is, the pushout object packet) is discarded. If the pushout object packet search reveals that there is no flow that uses the buffer memory beyond its basic volume, the arrived packet is discarded.

According to the prior art, the basic volume is allocated hierarchically, so that the pushout object flow search is carried out in the following procedures. First of all, the router apparatus checks whether the class to which the arrived packet belongs uses the buffer memory beyond its basic volume. If the class uses the buffer memory beyond its basic volume, a flow that most exceeds its basic volume in the class is to be pushed out. If the class uses the buffer memory within its basic volume, the router apparatus checks an excessively used volume for the port to which the arrived packet belongs. If there are classes the used volumes of which exceed their basic volumes, the router apparatus decides the class having the most excessively used volume among the classes. Next, the router apparatus determines the flow having the most excessively used volume in the class. If used volumes of none of the classes exceed their basic volumes, the router apparatus conducts a similar search in the port having the most excessively used volume.

The pushout object flow is searched by the above-mentioned method, and the arrived packet is permitted to be overwritten on a head packet of the flow. This method will be described concretely with reference to FIGS. 48A and 48B. FIGS. 48A and 48B are schematic explanatory views for explaining a method of discarding a packet in a class that uses the storage area of the buffer memory allocated to the class as shown in FIG. 47. FIG. 48A shows that a packet in a different class from that of the arrived packet at the same port is discarded. FIG. 48B shows that a packet in a class at a different port from that of the arrived packet is discarded.

In FIGS. 48A and 48B, solid-line circles surrounding the ports P1 to P3 and the classes C1 to C3 in the ports indicate basic volumes of the ports and classes, respectively, and dotted-line circuits thereof indicate actually used volumes of the ports and classes, respectively. In FIG. 48A, it is assumed that the flow to which the arrived packet belongs does not use the storage area of the buffer memory larger than its basic volume. The excessively used volume of the class C3 to which the arrived flow belongs at that time is checked. In the case of FIG. 48A, the used volume (indicated by the dotted-line circle) of the class C3 in the port P1 does not exceed its basic volume (indicated by the solid-line circle), so that the excessively used volume of the port to which the class C3 belongs is checked. The port P1 uses the storage area larger than its basic volume. Therefore, the pushout object class is among the classes that belong to the port P1, i.e., the class C2 having the most excessively used volume among the classes. In this method, flow-based control is carried out. Due to this, the pushout object packet is a head packet of the flow having the most excessively used volume among the flows that belong to the class C2.

Further, a search is conducted in the case of FIG. 48B in a manner similar to that of FIG. 48A. Referring to FIG. 48B, the port P1 to which the arrived flow belongs uses the storage area of the buffer memory within its basic volume (indicated by the solid-line circuit). In that case, the pushout object is the port P3 having the most excessively used volume and the router apparatus conducts a search similar to the above-mentioned search to flows that belong to the port P3. A result of the search reveals that the pushout object is the class C1 having the most excessively used volume in the port P3.

The conventional scheduling criterion and bandwidth allocation method will next be described. FIG. 49 is a schematic explanatory view for explaining hierarchically allocating all bandwidths available for transmission to ports, classes and flows. According to the conventional method, the WRR is executed in the order of ports, classes and flows as a reading out scheduling criterion for packets stored in the buffer memory.

If the WRR is executed, it is necessary to set weighting factors of the respective classes. A decision method for the weighting factors will be described. In the WRR for the first hierarchy, i.e., ports, the router apparatus sets an output line speed ratio of the ports as a weighting factor of the ports. In the WRR for the second hierarchy, i.e., classes, the router apparatus allocates a bandwidth guaranteed for a bandwidth-guaranteed flow from a total link capacity. A remaining link capacity after the allocation of the bandwidth to the bandwidth-guaranteed flow is shared among the classes other than the bandwidth-guaranteed class. As the allocation ratio, the class ratio used upon allocating the basic volume is employed. A bandwidth allocation volume calculated based on the ratio are converted to a simple integer ratio, thus obtaining a weighting factor. In the WRR for the third hierarchy, i.e., flows, the route apparatus utilizes a reserved bandwidth ratio as a weighting factor of each flow in the bandwidth-guaranteed class. As for the other classes, the router apparatus gives a weighting factor of "1" to each flow so as to keep fairness in the flows. Namely, round robin (RR) is employed as a scheduling criterion for flows in low priority classes other than the bandwidth-guaranteed class.

As described above, according to the prior art, if the router apparatus maintains the storage area of the buffer memory allocated to the arrived packet for each class to which packets belong, the performance of the router apparatus is disadvantageously unstable. Therefore, it is necessary to set a more appropriate processing unit for the management of the storage area of the buffer memory.

In order to solve the above-mentioned technical disadvantage, it is necessary to realize a high-performance router apparatus in which a QoS control mechanism including an appropriate buffer management mechanism for each flow is provided. In particular, it is necessary to provide a service suitable for each class or each flow and realize high-level QoS guarantee even if a load of a buffer memory of the router apparatus is high.

Moreover, in order to actually execute the management of the buffer memory of the router apparatus, it is necessary to manage a location of an arrived packet in the buffer memory. In this case, the problem arises that a packet transmitted on the Internet has a variable length. In the buffer memory, a packet storage start position and the packet length need to be maintained. However, if the storage and transmission of the variable-length packet are repeated, free spaces in the buffer memory disadvantageously are dispersed. This disadvantageously complicates the management of the buffer memory and the packets.

SUMMARY OF THE INVENTION

It is an object of the present invention to provide a router apparatus capable of solving the above-mentioned conventional disadvantages, providing a service suitable for each class, solving the problems of the occupation of the buffer memory by specific flows, and accelerating packet input and output processings for the buffer memory in an output port circuit.

It is another object of the present invention to provide an output port of a router apparatus capable of solving the above-mentioned conventional disadvantages, providing a service suitable for each class, solving the problems of the occupation of the buffer memory by specific flows, and accelerating packet input and output processings for the buffer memory of the output port circuit.

It is a further object of the present invention to provide a method of controlling an output port of a router apparatus capable of solving the above-mentioned conventional disadvantages, providing a service suitable for each class, solving the problems of the occupation of the buffer memory by specific flows, and accelerating packet input and output processings for the buffer memory of the output port circuit.

In order to achieve the above-mentioned objective, according to one aspect of the present invention, there is provided an output port circuit of a router apparatus that routes and transmits a packet received through an input port circuit to each of adjacent nodes through the output port circuit by a switch fabric circuit. Each of flows is constituted by a plurality of continuous packets and belongs to either one of a bandwidth-guaranteed class and a best-effort class. The output port circuit includes a storage unit for temporarily storing a packet to be transmitted, and a controller for controlling storage and reading out of the packet into and from the storage unit. Upon allocating a basic volume that is a criterion of a memory size which can be stored in the storage unit to each of the flows to which the packet to be transmitted belongs, the controller manages the basic volume of each flow of the packet belonging to the bandwidth-guaranteed class by individually allocating the basic volume by as much as the memory size required by each of the flows, and manages the basic volume of each of the flows of the packets belonging to the best-effort class by collectively allocating the memory size obtained by subtracting a sum of each the basic volume allocated to the bandwidth-guaranteed class from an entire memory size of the storage unit.

In the above-mentioned output port circuit, the controller preferably calculates a product of a priority and a number of flows belonging to a class for the each best-effort class, calculates a total priority of the best-effort class by calculating a sum of each the product for the number of best-effort classes, calculates a basic volume allocation ratio for the received packet by dividing the priority of the class to which the flow of the received packet belongs by the calculated total priority, and calculates the basic volume of the flow of the received packet by calculating the product of the calculated basic volume allocation ratio and the basic volume of the best-effort class.

According to another aspect of the present invention, there is provided an output port circuit of a router apparatus that routes and transmits a packet received through an input port circuit to each of adjacent nodes through the output port circuit by a switch fabric circuit. Each of flows is constituted by a plurality of continuous packets and belongs to either one of a bandwidth-guaranteed class and a best-effort class. The output port circuit includes a storage unit for temporarily storing a packet to be transmitted, and a controller for controlling storage and reading out of the packet into and from the storage unit. The controller preferably allocates a basic volume that is a criterion of a memory size which can be stored in the storage unit to each of the flows to which the packet to be transmitted belongs, calculates an excessively used volume of the packet to be transmitted relative to the basic volume of the flow based on an actual used volume of each of the flows by which the flow uses the storage unit, and manages (a) flow information on only the flow that most excessively uses the storage unit relative to the basic volume and (b) the excessively used volume thereof. Further, upon receiving a packet belonging to a flow having an excessively used volume larger than the managed excessively used volume, the controller updates (a) the flow information and (b) the excessively used volume to (a) flow information on the flow to which the received packet belongs and (b) the excessively used volume of the flow thereof.

In the above-mentioned output port circuit, upon transmission of a packet belonging to a flow that most excessively uses the storage unit relative to the allocated basic volume from the router apparatus, the controller preferably updates only the managed excessively used volume to the excessively used volume after transmission of the flow.

In the above-mentioned output port circuit, the controller preferably calculates an excessively used volume relative to the basic volume of the flow of the packet to be transmitted based on an actual used volume of the flow by which the flow uses the storage unit, and manages (a) flow information on only the flow that most excessively uses the storage unit relative to the basic volume and (b) the excessively used volume thereof. Further, upon receiving a packet belonging to a flow and having an excessively used volume larger than the managed excessively used volume occurs, the controller preferably updates (a) the flow information and (b) the excessively used volume to (a) flow information on the flow to which the newly received packet belongs and (b) the excessively used volume thereof.

In this case, upon transmission of a packet belonging to a flow that most excessively uses the storage unit relative to the allocated basic volume from the router apparatus, the controller preferably updates only the managed excessively used volume to the excessively used volume after transmission of the flow.

According to a further aspect of the present invention, there is provided an output port circuit of a router apparatus that routes and transmits a packet received through an input port circuit to each of adjacent nodes through the output port circuit by a switch fabric circuit. Each of flows is constituted by a plurality of continuous packets and belonging to either one of a bandwidth-guaranteed class and a best-effort class. The output port circuit includes a storage unit for temporarily storing a packet to be transmitted, and a controller for controlling storage and reading out of the packet into and from the storage unit. The controller preferably further includes a first management table memory that stores flow information on a flow to be transmitted next to the flow for each of the flows to manage a flow transmission order upon storing a plurality of flows in the storage unit, and the controller preferably updates the first management table memory so as to designate an order of a new flow to be transmitted next to the flow before the currently transmitted flow upon storing the new flow to be transmitted in the storage unit.

In the above-mentioned output port circuit, the controller preferably further includes a first management table memory that stores flow information on a flow to be transmitted next to the flow for each of the flows to manage a flow transmission order upon storing a plurality of flows in the storage unit, and the controller preferably updates the first management table memory so as to designate an order of a new flow to be transmitted next to the flow before the currently transmitted flow upon storing the new flow to be transmitted in the storage unit.

According to a still further aspect of the present invention, there is provided an output port circuit of a router apparatus that routs and transmits a packet received through an input port circuit to each of adjacent nodes through the output port circuit by a switch fabric circuit. Each of flows is constituted by a plurality of continuous packets and belongs to either one of a bandwidth-guaranteed class and a best-effort class. The output port circuit includes a storage unit for temporarily storing a packet to be transmitted, and a controller for controlling storage and reading out of the packet into and from the storage unit. The storage unit is preferably divided to a plurality of blocks each having a predetermined block length, and the controller further includes a second management table memory that stores information on one of the blocks which stores the packet and information on the other one of the blocks to be connected next to the block that stores the packet while making these information correspond to each other, thereby managing a packet connection state of each of the flows.

In the above-mentioned output port circuit, the storage unit is preferably divided to a plurality of blocks each having a predetermined block length, and the controller preferably further comprises a second management table memory that stores information on one of the blocks which stores the packet and information on the other one of the blocks to be connected next to the block that stores the packet while making these information correspond to each other, thereby managing a packet connection state of each of the flows.

According to a more still further aspect of the present invention, there is provided a router apparatus that routes and transmits a packet received through an input port circuit to each of adjacent nodes through the output port circuit by a switch fabric circuit. The router apparatus preferably the above-mentioned output port circuit.

According to a more still further aspect of the present invention, there is provided a method of controlling the output port circuit. The method preferably includes above-mentioned processings of the controller.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 3A is a schematic diagram showing an arrived packet that arrives at the output port circuit 3 shown in FIG. 1;

FIG. 3B is a schematic diagram showing a memory space of a buffer memory 13 shown in FIG. 2;

FIG. 3C is a schematic diagram showing a transmitted packet transmitted from the output port circuit 3;

FIG. 10 show one example of a schematic configuration of a class management table T4 managed by a class management section 24 shown in FIG. 2;

FIG. 11 show one example of a schematic configuration of a port management table T5 managed by a port management section 25 shown in FIG. 2;

FIG. 15A shows previous service flow management when a new flow occurs and FIG. 15B shows a data update processing after the state of FIG. 15A;

FIGS. 19A, 19B, 19C and 19D are schematic explanatory views for explaining most excessive flow management using the most excessive flow management table T8 managed by the class management section 24 shown in FIG. 2, where FIG. 19A shows (a1) the most excessive flow management table T8 in an initial state and (a2) a current state of an excessively used volume of each flow, FIG. 19B shows (b1) the most excessive flow management table T8 when the flow 3 having a packet size of 2 arrives and (b2) a current state of the excessively used volume of each flow, FIG. 19C shows (c1) the most excessive flow management table T8 when the flow 3 having a packet size of 2 is transmitted and (c2) a current state of the excessively used volume of each flow, and FIG. 19D shows (d1) the most excessive flow management table T8 when the flow 1 having a packet size of 2 arrives and (d2) a current state of the most excessively used volume of each flow;

FIG. 20 is a block diagram illustrating a detailed configuration of the storage location decision section 17 shown in FIG. 2 and a storage location decision processing flow;

FIG. 25A is an illustration of one example of a free-space management table stored in the free-space management table memory 21c, FIG. 25B is an illustration of one example of a list head block number in a list head block number register 21d, FIG. 25C is an illustration of one example of a list tail block number in a list tail block number register 21e, and FIG. 25D is an illustration of one example of the number of free blocks in a number-of-free-blocks register 21f;

FIGS. 29A, 29B, 29C and 29D show one example of data in the flow management section 23 shown in FIG. 28, where FIG. 29A shows one example of a basic volume management table stored in a basic volume management table memory 23c, FIG. 29B shows one example of a flow used volume management table stored in a flow used volume management table memory 23d, FIG. 29C shows one example of a head block management table stored in a head block management table memory 23e, and FIG. 29D shows one example of a tail block management table stored in a tail block management table memory 23f;

FIGS. 31A, 31B and 31C are schematic diagram showing one example data in the class management section 24 shown in FIG. 30, where FIG. 31A is an illustration of one example of a class used volume management table stored in a class used volume management table memory 24g, FIG. 31B is an illustration of one example of a number-of-class-flows management table stored in a number-of-class-flows management table memory 24h, and FIG. 31C is an illustration of one example of the most excessive flow excessively used volume management table stored in the most excessive flow excessively used volume management table memory 24i;

FIG. 41A is a timing chart illustrating a seventh part of processings upon arrival of the packet, which are executed by the output port controller 20 shown in FIG. 2;

Figure 2:
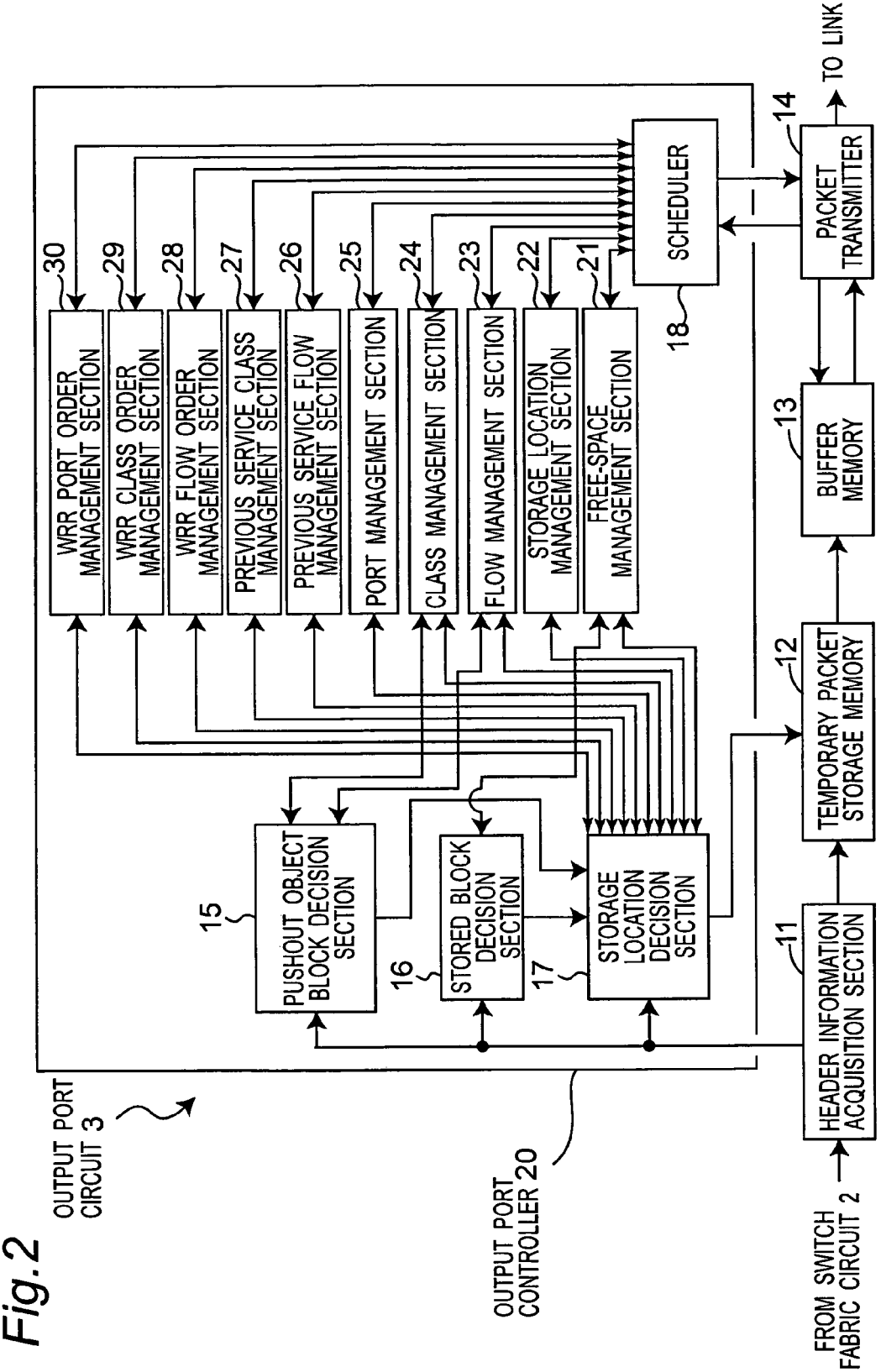
FIG. 2 is a block diagram illustrating a detailed configuration of an output port circuit 3 shown in FIG. 1.
Figure 43:
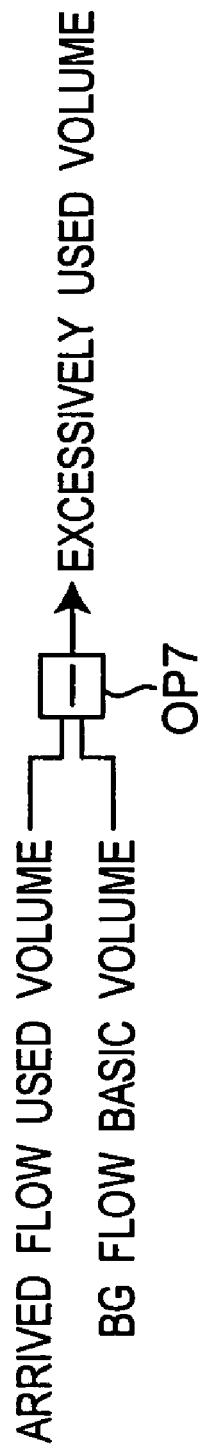
Figure 44:
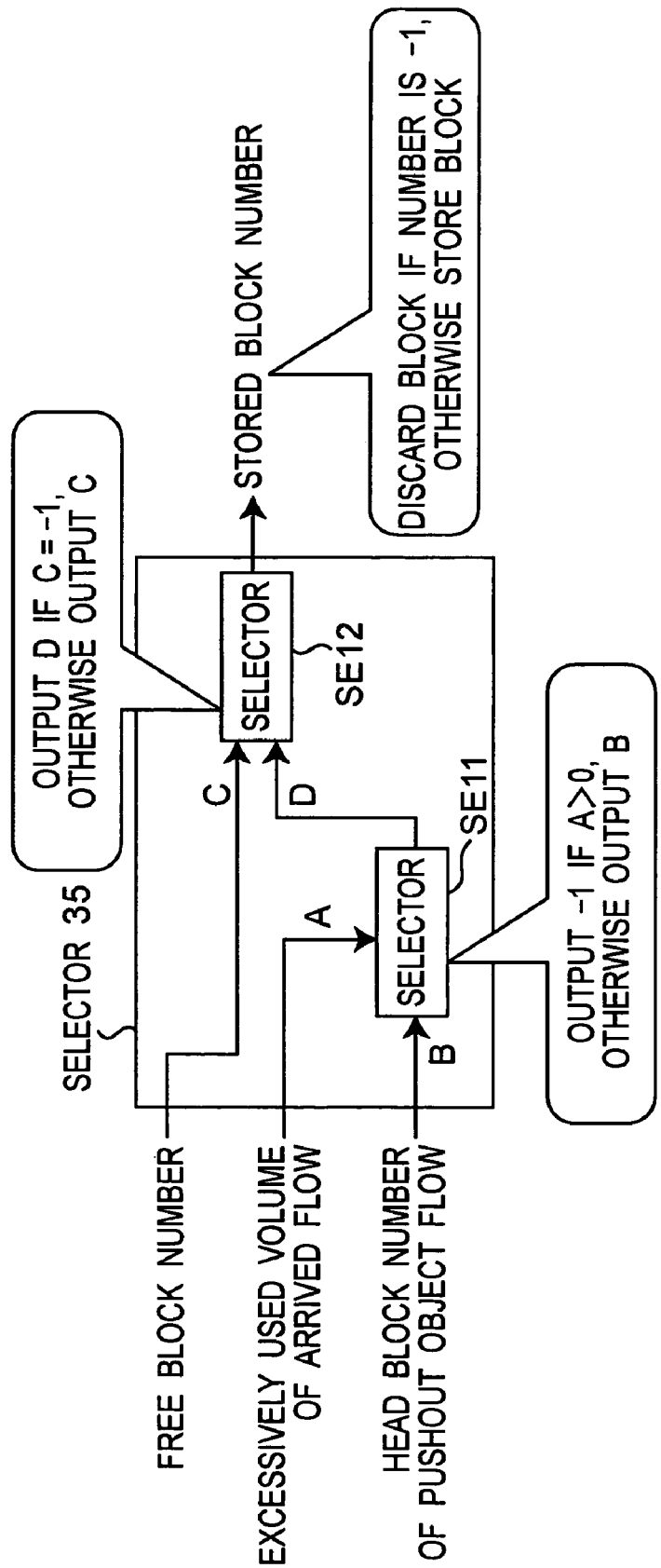
Figure 45:
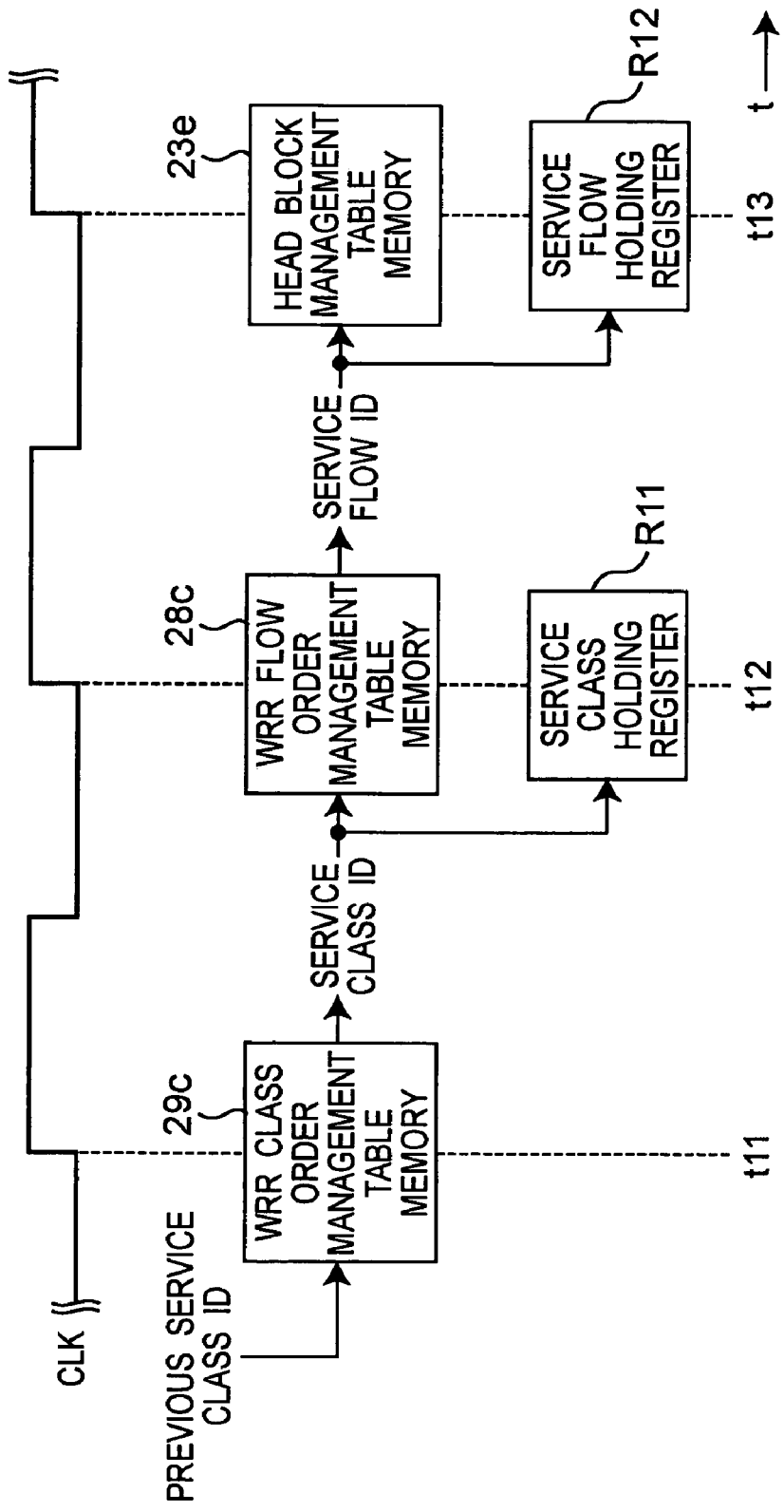
Figure 46A:
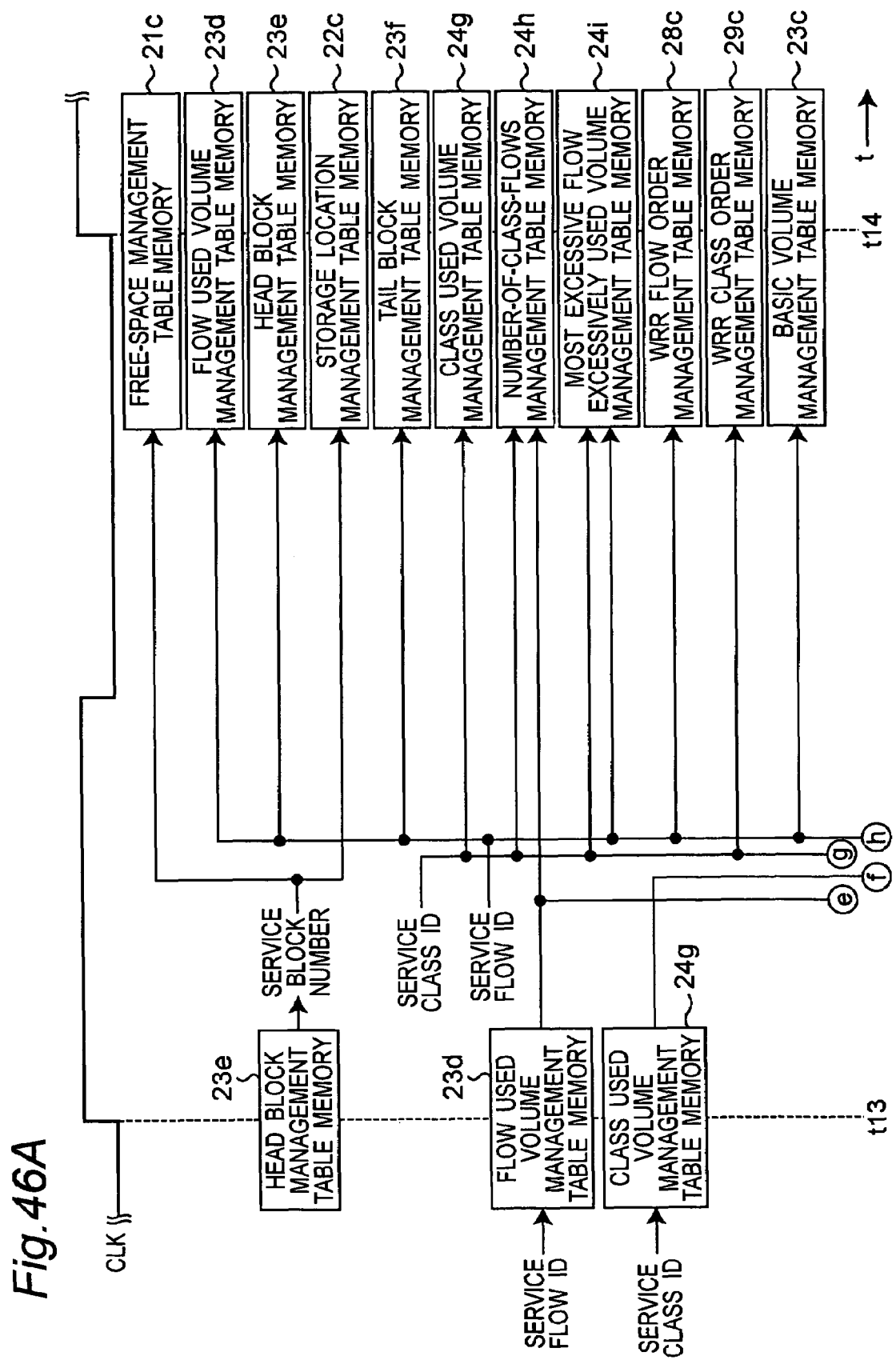
Figure 46B:
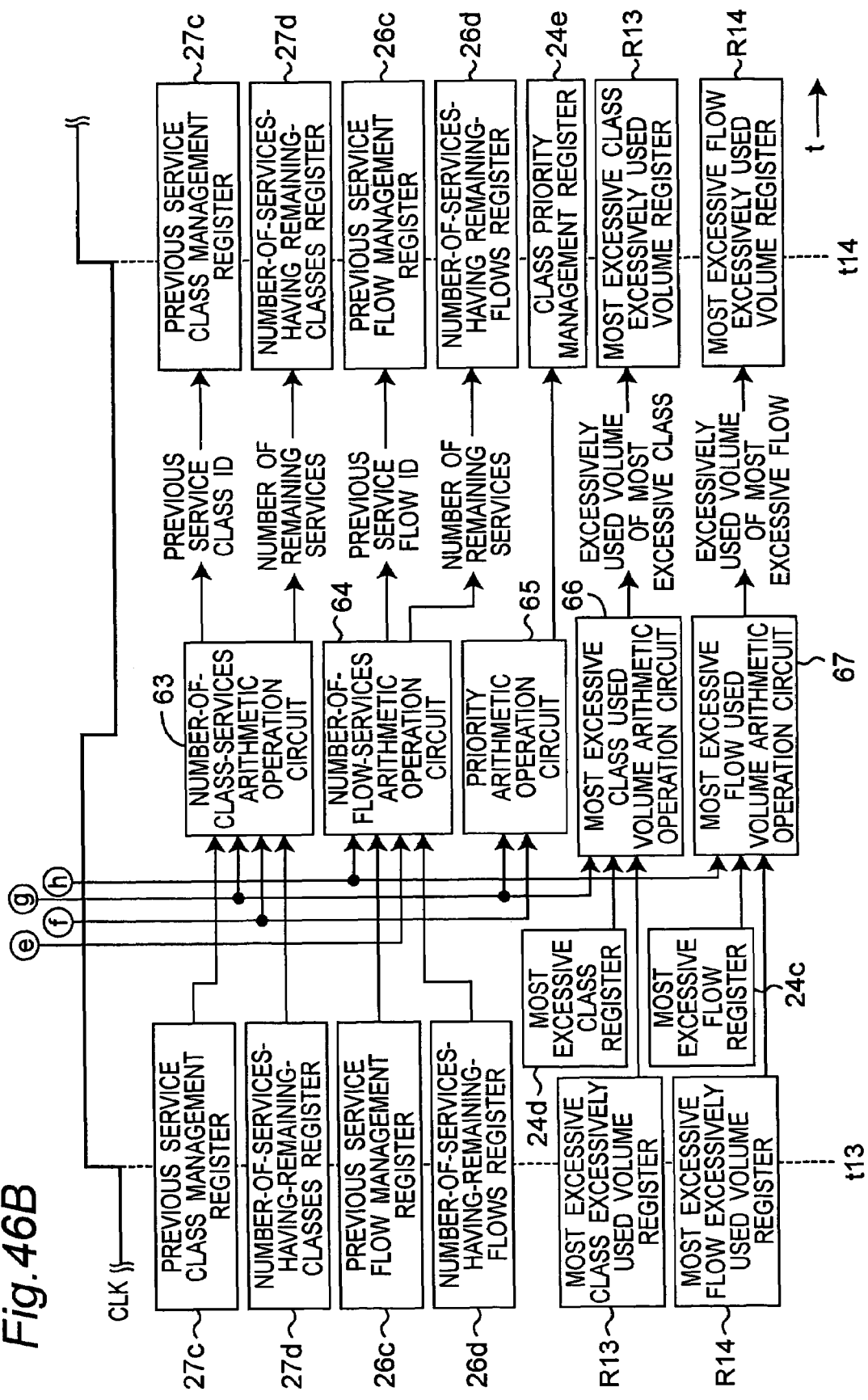
Figure 47:
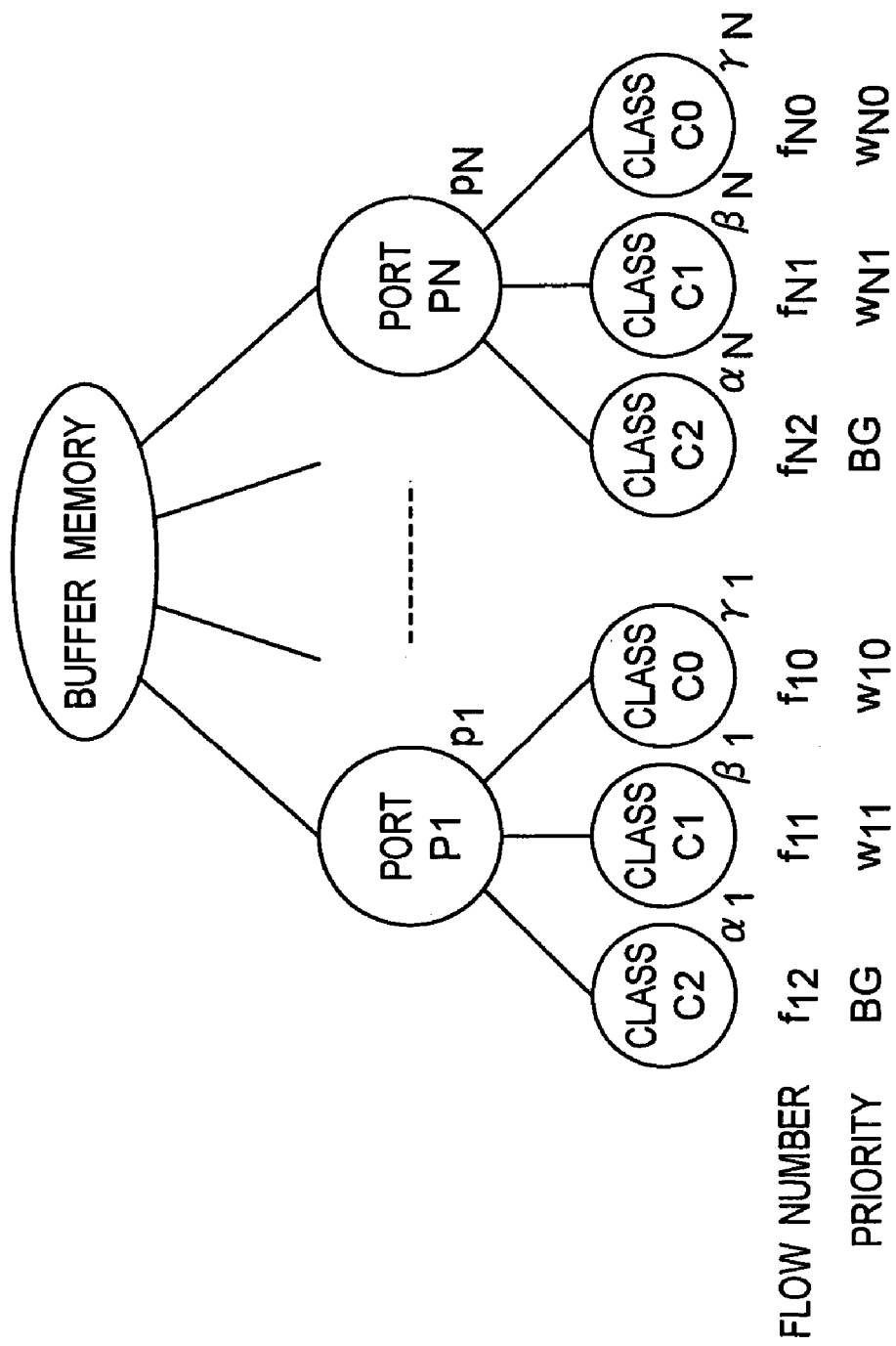
Figure 49:
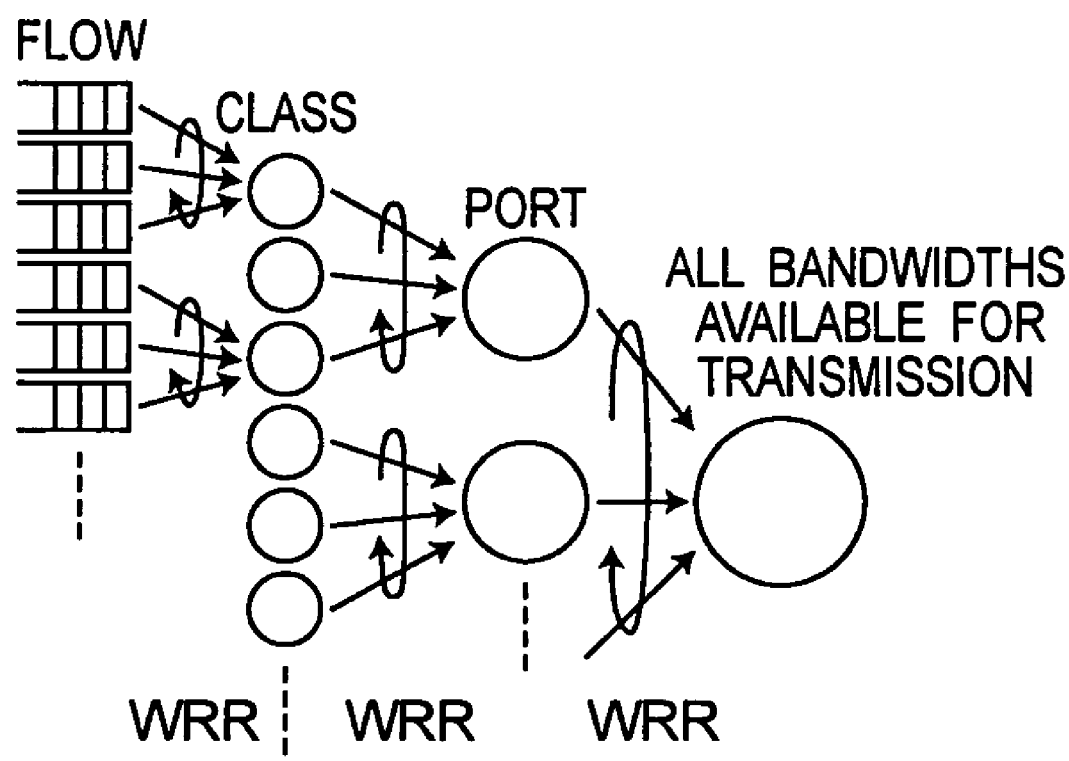

2 and which executes an excessively used volume arithmetic operation for a flow belonging to the best-effort class;

FIG. 43 is a block diagram of a circuit which is included in the pushout object block decision section 15 shown in FIG. 2 and which executes an excessively used volume arithmetic operation processing for the flow belonging to the bandwidth-guaranteed class;

FIG. 44 is a schematic explanatory view for explaining storage location decision for the arrived packet executed by a selector 35 shown in FIG. 20;

FIG. 45 is a timing chart illustrating a first part of processings upon transmission of a packet, which are executed by the output port controller 20 shown in FIG. 2;

FIG. 46A is a timing chart illustrating a second part of the processings upon transmission of a packet, which are executed by the output port controller 20 shown in FIG. 2;

FIG. 46B is a timing chart illustrating a third part of the processings upon transmission of a packet, which are executed by the output port controller 20 shown in FIG. 2;

FIG. 47 is a schematic explanatory view for explaining a conventional method of allocating a storage area of the buffer memory;

FIGS. 48A and 48B are schematic explanatory views for explaining a method of discarding a packet in a class that uses the storage area of the buffer memory allocated to the class as shown in FIG. 47, where FIG. 48A shows that a packet in a different class from that of the arrived packet at the same port is discarded, and FIG. 48B shows that a packet in a class at a different port from that of the arrived packet is discarded; and FIG. 49 is a schematic explanatory view for explaining hierarchically allocating all bandwidths available for transmission to ports, classes, and flows.

DETAILED DESCRIPTION OF THE PREFERRED EMBODIMENTS

A preferred embodiment of the present invention will be described hereinafter with reference to the drawings.

Figure 1:
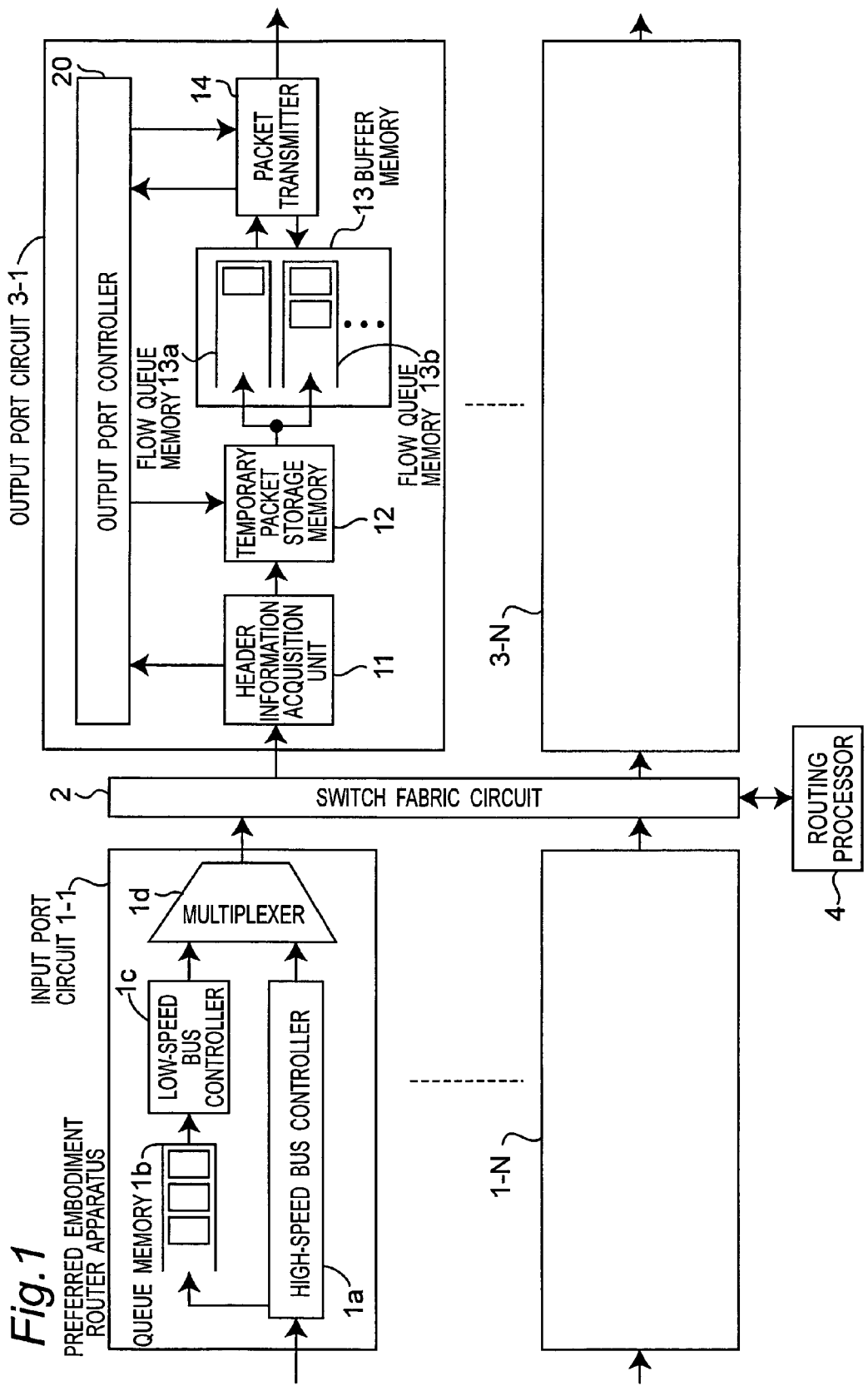
FIG. 1 is a block diagram illustrating a configuration of a router apparatus in one preferred embodiment according to the present invention.

FIG. 1 is a block diagram illustrating a configuration of a router apparatus in a preferred embodiment according to the present invention. The router apparatus shown in FIG. 1 is provided for the Internet that serves as a packet exchange network. The router apparatus is constituted by including the following:

(a) N input port circuits 1-1 to 1-N (each will be generically referred to as "input port 1" hereinafter),
(b) a switch fabric circuit 2 which is connected with the respective input ports 1,
(c) N output ports 3-1 to 3-N (each will be generically referred to as "output port 3" hereinafter) which are connected with the switch fabric circuit 2, and
(d) a routing processor 4 which controls the switch fabric circuit 2.

The router apparatus routes and transmits a packet received through each input port 1 to an adjacent node through the corresponding output port 3 by the switching fabric circuit 2. A plurality of continuous packets constitute a flow. The flow belongs to either a bandwidth-guaranteed class or a best-effort class. The output port 3 is particularly characterized by including a buffer memory 13 which temporarily stores a packet to be transmitted and an output port controller 20 which controls storage and reading out of a packet into and from a buffer memory 13. Referring to FIG. 1, the input port circuit 1 is a circuit at which an input packet arrives first and has the following three functions. The first function of the input port circuit 1 is to conduct a largest-length prefix matching search (hereinafter, referred to as an "LPM") to each arrived packet. The LPM search is a table search processing carried out to decide next hopping from a destination address included in an IP header. The second function is to classify a packet into service classes defined in advance so as to guarantee QoS. The third function is to execute a protocol processing for a data link layer. As the protocol, an SLIP (Serial Line Internet Protocol), a PPP (Point-to-Point Protocol), a PPTP (Point-to-Point Transfer Protocol) or the like is available.

In each input port circuit 1 shown in FIG. 1, arrived packets are inputted to a high-speed path controller 1a. The high-speed path controller 1a promptly outputs the packets needed to be processed at a high speed among the arrived packets to the switch fabric circuit 2 through a multiplexer 1d which time-division multiplexes the packets. Among the arrived packets, those which are not needed to be processed at a high speed are branched to a low-speed path queue memory 1b and the queue memory 1b stores the packets as temporary queues. A low-speed path controller 1c sequentially reads out the packets stored in the queue memory 1b, and then outputs the read-out packets to the switch fabric circuit 2 through the multiplexer 1d.

The switch fabric circuit 2 outputs the packets inputted from the input ports 1 to the corresponding output port circuits 3 connected with adjacent nodes through links, respectively, using a predetermined routing criterion under the control of a routing processor 4. That is, the switch fabric circuit 2 has a function for connecting each input port circuit 1 to each output port circuit 3. Currently employed techniques for the switch fabric circuit 2 involve a bus type technique, a cross bar technique, and a shared memory technique. One of these techniques can be appropriately selected for the switch fabric circuit 2. The routing processor 4 executes software for searching a forwarding table, installing a routing protocol, and setting and managing the router apparatus. The routing processor 4 also executes a packet having a destination address that is not input in the forwarding table.

Each output port circuit 3 functions to temporarily store a packet transferred through the switch fabric circuit 2 from the input port circuit 1 by routing until the packet is outputted to a link and functions to make scheduling related to the output of the packet to the link. The output port circuit 3 has a refined scheduling algorithm to support a priority or QoS guarantee. As the scheduling algorithm, a WRR or WFQ algorithm, for example, well known to those skilled in the art is available.

As shown in FIG. 1, each output port circuit 3 includes a header information acquisition unit 11, a temporary packet storage memory 12, a buffer memory 13, a packet transmitter 14, and an output port controller 20. The output port circuit 3 is particularly characterized by including the output port controller 20 that controls input and output of each arrived packet into and from the buffer memory 13 which includes a plurality of flow queue memories 13a and 13b.

In the output port circuit 3 shown in FIG. 1, the header information acquisition unit 11 reads out header information on the packet arriving from the switch fabric circuit 2, outputs the read-out header information to the output port controller 20, and also temporarily stores the arrived packet in the temporary packet storage memory 12. When a packet arrives, the output port controller 20 calculates a storage location of the arrived packet in the buffer memory 13 using only a signal indicating the header information on the arrived packet as input data, and outputs a signal that indicates the storage location to the temporary packet storage memory 12. When a packet is transmitted, the output port controller 20 inputs a service request signal (that is, a transmission request signal) from the packet transmitter 14, calculates a location in the buffer memory 13 to which the packet is transmitted, and outputs the operation result to the packet transmitter 14. When the signal that indicates the storage location is inputted to the temporary packet storage memory 12 from the output port controller 20, a packet is read out from the memory 12 and stored at the calculated storage location in the buffer memory 13. The buffer memory 13 is provided for storing packets. When arrived packets are stored in the buffer memory 13, the arrived packets can be stored therein separately according to flows to which the respective packets belong. FIG. 1 virtually shows that the packets are stored in the flow queue memories 13a, 13b, . . . in the buffer memory 13. The temporary packet storage memory 12 stores the arrived packets in the flow queue memories 13a, 13b, . . . corresponding to the flows to which the packet belong for each flow based on the storage location indication signal which is inputted to the memory 12 from the output port controller 20.

In the present preferred embodiment, as will be described later in detail with reference to FIGS. 3A, 3B and 3C, the buffer memory 13 can be divided to a plurality of blocks in advance and an arbitrary one of the blocks can be allocated for storage of an arbitrary flow. The packet transmitter 14 outputs the service request signal to the output port controller 20, reads out the packet from the buffer memory 13 based on the storage location information on the packet to be transmitted, which information is calculated by the output port controller 20 in response to the service request signal, and transmits the read-out packet to the adjacent node through a link.

In the router apparatus constituted as mentioned above, it is practical to provide a QoS control mechanism in the buffer memory (See FIG. 2) provided in the output port circuit 3 on which the traffic is concentrated so as to realize the QoS guarantee. Therefore, in the present preferred embodiment, there is provided an output port circuit of the router apparatus characterized by operating in cooperation with the following three functions: a basic volume allocation function, a pushout mechanism, and a hierarchical WRR. The present preferred embodiment is characterized by providing the output port circuit of the router apparatus which can particularly execute a processing related to a class-based quality control method by flow management. In the present preferred embodiment, with a view of the facilitation of executing the management method, a flow is defined as "a group of packet of same kinds present in the buffer memory of the output port circuit 3". That is, the output port circuit 3 recognizes that no flow is present when the number of packets of the kind belonging to the flow becomes zero even temporarily. This demonstrates that even if there are many flows that ca be managed, the flow number is equal to the size of buffer memory areas, which facilitates mounting. Now, the three functions will be described in detail using concrete examples.

FIG. 2 is a block diagram illustrating a detailed configuration of the output port circuit 3 shown in FIG. 1. Functional blocks of the output port controller 20 used to manage the buffer memory 13 will be described. Sections that function as calculation processing sections of the output port controller 20 mainly involve a pushout object block decision section 15, a storage block decision section 16, a storage location decision section 17, and a scheduler 18. The output port controller 20 also includes a free-space management section 21, a storage location management section 22, a flow management section 23, a class management section 24, a port management section 25, a previous service flow management section 26, a previous service class management section 27, a WRR flow order management section 28, a WRR class order management section 29, and a WRR port order management section 30, which sections are intended to respectively store, manage, and process different pieces of data.

When a packet arrives, the arrived packet is temporarily stored in the temporary packet storage memory 12 through the header information acquisition section 11. At the same time, header information on the arrived packet is acquired by the header information acquisition section 11 and only a signal indicating the acquired header information is outputted to the pushout object block decision section 15, the storage block decision section 16, and the storage location decision section 17. The pushout object block decision section 15 outputs block numbers of blocks in the buffer memory 13 that store packets belonging to a flow that may be discarded (hereinafter, referred to as a "pushout object flow") to the storage location decision section 17 based on data stored in the flow management section 23 and the class management section 24. The storage block decision section 16 decides a block in which the arrived packet is stored, based on the header information and data stored in the free-space management section 21. The storage location decision section 17 outputs a signal for instructing storage or discard of the arrived packet to the temporary packet storage memory 12 and updates the data in the respective management sections 21 to 30 based on the signals inputted to the storage location decision section 17 from the pushout object block decision section 15 and the storage block decision section 16.

The temporary packet storage memory 12 either writes the arrived packet to the buffer memory 13 or discards the arrived packet based on the signal from the storage location decision section 17. In the case of writing the arrived packet to the buffer memory 13, the temporary packet storage memory 12 writes the arrived packet in a block which stores a head packet of the pushout object flow. The reason for selecting the block which stores the head packet of the flow is that if a protocol such as TCP for detecting the discard of the packet is used, the packet discard can be advantageously detected at an earlier timing.

In a packet service phase, the packet transmitter 14 transmits a service request signal to the scheduler 18 to start the scheduler 18. Next, the scheduler 18 decides a storage location of the arrived packet and a transmitted packet while referring to the respective management sections 21 to 30, and returns data on the storage location and the transmitted packet to the packet transmitter 14. The packet transmitter 14 reads out the data stored at an address designated by the scheduler 18 from the buffer memory 13, restores the packet that are divided to blocks, and transfers the restored packet to the link.

In the present preferred embodiment, the output port controller 20 is preferably constituted by one integrated circuit chip to receive an input signal (i.e., the header information signal) upon arrival of a packet and an input signal (i.e., the service request signal) upon transmission of a packet, decide a block number in response to the received input signals, and output the decided block number. At this time, all the management sections 21 to 30 can be provided in the output port controller 20.

FIGS. 3A, 3B, and 3C are schematic explanatory views for explaining that the buffer memory 13 of the present preferred embodiment is divided to blocks. FIG. 3A shows that a packet arrives at the output port circuit 3 shown in FIG. 1. FIG. 3B shows a memory space of the buffer memory 13 shown in FIG. 2. FIG. 3C shows a transmitted packet from the output port circuit 3.

In the router apparatus of the present preferred embodiment, the output port controller 20 divides the buffer memory 13 to a plurality of blocks each having a fixed size L as shown in FIG. 3B to store and manage a packet if a location of the buffer memory 13 of the output port circuit 3 at which the packet is stored is managed. Addresses in the buffer memory 13 are managed as block numbers of the blocks thus divided. The arrived packet is divided to block sizes (i.e., blocks each having the fixed size L) and stored in the buffer memory 13. A segment that is below this block size is given blank data as shown in FIG. 3A and no other data is stored. The given blank data is discarded when the packet is transmitted as shown in FIG. 3C. By thus storing and managing the packet, it suffices that the storage location management section 22 prepares for a management table having as many rows as the blocks in the buffer memory 13. Further, a free space in the buffer memory 13 is also managed per block, a free block search processing during the packet arrival can be accelerated.

By dividing the buffer memory 13 to blocks as mentioned above, the router apparatus can prevent a situation of performance deterioration that occurs when the router apparatus processes a variable-length packet flowing on the Internet. In order to manage a packet storage situation in the buffer memory 13, the output port controller 20 characteristically includes management tables having a block number (which represents a block position) of a block which stores each packet and a state of connections of a plurality of blocks which store a flow which is constituted by including a plurality of packets.

The outline of management tables required for the output port controller 20 shown in FIG. 2 to manage the buffer memory 13 will be described.

Figures 4, 5:
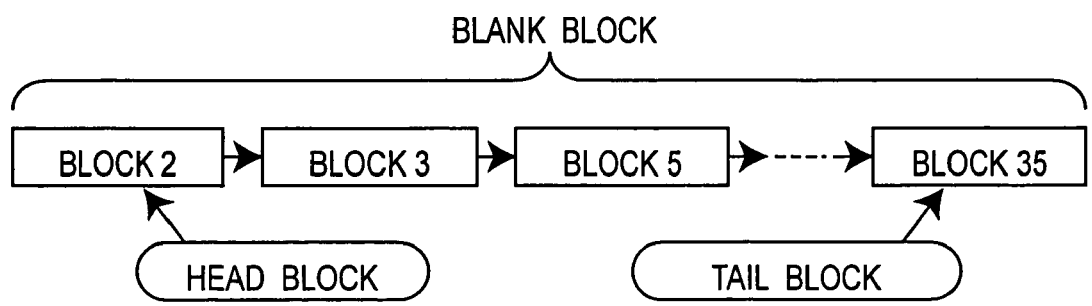
FIG. 4 shows one example of a schematic configuration of a free-space management table T1 managed by a free-space management section 21 shown in FIG. 2.
FIG. 5 is a schematic explanatory view for explaining free-space management using the free-space management table T1 shown in FIG. 4.

FIG. 4 is an illustration of one example of a schematic configuration of a free-space management table T1 managed by the free-space management section 21 shown in FIG. 2. FIG. 5 is a schematic explanatory view for explaining free-space management using the free-space management table T1 shown in FIG. 4.

As shown in FIG. 4, the free-space management table T1 stores a next block number to a block number of a certain block in the buffer memory 13.

The next block number indicates herein a free block connection state. In the example of FIG. 4, blocks 2, 3 and 5 having block numbers 2, 3 and 5, respectively are free blocks. In the free-space management table T1 shown in FIG. 4, the next block number to the block number 1 is "−1". This signifies that the block 1 is being used. The free-space management section 21 also stores and manages a head free block number and a tail free block number separately from the free-space management table T1. Consequently, the output port controller 20 can store and manage free blocks in a form of a list by outputting the head free block number during the free block search when the packet arrives or by changing the value of the tail free block number when the packet is transmitted.

A schematic explanatory view for the above-mentioned free-space management by the block management is shown in FIG. 5. FIG. 5 shows an example in which a series of free blocks are present in the buffer memory 13 while assuming that the block 2 is a head block and a block 35 is a tail block. However, it is noted that the free-space management section 21 stores and manages the block number of the head block and that of the tail block separately from the free-space management table T1.

Figures 6, 7:
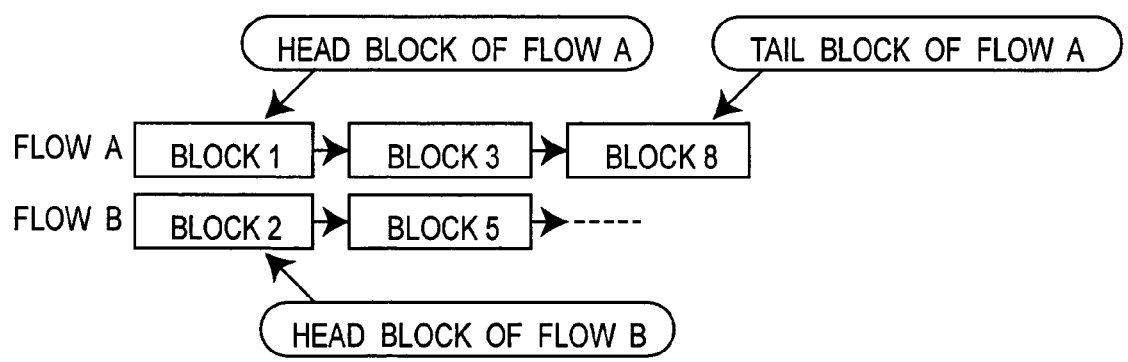
FIG. 6 show one example of a schematic configuration of a storage location management table T2 managed by a storage location management section 22 shown in FIG. 2.
FIG. 7 is a schematic explanatory view for explaining storage location managing using the storage location management table T2 shown in FIG. 6.

FIG. 6 is an illustration of one example of a schematic configuration of a storage location management table T2 managed by the storage location management section 22 shown in FIG. 2. FIG. 7 is a schematic explanatory view for explaining storage location management using the storage location management table T2 shown in FIG. 6.

As shown in FIG. 6, the storage location management table T2. stores a next block number to a block number of each block. The next block number indicates herein a block connection state in each flow. In the example of FIG. 6, blocks 1, 3 and 8 having block numbers 1, 3 and 8, respectively indicate a data arrival order for a certain flow. Each of blocks the next blocks to which having block numbers of "−1" (e.g., the blocks 4 and 8) indicates that the block is a tail block in a flow including the block and that data is not stored in the next block to the block. When a packet arrives, the storage location management section 22 acquires the tail block number of the flow to which the packet belongs and changes the next block number to the tail block number. This leads to that the storage location management section 22 can manage a data connection state. Further, the storage location management section 22 manages the flow by acquiring the block number of the head block of the flow and setting the next block number to the block number as a head block number of a block in a new flow when the packet is transmitted.

A schematic explanatory view for the above-mentioned storage location block management is shown in FIG. 7. In the example of FIG. 7, a flow "A" having the block 1 as a head block and a flow "B" having the block 2 as a head block are shown. Not the storage location management section 22 but the flow management section 23 manages information on the flows each including the blocks (e.g., information on head blocks and tail blocks of the respective flows A and B shown in FIG. 7).

Figures 8, 9:
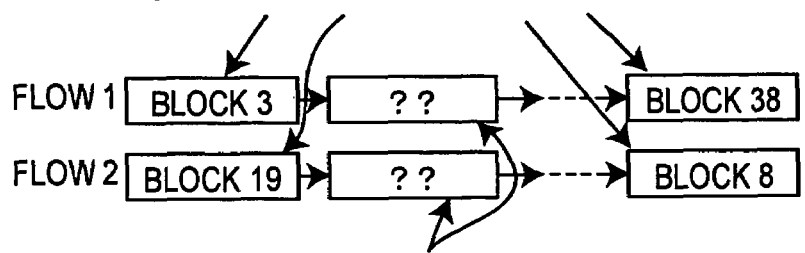
FIG. 8 show one example of a schematic configuration of a flow management table T3 for flows belonging to a bandwidth-guaranteed class, which table is managed by a flow management section 23 shown in FIG. 2.
FIG. 9 is a schematic explanatory view for explaining a management of a head block and a tail block using the flow management table T3 shown in FIG. 8.

FIG. 8 is an illustration of one example of a schematic configuration of a flow management table T3 which manages flows belonging to the bandwidth-guaranteed class managed by the flow management section 23 shown in FIG. 2. FIG. 9 is a schematic explanatory view for explaining the management of a head block and a tail block using the flow management table T3 shown in FIG. 8.

As shown in FIG. 8, the flow management table T3 stores and manages fives values, i.e., a basic volume, a used volume, a head block number, a tail block number, and a priority of each flow included in a certain class. First of all, the basic volume indicates a buffer memory volume allocated to each flow by the block length L of the buffer memory 13. As long as the flow does not use the storage area of the buffer memory 13 larger than the buffer memory volume, it is determined that the flow does not adversely influence the other flows. If each flow belongs to the bandwidth-guaranteed class, different basic volumes are allocated to the respective flows as shown in FIG. 8. If each flow belongs to a best-effort class, the basic volume allocated to the class is equally shared among the flows belonging to the class. Next, the used volume indicates a buffer memory volume (in a unit of block length L) actually used by the flow. The head block number indicates data that arrives first in the flow (i.e., the block that stores a packet including this data in the buffer memory 13). If a packet in the flow is serviced, the data stored in the block having this head block number is read out first from the buffer memory 13. The tail block number indicates a block that includes latest arriving data in the flow (i.e., the block that stores a packet including this data in the buffer memory 13). If the next data in the flow arrives, the block that stores a packet including the data is connected with the block having the tail block number using the next block number stored in the storage location management table T2. That is, when the storage location management table T2 is updated, the tail block number is read out and used to update the storage location management table T2. The priority is a value used upon allocating the basic volume and deciding a service order in the WRR. If each flow belongs to the bandwidth-guaranteed class, the respective flows are allocated different priorities as shown in FIG. 8. If each flow belongs to the best-effort class, a priority of the class to which the flow belongs is used as the priority of each flow.

A schematic explanatory view for the management of the head block and the tail block as mentioned above is shown in FIG. 9. As mentioned above, the flow management table T3 is employed to store and manage the head block and the tail block of each flow and the storage location management table T2 is employed to manage a block order of each flow.

FIG. 10 is a class management table T4 managed by the class management section 24 shown in FIG. 2. As shown in FIG. 10, the class management table T4 stores and manage four values, i.e., a basic volume, a used volume, the number of flows, and a priority of each class included in a certain port. The basic volume, the used volume, and the priority are similar to those in the flow management table T3. The number of flows, which indicates the number of flows present in the class, is used upon calculating a basic volume of each flow belonging to the best-effort class.

FIG. 11 is an illustration of one example of a schematic configuration of a port management table T5 managed by the port management section 25 shown in FIG. 2. As shown in FIG. 11, the port management table T5 stores and manages a basic volume, a used volume, the number of classes, and a priority of each port. In the table T5, the number of classes indicates the number of classes in which flows are present. In addition, as the priority, a value proportional to the output line speed of the router apparatus is stored.

Figures 12, 13, 14:
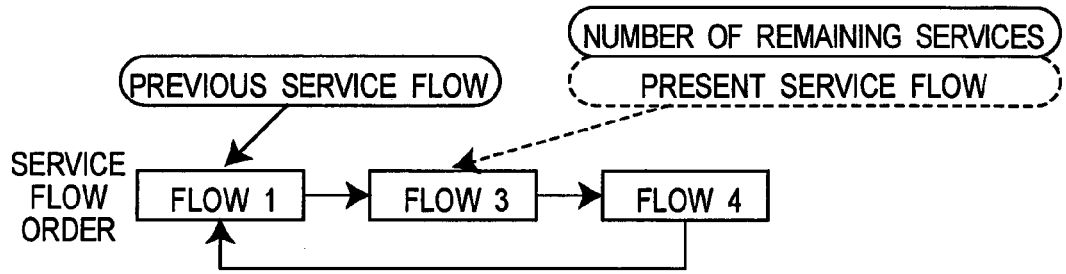
FIG. 12 show one example of a schematic configuration of a WRR flow order management table T6 managed by a WRR flow order management section 28 shown in FIG. 2.
FIG. 13 is a schematic explanatory view for explaining service flow order management using the WRR flow order management table T6 shown in FIG. 12.
FIG. 14 show one example of a schematic configuration of a previous service flow management table T7 managed by a previous service flow management section 26 shown in FIG. 2.

FIG. 12 is an illustration of one example of a schematic configuration of a WRR flow order management table T6 managed by the WRR flow order management section 28 shown in FIG. 2. FIG. 13 is a schematic explanatory view for explaining service flow order management using the WRR flow order management table T6 shown in FIG. 12.

As shown in FIG. 12, the WRR flow order management table T6 stores and manages a flow ID of a flow to be serviced next to a certain flow ID. In the example of FIG. 12, flows 1, 3 and 4 having flow ID's 1, 3 and 4, respectively, are repeatedly serviced in an order of "flow 1→flow 3→flow 4→flow 1, . . . ". In addition, an ID of a flow to be serviced next to the flow 2 is 5, which demonstrates that the flows 2 and 5 belong to a class different from the class to which the flows 1, 3 and 4 belong. If similar tables are prepared for classes and ports, hierarchical WRR can be realized.

That is, a WRR class order management table employed to decide an order for servicing a plurality of classes is provided to the WRR class order management section 29. A WRR port order management table employed to decide an order for servicing a plurality of ports is provided to the WRR port order management section 30.

A schematic explanatory view for the service order management using the WRR flow order management table T6 is shown in FIG. 13. As already described, the WRR flow order management table T6 holds information on a loop constituted by the flows 1, 3 and 4. As shown in FIG. 13, if the current service flow is the flow 3, the previous service flow management section 26 manages "a previous service flow" (i.e., the flow ID of the flow 1) and "the number of remaining services" as described later. However, information that the present flow 3 is serviced is not managed by the output port controller 20.

FIG. 14 is an illustration of one example of a schematic configuration of a previous service flow management table T7 managed by the previous service flow management section 26 shown in FIG. 2. As shown in FIG. 14, the previous service flow management table T7 stores and manages a previous service flow ID and the number of flow remaining services for a class ID of each class. If a service is started, the previous service flow management section 26 outputs the previous service flow ID in the class, and outputs a flow ID of a flow to be serviced next using the WRR flow order management table T6 based on the output flow ID. The number of remaining services indicates the number of times of continuously servicing the currently serviced flow. When the number of remaining services becomes 0, the previous service flow management section 26 updates the previous service flow ID. The reason of using not the flow ID of the current service flow but the previous service flow ID is as follows. If a new flow in the class arrives and the WRR flow order management table T6 registers a flow next to the previous service flow, the current service flow can be continuously serviced.

Figure 15A:
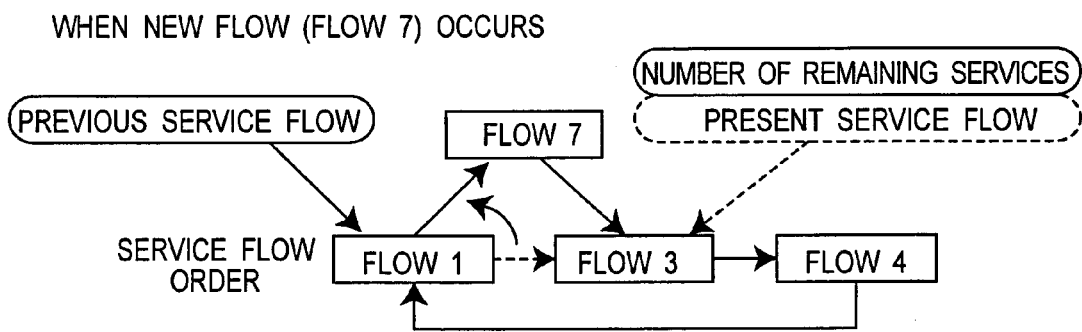
FIGS. 15A and 15B are schematic explanatory views for explaining service flow order management using the previous service flow management table T7 shown in FIG. 14, where
Figure 15B:
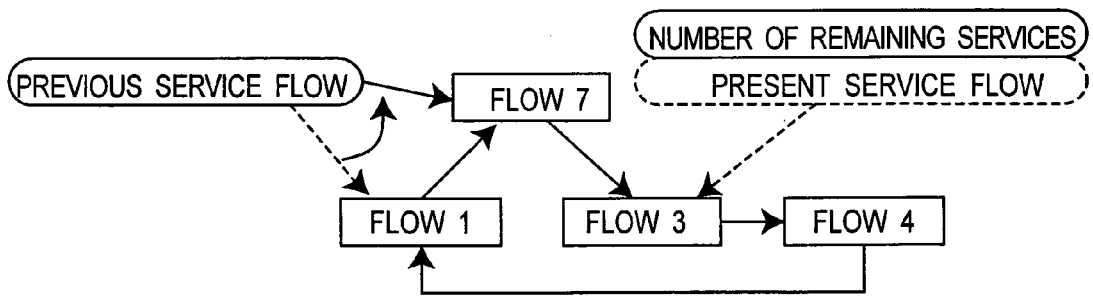

FIGS. 15A and 15B are schematic explanatory views for this previous service flow management and show a data update processing when a new flow occurs. Namely, FIGS. 15A and 15B are schematic explanatory views for explaining the management in the order of service flows using the previous service flow management table T7 shown in FIG. 14. FIG. 15A is an illustration of the previous service flow management when a new flow occurs, and FIG. 15B is an illustration of the data update processing after the state of FIG. 15A.

In the example of FIG. 15A, the current service flow is the flow 3, and the previous service flow is the flow 1. When a new arrived flow having a flow ID "7" occurs, the flow 7 is inserted next to the previous service flow or the flow 1, the previous service flow ID is updated to the flow ID "7" of the new arrived flow, and the data in the WRR flow order management table T6 is updated to have a service flow order of "flow 1→flow 7→flow 3→flow 4→flow 1→. . . ". As mentioned above, the previous service flow management section 26 stores and manages the "previous service flow" and "the number of remaining services" but does not manage the flow ID of the present flow.

Accordingly, when the new flow to be transmitted is stored in the buffer memory 13, the output port controller 20 updates the data in the WRR flow order management table T6 so as to designate the turn of the new flow next to that of the previous flow of the currently transmitted flow.

In a manner similar to that of the previous service flow management table T7, the previous service class management section 27 includes a previous service class management table for storing and managing a previous service class ID and the number of class remaining services for a port ID of each port.

A basic volume management method will next be described.

Figure 16:
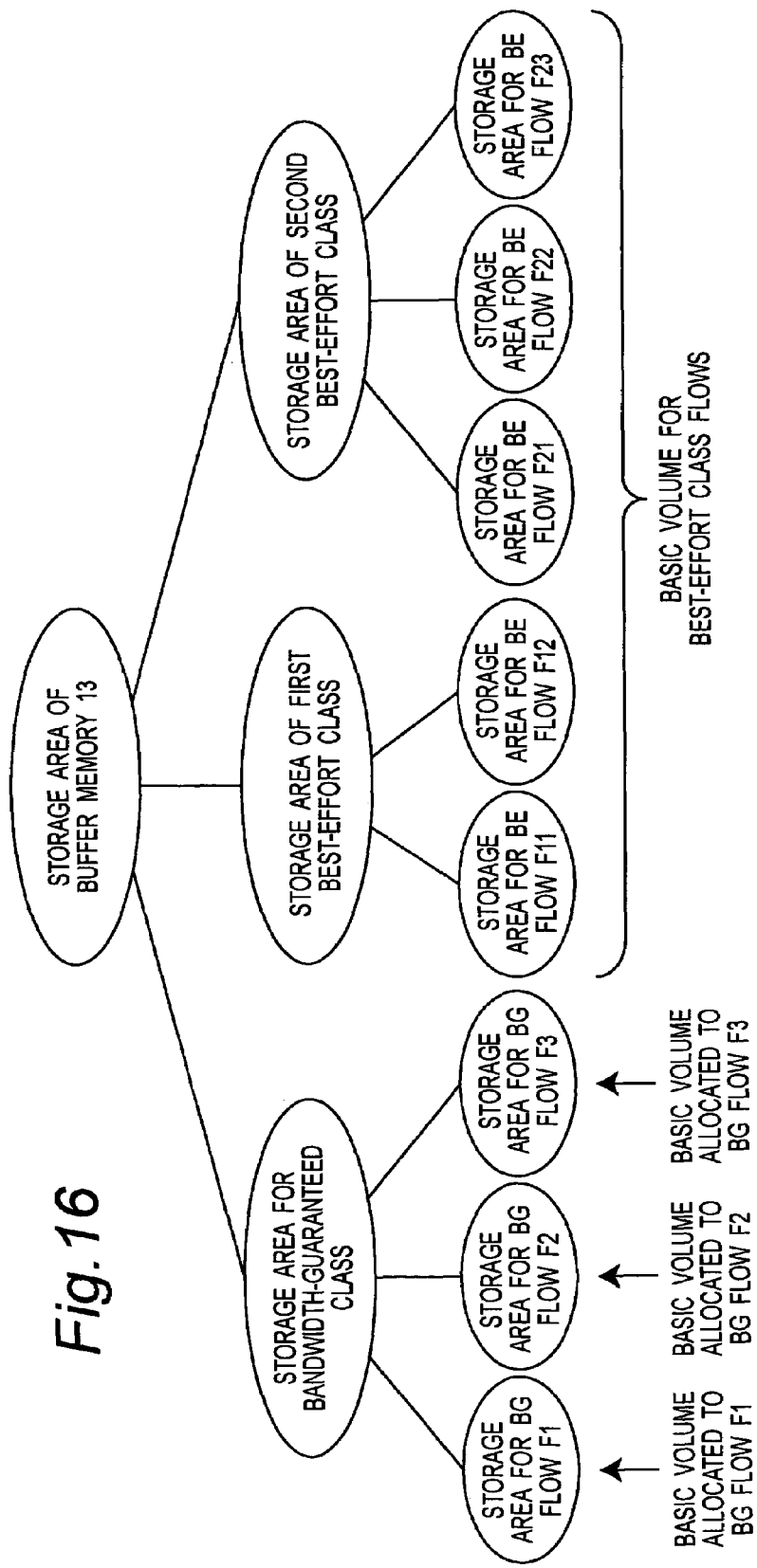
FIG. 16 is a schematic explanatory view for explaining a method of allocating a storage area of the buffer memory 13 shown in FIG. 2 to flows in a bandwidth-guaranteed class and flows in best-effort classes.

FIG. 16 is a schematic explanatory view for explaining a method of allocating the storage area of the buffer memory 13 to flows each belonging to a bandwidth-guaranteed class (hereinafter, referred to as a "BG class") and flows each belonging to best-effort class (hereinafter, referred to as a "BE class"). In the present preferred embodiment, a basic volume is managed per flow. A basic volume allocated to each flow in the BG class is fixed according to a priority of the flow. A basic volume allocated to each flow in the BE class (hereinafter, referred to as a "BE class basic volume") is allocated as follows. A remaining buffer volume, which is obtained by subtracting total basic volumes allocated to the flows in the BG class from a total buffer volume that is a total memory capacity of the buffer memory 13, is allocated to flows in the BE classes according to a priority of each flow. Namely, the BE class basic volume changes when a new flow occurs or when a flow is discarded.

If basic volumes of the entire flows are recalculated every time when the number of flows changes, the processing speed of the router apparatus extremely decreases. Therefore, in the present preferred embodiment, the basic volume management is carried out as shown in FIG. 16. First of all, for the flows in the BG class, since the basic volume of a flow is fixed according to the priority of the flow, the basic volume is managed per flow. For the flows in the BE classes, since the basic volume of a flow changes according to the number of flows, only the volume obtained by subtracting total basic volumes allocated to the BG class from the total buffer volume is stored and managed. By so storing and managing, when a flow belonging to the BG class occurs or is discarded, it suffices to change only the basic volume of the flow and the BE class basic volumes. On the other hand, when a flow belonging to the BE class occurs or is discarded, it is unnecessary to change the basic volume. However, since the basic volume is necessary upon calculating an excessively used volume, the operation of the basic volume is necessary whenever the excessively used volume is calculated, and the equations (5) and (6) therefore are as follows:

$$\text{Basic Volume of } BE \text{ Flow} = \qquad (5)$$
$$(BE \text{ Class Basis Volume}) \times \frac{\text{Priority of Own Class}}{\sum_{BE \text{ Classes}} (\text{Class Priority} \times \text{Number of Flows in Class})}$$

$$BE \text{ Class Basic Volume} = \qquad (6)$$
$$(\text{All Storage Areas of Buffer Memory 13}) - \sum_{BG \text{ Flows}} (BG \text{ Basic Volume}).$$

For the BE flows, the priority of each flow and the priority of the class including the flow are stored and managed as the same value.

In order to calculate a basic volume of a certain BE arrived flow, a product of a priority of each BE class and the number of flows that belong to the class is calculated for each BE class and the products of all BE classes are added up to calculate a total priority of the BE classes. By dividing the priority of the class to which the arrived flow belongs (this priority is equivalent to the priority of the arrived flow) by the calculated total priority, a basic volume allocation ratio for the arrived flow is decided.

By calculating a product of the basic volume allocation ratio and the BE class basic volume, the basic volume of the arrived flow can be calculated.

Accordingly, the output port controller 20 can individually allocate and manage the basic volume of each of the flows included in the BG class by as much as a memory size required by the flow and can manage the memory size, obtained by subtracting the respective basic volumes allocated to the BG class from the entire memory size of the buffer memory 13 by collectively allocating and storing the memory size.

A method of managing the most excessive class and the most excessive flow will be described.

When a packet arrives while the buffer memory 13 is full, a packet in the other flow can be pushed out as long as a flow to which the arrived packet belongs does not excessively use the storage area of the buffer memory 13 beyond its basic volume. The pushout object flow is a flow that most excessively uses the storage area of the buffer memory 13 beyond its basic volume (hereinafter, referred to as "most excessive flow"). In order to quickly decide the pushout object flow upon arrival of a packet, it is necessary to manage the most excessive class that most excessively uses the storage area of the buffer memory 13 beyond its basic volume and store and mage the most excessive flow of each class.

Figure 17:
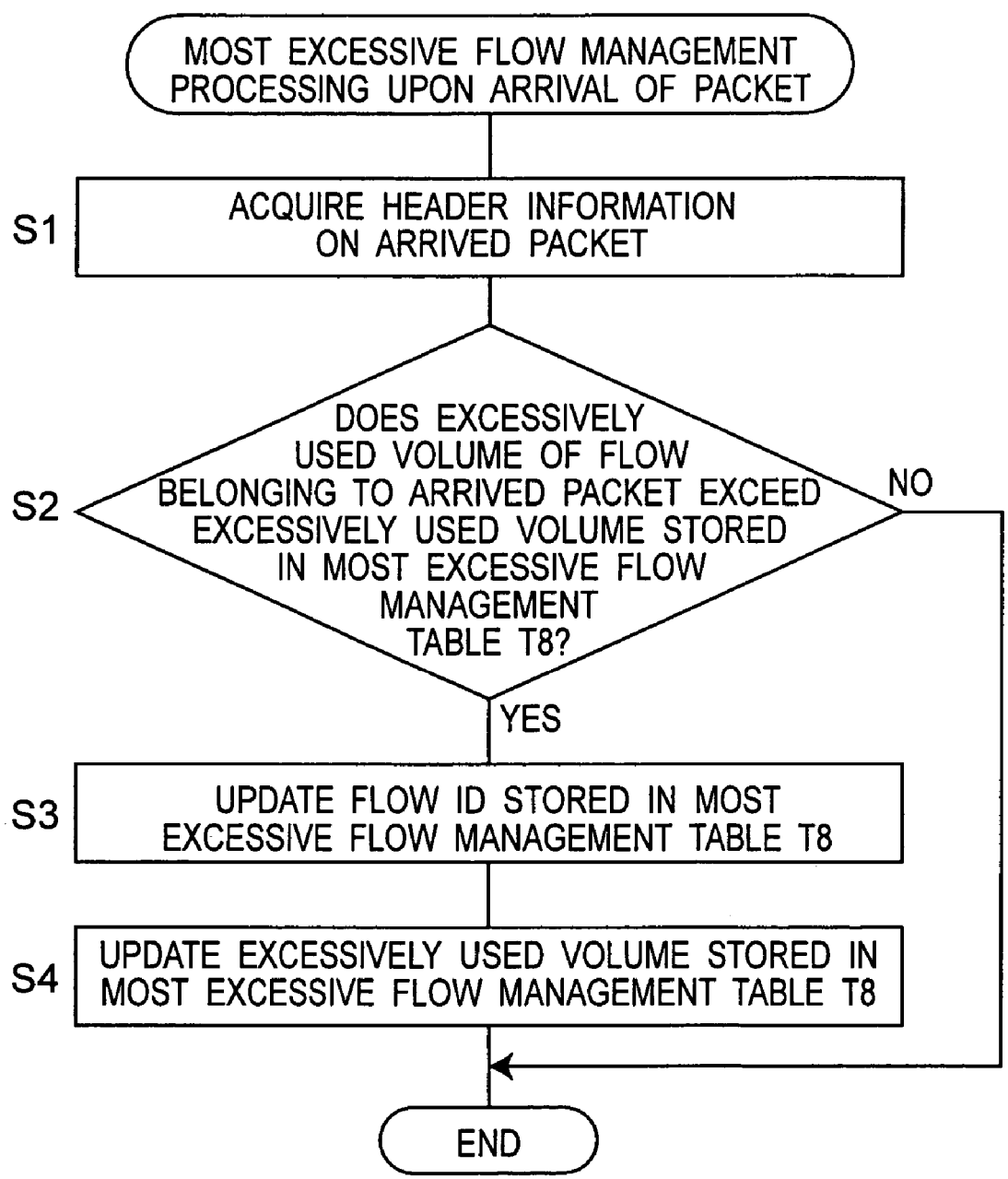
FIG. 17 is a flow chart illustrating the most excessive flow management processing executed by a storage location decision section 17 shown in FIG. 2 upon arrival of a packet.
Figure 18:
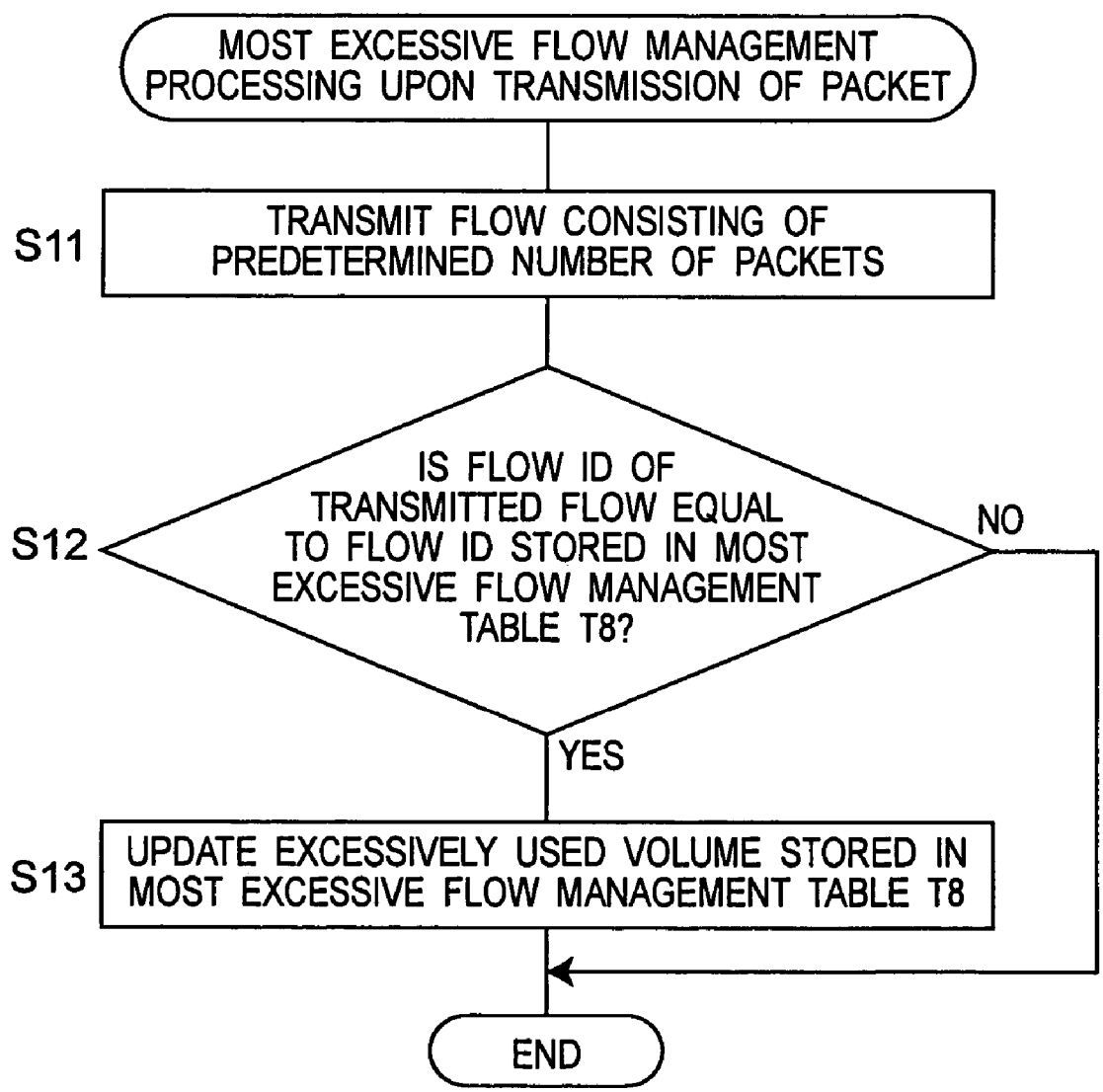
FIG. 18 is a flow chart illustrating the most excessive flow management processing executed by a scheduler 18 shown in FIG. 2 during transmission of a packet.

If a management method by checking excessively used volumes of all flows and deciding the most excessive flow is used, processing time lengthens even if the controller operates periodically. Therefore, in the present preferred embodiment, the most excessive class and the most excessive flow are managed as shown in FIGS. 17 and 18. The most excessive flow management table T8 employed herein stores an excessively used volume for each flow ID as shown in FIGS. 19A, 19B, 19C and 19D.

FIG. 17 is a flow chart illustrating the most excessive flow management processing executed by the storage location decision section 17 shown in FIG. 2 upon arrival of a packet.

Referring to FIG. 17, when a packet arrives, the storage location management section 17 acquires header information on the arrived packet at step S1, and compares an excessively used volume of a flow to which the arrived packet belongs with an excessively used volume of the most excessive flow stored and managed by the most excessive flow management table T8 at step S2. If the excessively used volume of the arrived flow is larger ("YES" at step S2), the storage location decision section 17 updates the flow ID stored in the most excessive flow management table T8 at step S3. At step S4, the storage location decision section 17 updates the excessively used volume stored in the most excessive flow management table T8 and finishes the management processing. If the excessively used volume of the most excessive flow stored in the most excessive flow management table T8 is larger ("NO" at step S2), the storage location decision section 17 finishes the management processing without changing the management data.

FIG. 18 is a flow chart illustrating a most excessive flow management processing executed by the scheduler 18 of FIG. 2 upon transmission of a packet.

Referring to FIG. 18, at step S11, the scheduler 18 transmits a flow constituted by a predetermined number of packets. At step S12, the scheduler 18 determines whether a flow ID of a flow to which the transmitted packet belong with the ID of the most excessive flow stored and managed by the most excessive flow management table T8. If the ID's coincide ("YES" at step S12), the scheduler 18 updates the excessively used volume of the most excessive flow stored and managed by the most excessive flow management table T8 at step S13 and finishes the management processing. If the flow ID's do not coincided ("NO" at step S12), the scheduler 18 finishes the management processing without changing the management data. By executing this method, it is unnecessary to check the excessively used volumes of all flows.

FIGS. 19A, 19B, 19C and 19D are schematic explanatory views for explaining most excessive flow management using the most excessive flow management table T8 managed by the class management section 24 shown in FIG. 2. The operations for the most excessive flow management will be concretely described using the examples shown in FIGS. 19A to 19D.

The class management section 24 stores and manages a flow ID of a flow having the most excessively used volume and the excessively used volume of the flow using the most excessive flow management table T8 (it is noted that the block length L of each block in the buffer memory 13 is a unit). FIG. 19A shows (a1) the most excessive flow management table T8 in an initial state and (a2) a current state of an excessively used volume of each flow. The most excessive flow management table T8 shown in FIG. 19A shows that the flow 1 is the most excessive flow and the excessively used volume of the flow 1 is 12. FIG. 19B shows (b1) the most excessive flow management table T8 when the flow 3 having a packet size of 2 arrives after the state shown in FIG. 19A and (b2) a current state of an excessively used volume of each flow. In FIG. 19B, since the size of the arrived packet is 2, the excessively used volume of the flow 3 is 13. The class management section 24 compares this value with the excessively used volume of the most excessive flow 1 stored and managed. In this case, since the excessively used volume of the arrived flow 3 is larger, the class management section 24 changes the management data in the most excessive flow management table T8 so that the flow ID is 3 and the excessively used volume of the flow 3 is 13. FIG. 19C shows (c1) the most excessive flow management table T8 when the flow 3 having a packet size of 2 is transmitted and (c2) a current state of an excessively used volume of each flow. In FIG. 19C, the flow ID of the transmitted flow coincides with the flow ID managed by the most excessive flow management table T8. Therefore, the class management section 24 changes the excessively used volume stored and managed. At this time, there is caused a state in which the flow ID of the most excessive flow is not properly managed. However, this state is not considered to influence the packet transmission and reception performance of the router apparatus of the present preferred embodiment for the following reasons. Since the state is a state of the management table when the packet is transmitted, the buffer memory 13 never fails to include a free space. The managed flow excessively uses the storage area of the memory buffer 13 beyond its basic volume. Further, FIG. 19D shows (d1) the most excessive flow management table T8 when the flow 1 having a packet size of 2 arrives and (d2) a current state of the most excessively used volume of each flow. In FIG. 19D, the excessively used volume of the arrived flow exceeds the managed excessively used volume. Therefore, the class management section 24 changes the management data, so that the state turns into a state in which the most excessive flow is properly managed.

Therefore, when a packet belonging to a predetermined flow arrives and a flow having an excessively used volume larger than the stored and managed excessively used volume occurs, the output port controller 20 can update the flow ID and the excessively used volume to the flow ID of the flow to which the arrived packet belongs and the excessively used volume of the flow. When a packet belonging to a flow which most excessively uses the storage area of the buffer memory 13 beyond its basic volume is transmitted from the router apparatus, the output port controller 20 can update only the stored and managed, excessively used volume to the excessively used volume after the transmission of the flow.

In the present preferred embodiment, when the pushout object packet is searched while managing the most excessive flow as mentioned above, the search is not influenced by the other flows as long as a basic volume of the BG class is secured by as much as the bandwidth. Further, even if a flow belonging to the other port operates beyond expectations, the influence of the unexpected operation of the flow can be minimized thanks to the effect of the basic volume allocation. In addition, by sharing the buffer memory 13 among a plurality of ports, an advantage of improving throughput for uneven traffic. The pushout mechanism of the present preferred embodiment, in particular, dynamically changes a priority of a packet according to the used volume exceeding the basic volume differently from a method of setting the packet priority in advance.

More concrete implemental examples of the preferred embodiment according to the present invention will be described. For brief explanation, it is assumed hereafter that a plurality of ports are not managed but only a plurality of classes and a plurality of flows are stored and managed. However, it is contemplated that the present preferred embodiment can be similarly carried out even if a plurality of ports are present. For this brevity, operations of the port management section 25 and the WRR port order management section 30 will not be described herein.

FIG. 20 is a block diagram illustrating a detailed configuration of the storage location decision section 17 and a storage location decision processing flow. As shown in FIG. 20, the storage location decision section 17 is constituted by including a selector 35, a post-processing front-end processing section 36, and a packet storage post-processing section 37.

A flow of a storage location decision processing for an arrived packet will be described with reference to FIG. 20. When header information such as a flow ID of the arrived packet is inputted to the output port controller 20 from the header information acquisition unit 11, the pushout object block decision section 15 starts a pushout search and, at the same time, the storage block decision section 16 starts a storage location search. In the pushout search, the pushout object decision section 15 outputs a block number of a pushout object block while referring to the header information and the data in the flow management section 23 and the class management section 24 if excessive data in the buffer memory 13 is discarded for the arrived flow. Further, the pushout object decision section 15 decides whether a used volume of a flow to which the arrived packet belongs exceeds a basic volume of the flow, and then outputs data on the excessively used volume. In the storage location search, the storage block decision section 16 outputs a block number of a block in which the arrived flow is stored without being pushed out while referring to the header information and the data in the free-space management section 21 if a free space is present in the buffer memory 13. If the buffer memory 13 is full, the storage block decision section 16 outputs a special value that represents a pushout request as a pushout request signal.

The selector 35 refers to results of the pushout search and the storage location search. If the free space is present in the buffer memory 13, the selector 13 selects the block number output from the storage block decision section 16. If no free space is present in the buffer memory 13 and the storage block decision section 16 outputs the pushout request signal, the selector 35 selects the block number output from the pushout object block decision section 15. If no free space is present in the buffer memory 13 and the excessively used volume of the flow to which the arrived packet belongs is a positive number, the selector 35 selects the discard of the arrived packet. The post-processing front-end processing section 36 decides the excessively used volume of the most excessive flow based on the header information and the data in the flow management section 23. If the selector 35 decides the storage block number, the packet storage post-processing section 37 updates the data in the respective management sections 21 to 24 and 26 to 29, as a post processing, based on output signals from the selector 35 and the post-processing front-end processing section 36. Further, the packet storage post-processing section 37 outputs either a signal that indicates the block number of the block which stores the arrived packet in the buffer memory 13 or a signal that instructs the arrived packet to be discarded, to the temporary packet storage memory 12, and either stores the packet in the temporary packet storage memory 12 in the block in the buffer memory 13 or discards the packet.

Figure 21:
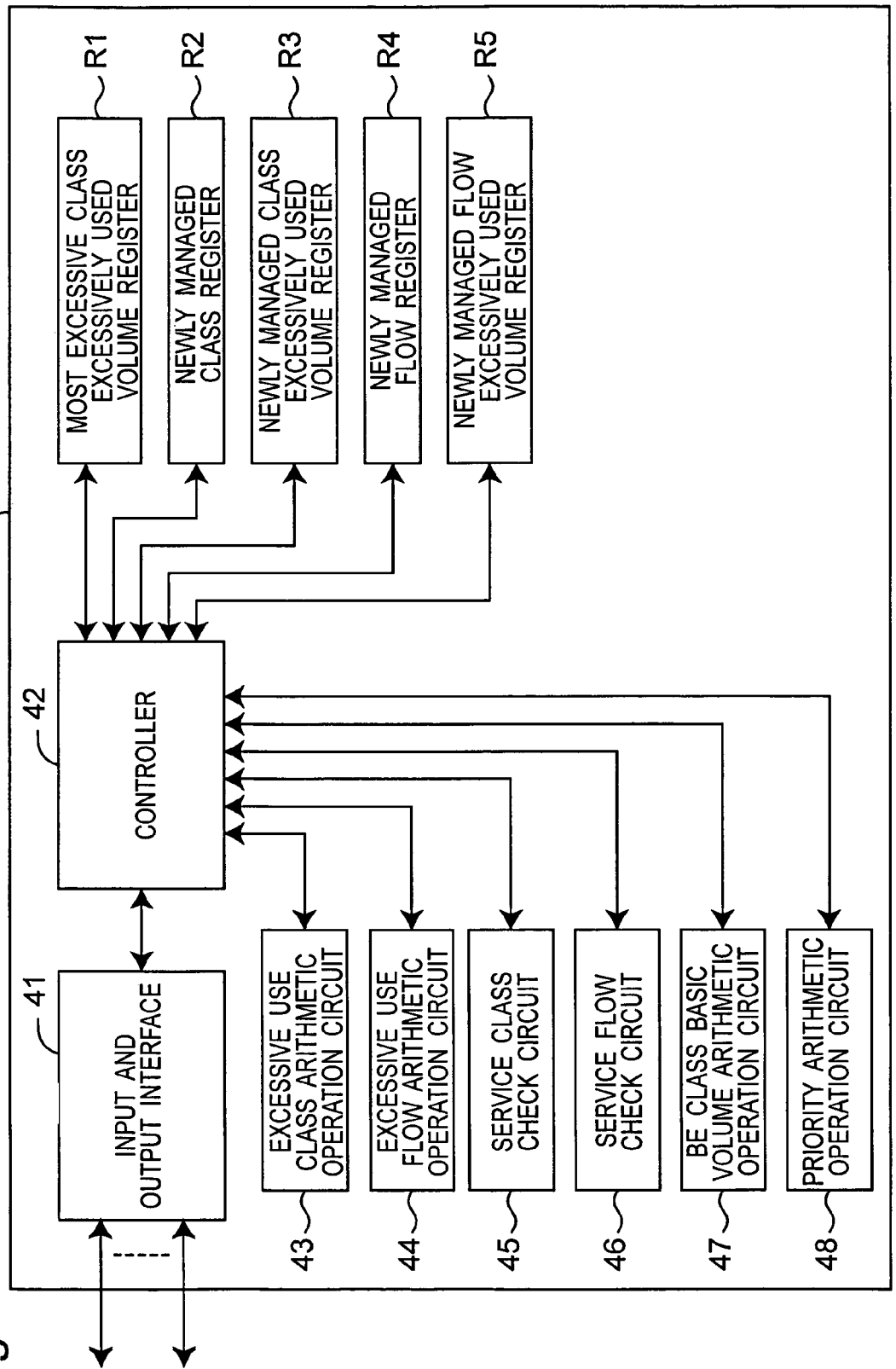
FIG. 21 is a block diagram illustrating a detailed configuration of a packet storage post-processing section 37 shown in FIG. 20.

FIG. 21 is a block diagram illustrating a detailed configuration of the packet storage post-processing section 37 shown in FIG. 20. As shown in FIG. 21, an excessive use class arithmetic operation circuit 43, an excessive use flow arithmetic operation circuit 44, a service class check circuit 45, a service flow check circuit 46, a BE class basic volume arithmetic operation circuit 47, a priority arithmetic operation circuit 48, the most excessive class excessively used volume register R1, a newly managed class register R2, a newly managed class excessively used volume register R3, a newly managed flow register R4, and a newly managed flow excessively used volume register R5 are connected with a controller 42. The controller 42 controls the connected internal circuits 43 to 48 and the registers R1 to R5 to input and output data into and from an external circuit through an input and output interface 41.

Referring to FIG. 21, the most excessive class excessively used volume register R1 stores an excessively used volume of the most excessive class, the newly managed class register R2 stores a class ID of the most excessive class, the newly managed class excessively used volume register R3 stores a class used volume of the most excessive class, the newly managed flow register R4 stores a flow ID of the most excessive flow in an arrived class, and the newly managed flow excessively used volume register R5 stores an excessively used volume of the most excessive flow.

The excessive use class arithmetic operation circuit 43 calculates the most excessive class and the class used volume of the most excessive class based on the class ID of an arrived packet, the excessive used volume of the class to which the arrived packet belongs, the value stored in the most excessive class register 24d, and the value stored in the most excessive class excessively used volume register R1. The excessive use flow arithmetic operation circuit 44 calculates the most excessive flow in the arrived class and the excessively used volume of the most excessive flow based on the flow ID of the arrived packet, the excessively used volume of the flow to which the arrived packet belongs, the most excessive flow in the arrived class, and the excessively used volume of the most excessive flow. The service class check circuit 45 decides a previous service class when the packet arrives. If the arrived class is a new class, that is, if a packet belonging to the class is not present so far, the service class check circuit 45 outputs the class ID of the arrived class so that the new arrived class is dealt with as a previous service class and the turn of the arrived class is set as the last turn in the WRR order. If the arrived class is not a new class, the managed previous service class is used as the previous service class as it is, and therefore, the service class check circuit 45 outputs a class ID of the already managed previous service class.

The service flow check circuit 46 decides a previous service flow when the packet arrives. If the arrived flow is a new flow, the service flow check circuit 46 outputs the flow ID of the arrived flow so as to deal with the arrived flow as the previous service flow. If the arrived flow is not a new flow, the managed previous service flow is used as the previous service flow as it is, and therefore, the service flow check circuit 46 outputs a flow ID of the previous service flow. The BE class basic volume arithmetic operation circuit 47 recalculates a BE class basic volume described above with reference to FIG. 16 if the arrived flow is a new flow and the class to which the arrived flow belongs is a BG class. The BE class basic volume arithmetic operation circuit 47 calculates a basic volume of the arrived flow based on the arrived class ID. If the arrived flow belongs to the BG class, the BE class basic volume arithmetic operation circuit 47 subtracts the basic volume of the arrived flow from the BE class basic volume and outputs a subtraction result. If the arrived flow belongs to the BE class, the BE class basic volume arithmetic operation circuit 47 outputs the already managed BE class basic volume as it is. If the arrived flow is a new flow, the priority arithmetic operation circuit 48 increases a class priority of the class to which the arrived flow belongs by a priority of one flow decided for each class in advance.

Figure 22:
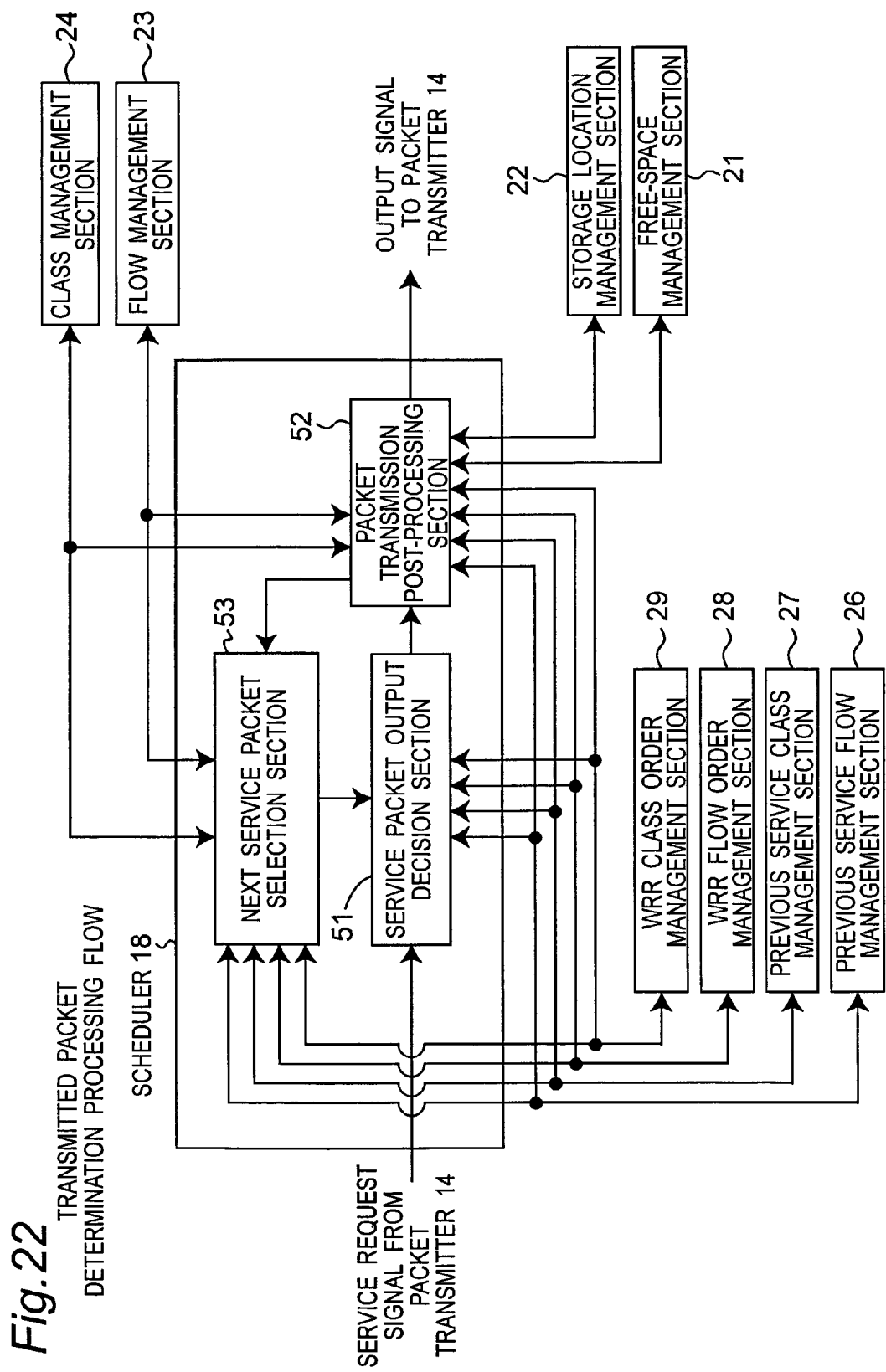
FIG. 22 is a block diagram illustrating a detailed configuration of a scheduler 18 shown in FIG. 2 and a transmitted packet decision processing flow.

FIG. 22 is a block diagram illustrating a detailed configuration of the scheduler 18 and a transmitted packet decision processing flow. As shown in FIG. 22, the scheduler 18 is constituted by including a service packet output decision section 51, a packet transmission post-processing section 52, and a next service packet selection section 53.

A flow of a transmitted packet decision processing carried out in response to a service request will be described with reference to FIG. 22. When the packet transmitter 14 inputs a service request signal to the scheduler 18, the service packet output decision section 51 of the scheduler 18 refers to the respective management sections 26 to 29, and then outputs a next service block number decided by the next service packet selection section 53 in advance. The packet transmission post-processing section 52 outputs the next service block number as an output signal to the packet transmitter 14, and updates the data in the management sections 21 to 24 and 26 to 29 as a post processing. Thereafter, during a packet service, the next service packet selection section 53 decides a next service packet based on the signal from the packet transmission post-processing section 52 and the data stored in the respective management sections 23, 24 and 26 to 29.

Since a packet normally has a variable length, a block-based processing is carried out in the present preferred embodiment. Due to this, the output port controller 20 needs to notify the packet transmitter 14 of the end of the packet. Therefore, a flag is prepared as an output of the output port controller 20. While the flag is "1", this indicates that the packet continues.

Figure 23:
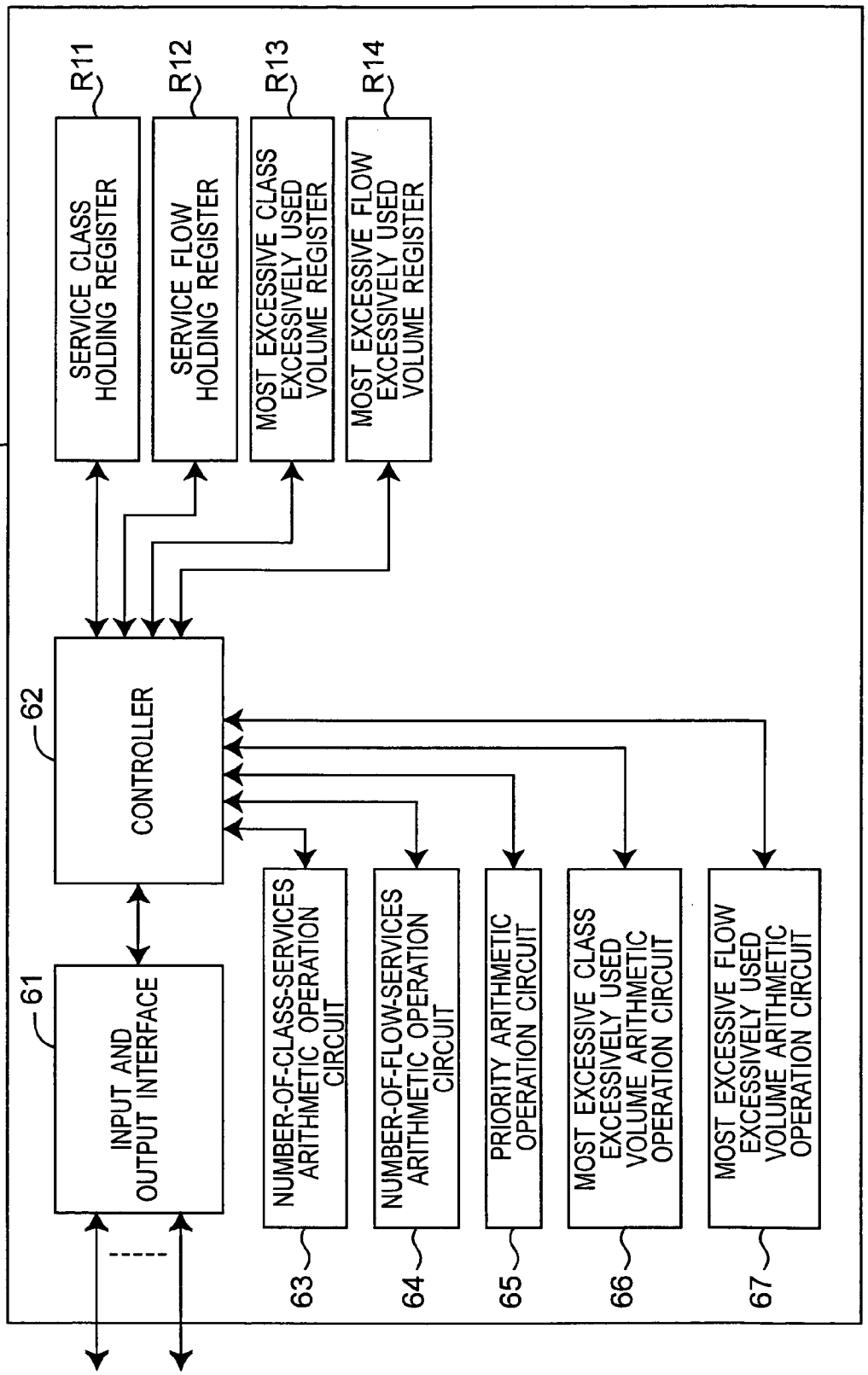
FIG. 23 is a block diagram illustrating a detailed configuration of a packet transmission post-processing section 52 shown in FIG. 22.

FIG. 23 is a block diagram illustrating a detailed configuration of the packet transmission post-processing section 52 shown in FIG. 22. As shown in FIG. 23, a number-of-class-services arithmetic operation circuit 63, a number-of-flow-services arithmetic operation circuit 64, a priority arithmetic operation circuit 65, the most excessive class excessively used volume arithmetic operation circuit 66, the most excessive flow excessively used volume arithmetic operation circuit 67, a service class holding register R11, a service flow holding register R12, the most excessive class excessively used volume register R13, and the most excessive flow excessively used volume register R14 are connected with a controller 62. The controller 62 controls the internal circuits 63 to 67 and the registers R11 to R14 to input and output data into and from an external circuit through an input and output interface 61.

Referring to FIG. 23, the service class holding register R11 stores a class ID of a service class, and the service flow holding register R12 stores a flow ID of a service flow from a WRR flow order management table memory 28c described later with reference to FIG. 34. The most excessive class excessively used volume register R13 stores an excessively used volume of the most excessive class, and the most excessive flow excessively used volume register R14 stores an excessively used volume of the most excessive flow.

The number-of-class-services arithmetic operation circuit 63 decides a previous service class ID and calculates the number of remaining services. Normally, the circuit 63 merely subtracts 1 from the number of remaining services. If a value before the subtraction is 1, a service order changes. Due to this, the number-of-class-services arithmetic operation circuit 63 changes the previous service class ID to the current service class ID and, at the same time, calculates the number of services of a class to be serviced next. The number-of-flow-services arithmetic operation circuit 64 decides a previous service flow ID and calculates the number of remaining services. Normally, the circuit 64 merely subtracts 1 from the number of remaining services. If a value before the subtraction is 1, the service order changes. Due to this, the number-of-flow-services arithmetic operation circuit 64 changes the previous service flow ID to the current service flow ID and, at the same time, calculates the number of services of a flow to be serviced next.

If there is no flow to be serviced (i.e., if no packet is stored in the buffer memory 13), the priority arithmetic operation circuit 65 subtracts a class priority of the class to which the arrived packet belongs by a priority of one flow decided for each class in advance. If the managed most excessive class ID is equal to the serviced class ID, the most excessive class excessively used volume arithmetic operation circuit 66 subtracts 1 from the most excessive class excessively used volume; otherwise, the circuit 66 outputs the managed most excessive class excessively used volume as it is. If the managed most excessive flow ID is equal to the serviced flow ID, the most excessive flow excessively used volume arithmetic operation circuit 67 subtracts 1 from the most excessive flow excessively use volume; otherwise, the circuit 67 outputs the managed most excessive flow excessively used volume as it is.

For brief description, the following assumptions are further made in the present preferred embodiment. First of all, it is assumed that one packet can be stored in one of the blocks of the buffer memory 13. This can omit providing a connection flag function of the packet divided to blocks. Second, an environment in which the buffer memory 13 is not shared among a plurality of ports is assumed. This can omit providing the management mechanism per unit. Those skilled in the art could easily understand a method of carrying out the router apparatus of the present preferred embodiment even if these assumptions and omissions are not made.

It is also assumed hereafter that a bit width of a flow ID is an F bits, a bit width of a class ID is a C bits, and a bit width of a priority is W bits, that is, these bit widths are set as parameters to expand hardware design. If the bit width of the flow ID is set to F bits, the number of manageable flows is $2^F-1$ (to give a special meaning to a value indicating that every bit is "1".

When the output port controller 20 of the present preferred embodiment is provided, the management tables which have been conceptually described with reference to FIGS. 4 to 19A-19D are divided in order to accelerate a signal processing speed. By dividing the management tables, it is possible to prevent signal collision due to simultaneous access to the respective management tables. Concretely speaking, the flow management table T3, which will be described later with reference to FIGS. 28 to 33, is divided to a basic volume management table memory 23c, a flow used volume management table memory 23d, a head block management table memory 23e, a tail block management table memory 23f, and a flow priority register 23g which will be described later with reference to FIG. 28. The class management table T4 is divided to the most excessive flow register 24c, the most excessive class register 24d, a class priority register 24e, a BE class basic volume register 24f, a class used volume management table memory 24g, a number-of-class-flows management table memory 24h, and the most excessive flow excessively used volume management table memory 24i (See FIG. 30). The previous service flow management table T7 is divided to a previous service flow management register 26c and a number-of-flow-remaining-services register 26d (See FIG. 32). The previous service class management table 27 is divided to a previous service class management register 27c and a number-of-class-remaining-services register 27d (See FIG. 33). In the following description, management sections that assist in accessing the management tables thus divided will be defined.

Figures 24, 25A, 25B, 25C, 25D:
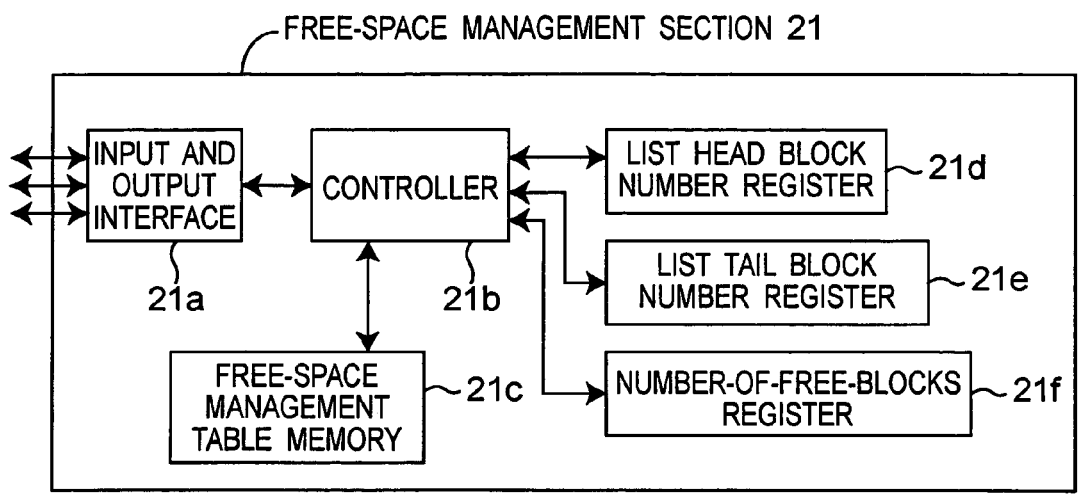
FIG. 24 is a block diagram illustrating a detailed description of a free-space management section 21 shown in FIG. 2.
FIGS. 25A, 25B, 25C and 25D show one example of data managed by the free-space management section 21 shown in FIG. 24, where

FIG. 24 is a block diagram illustrating a detailed description of the free-space management section 21 shown in FIG. 2. As shown in FIG. 24, a free-space management table memory 21c, a list head block number register 21d, a list tail block number register 21e, and a number-of-free-blocks register 21f are connected with a controller 21b. The controller 21b controls the internal circuits such as the memory and registers 21c to 21f to input and output data into and from an external circuit through an input and output interface 21a. FIGS. 25A, 25B, 25C and 25D show one example of the data managed by the free-space management section 21 shown in FIG. 24. FIG. 25A is an illustration of one example of a free-space management table stored in the free-space management table memory 21c. FIG. 25B is an illustration of one example of a list head block number in the list head block number register 21d. FIG. 25C is an illustration of one example of a list tail block number in the list tail block number register 21e. FIG. 25D is an illustration of one example of the number of free blocks in the number-of-free-blocks register The free-space management section 21 shown in FIG. 24 manages a free space in the buffer memory 13 in the form of a list and performs a basic operation, that is, outputs block numbers of blocks that correspond to the free space at each clock. The block numbers are used to search a free block number when a packet arrives. A free block addition processing and a free block deletion processing are completed within one clock. Table 1 shows sizes of data managed by the free-space management section 21.

TABLE 1

| Size of data managed by free-space management section 21 |
| --- |
| Free-space management table: F bits × ($2^F - 1$) rows |
| List head block number (Front): F bits |
| List tail block number (Last): F bits |
| The number of free blocks (Num): F bits |

The outline of the data managed by the free-space management section 21 will next be described. As shown in FIG.

25A, the free-space management table stored in the free-space management table memory 21 stores and manages a block number of a next free block as "next block number" for each block number. In the example of FIG. 25A, the block number of the next block to a block having a block number "1" is "2". As shown in FIG. 25B, by storing and managing "list head block number" as a different value from "next block number", the free block number can be discovered without searching the free-space management table. Further, as shown in FIG. 25C, "list tail block number" is stored and managed so as to be used when a new free block is added. By changing a value on the free-space management table relative to this block number, the addition processing can be carried out at a high speed. As shown in FIG. 25A, "−1" is stored as a value on the free-space management table for each block number of a non-free block (e.g., block 0).

Figures 26, 27:
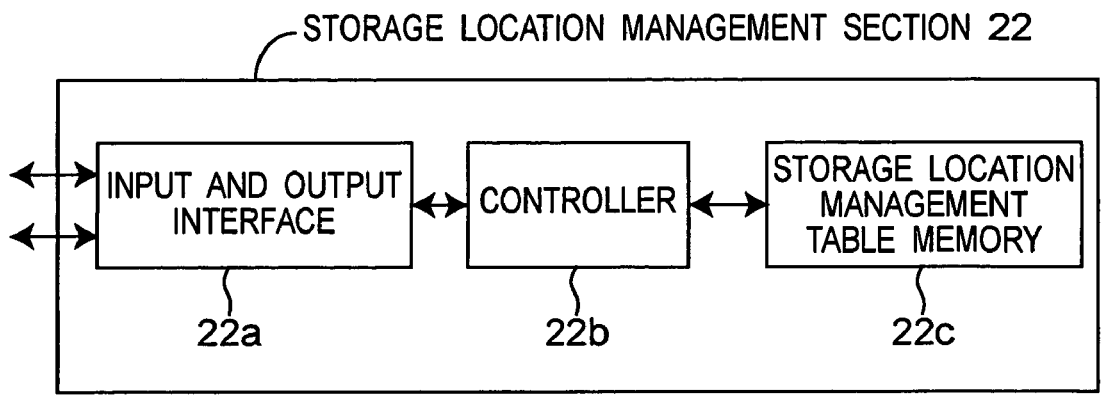
FIG. 26 is a block diagram illustrating a detailed configuration of the storage location management section 22 shown in FIG. 2.
FIG. 27 shows one example of a storage location management table managed by the storage location management memory 22c shown in FIG. 26.

FIG. 26 is a block diagram illustrating a detailed configuration of the storage location management section 22 shown in FIG. 2. As shown in FIG. 26, a storage location management memory 22c is connected with a controller 22b and the controller 22b controls the storage location management table memory 22c to input and output data into and from an external circuit through an input and output interface 22a. FIG. 27 shows one example of the storage location management table managed by the storage location management memory 22c shown in FIG. 26.

The storage location management section 22 shown in FIG. 26 stores and manages a data connection state in each flow and performs a basic operation, that is, outputs the next block number in the same flow in response to a block number as an input signal. This next block number is employed to search a block number of a block to be serviced next when a certain number is serviced. The storage location management section 22 outputs a resulting output signal, one clock after the input signal in response to the input signal in an operation cycle. The size of the storage location management table stored and managed by the storage location management section 22 is F bits×($2^F$−1) rows. The storage location management table stored in the storage location management table memory 22c stores shown in FIG. 26 and manages the "next block number" to each block number. In the example of FIG. 27, data stored in a block having a block number "6" is present as data continuous to data stored in a block having a block number "1". If no next data is present, "−1" is stored in the storage location management table memory 22c.

Figure 28:
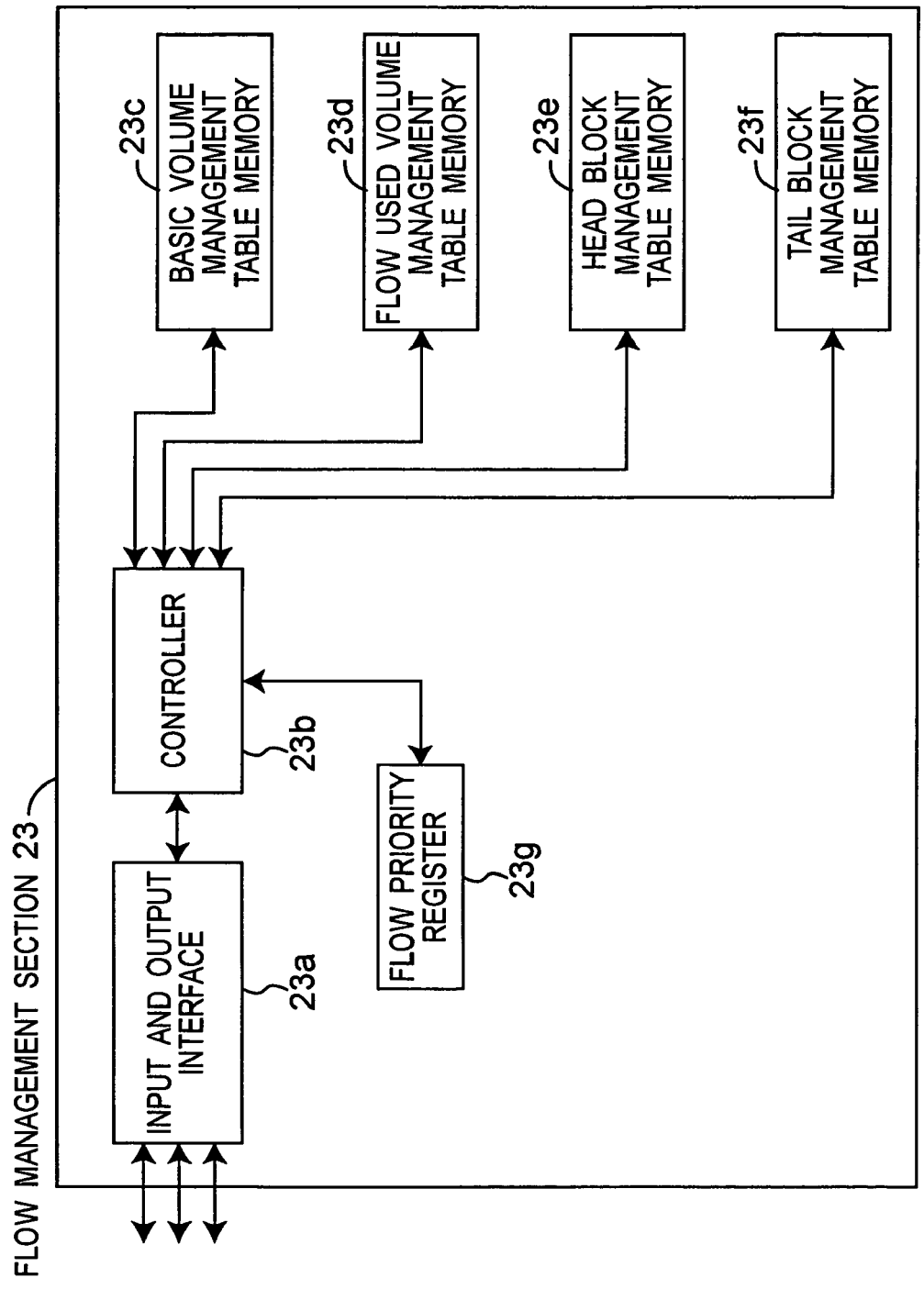
FIG. 28 is a block diagram illustrating a detailed configuration of a flow management section 23 shown in FIG. 2.

FIG. 28 is a block diagram illustrating a detailed configuration of the flow management section 23 shown in FIG. 2. As shown in FIG. 28, a basic volume management table memory 23c, a flow used volume management table memory 23d, a head block management table memory 23e, a tail block management table memory 23f, and a flow priority register 23g are connected with a controller 23b. The controller 23b controls the memories and register 23c to 23g to input and output data into and from an external circuit through an input and output interface 23a.

FIGS. 29A, 29B, 29C and 29D show one example of data in the flow management section 23 shown in FIG. 28. FIG. 29A shows one example of a basic volume management table stored in the basic volume management table memory 23c. FIG. 29B shows one example of a flow used volume management table stored in the flow used volume management table memory 23d. FIG. 29C shows one example of a head block management table stored in the head block management table memory 23e. FIG. 29D shows one example of a tail block management table stored in the tail block management table memory 23f.

Referring to FIG. 28, the basic volume management table memory 23c stores and manages a basic volume of each flow. The basic volumes managed by the basic volume management table memory 23c are only those of flows belonging to the BG class. Basic volumes of flows belonging to the BE classes are managed separately since they changes greatly. The basic volume management table memory 23c performs a basic operation, that is, outputs a basic volume of a flow in response to a flow ID of the flow as an input signal. The basic volume of the flow is used when an excessively used volume is calculated when a packet arrives or a packet is transmitted. The basic volume management table memory 23c outputs a resulting output signal, one clock after the input signal in response to the input signal in an operation cycle. The size of the basic volume management table managed by the basic volume management table memory 23c is F bits×($2^F$−1) rows. The basic volume management table stored in the basic volume management table memory 23c is shown in FIG. 29A as one example, and the basic volume management table stores and manages a "basic volume" for each flow ID. If no flow is present or a basic volume is not allocated to a flow, a value on the basic volume management table is set to "0".

The flow used volume management table memory 23d shown in FIG. 28 stores and manages a used volume of each flow and performs a basic operation, that is, outputs a used volume of a flow in response to a flow ID of the flow as an input signal. The size of the flow used volume management table stored in the flow used volume management table memory 23d is F bits×($2^F$−1) rows. The flow used volume management table stored in the flow used volume management table memory 23d is shown in FIG. 29B as one example, and the flow used volume management table stores and manages a "used volume" of a flow for each flow ID of the flow. A moment the value of the used volume indicates "0", it is determined that the flow is broken off.

The head block management table memory 23e shown in FIG. 28 stores and manages a data block number of a data block that arrives first in each flow, i.e., a head block of each flow in the buffer memory 13 and performs a basic operation, that is, outputs a head block number of a flow in response to a flow ID of the flow as an input signal. The head block number is mainly used upon transmission or pushout of a packet. The head block management table memory 23e outputs a resulting output signal, one clock after the input signal in response to the input signal in an operation cycle. The size of the head block management table stored in the head block management table memory 23e is F bits×($2^F$−1) rows. The head block management table is shown in FIG. 29C as one example, and the head block management table stores and manages a "flow head block number" for each flow ID. If the head block number is "−1", this indicates that the flow is not present.

The tail block management table memory 23f shown in FIG. 28 stores and manages a block number of a latest arriving data block in each flow, i.e., a tail block of each flow in the buffer memory 13 and performs a basic operation, that is, then outputs a tail block number of a flow in response to a flow ID of the flow as an input signal. The tail block number is mainly used in cooperation with the storage location management section 22 when a packet arrives. The tail block management table memory 23f outputs a resulting output signal, one clock after the input signal in response to the input signal in an operation cycle. The size of the tail block management table stored in the tail block management table memory 23f is F bits×($2^F$−1) rows. The tail block management table memory 23f is shown in FIG. 29D as one example, and the tail block management table memory 23f stores and manages a "flow tail block number" for each flow ID. If the tail block number is "−1", this indicates that the flow is not present.

Figure 30:
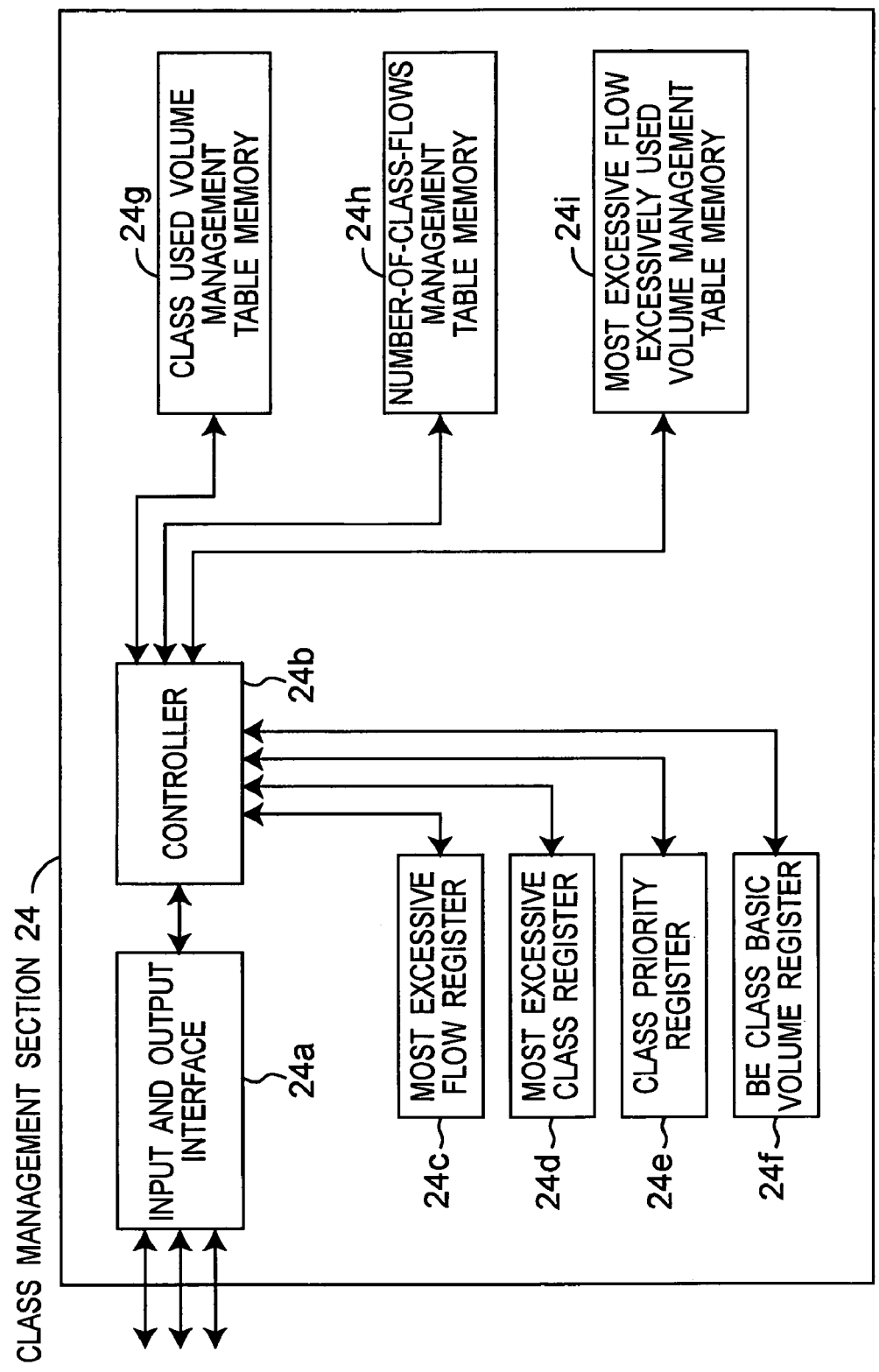
FIG. 30 is a block diagram illustrating a detailed configuration of the class management section 24 shown in FIG. 2.

FIG. 30 is a block diagram illustrating a detailed configuration of the class management section 24 shown in FIG. 2. The most excessive flow register 24c, the most excessive class register 24d, a class priority register 24e, a BE class basic volume register 24f, a class used volume management table memory 24g, a number-of-class-flows management table memory 24h, and the most excessive flow excessively used volume management table memory 24i are connected with a controller 24b. The controller 24b controls these internal circuits such as the registers and memories 24c to 24i to input and output data into and from an external circuit through an input and output interface 24a.

FIGS. 31A, 31B and 31C show one example data in the class management section 24 shown in FIG. 30. FIG. 31A is an illustration of one example of a class used volume management table stored in the class used volume management table memory 24g. FIG. 31B is an illustration of one example of a number-of-class-flows management table stored in the number-of-class-flows management table memory 24h. FIG. 31C is an illustration of one example of the most excessive flow excessively used volume management table stored in the most excessive flow excessively used volume management table memory 24i.

Referring to FIG. 30, the most excessive flow register 24c stores and manages a flow ID of a flow that most excessively uses the storage area of the buffer memory 13 beyond its basic volume in each class. The most excessive class register 24d stores and manages a class ID of a class that most excessively uses the storage area of the buffer memory 13 beyond its basic volume. The class priority register 24e stores and manages a priority of each class, and the BE class basic volume register 24f stores and manages a BE class basic volume.

The class used volume management table memory 24g shown in FIG. 30 stores and manages a used volume of each class and performs a basic operation, that is, outputs a used volume of a class in response to a class ID of the class as an input signal. The class used volume is used when an excessively used volume is calculated upon arrival of a packet or packet transmission. The class used volume management table memory 24g outputs a resulting output signal, one clock after the input signal in response to the input signal in an operation cycle. The size of the class used volume management table stored in the class used volume management table memory 24g is F bits×($2^c$−1) rows. The class used volume management table is shown in FIG. 31A as one example, and the class used volume management table stores and manages a "used volume" of a class for each class ID. If the used volume is "0", this indicates that the flow is not present in the class.

The number-of-class-flows management table memory 24h shown in FIG. 30 stores and manages the number of flows in each class and performs a basic operation, that is, outputs the numbers of flows in all BE classes at each clock. The number of class flows is used when a basic volume of the BE class is calculated. By simultaneously outputting the numbers of flows in all BE classes, the operation of the basic volume can be performed at a high speed. The size of the number-of-class-flows management table stored in the number-of-class-flows management table memory 24h is F bits×($2^c$−1) rows. The number-of-class-flows management table is shown in FIG. 30A as one example, and the number-of-class-flows management table stores and manages "the number of flows belonging to a class" for each class.

The most excessive flow excessively used volume management table memory 24i shown in FIG. 30 stores and manages an excessively used volume of the most excessive flow in each class and performs a basic operation, that is, outputs an excessively used volume of a flow that most excessively uses the storage area of the buffer memory 13 beyond its basic volume in the class in response to a class ID of the class as an input. By providing the most excessive flow excessively used volume management table memory 24i, a pushout object flow can be decided at a high speed. The most excessive flow excessively used volume management table memory 24i outputs a resulting output signal, one clock after the input signal in response to the input signal in an operation cycle. The size of the most excessive flow excessively used volume management table stored in the most excessive flow excessively used volume management table memory 24i is F bits×($2^c$−1) rows. The most excessive flow excessively used volume management table is shown in FIG. 31C as one example, and the most excessive flow excessively used volume management table stores and manages an "excessively used volume of the most excessive flow" for each class. If the excessively used volume is "0", this indicates that a flow that excessively uses the storage area of the buffer memory 13 beyond its basic volume is not present in the class.

Figure 32:
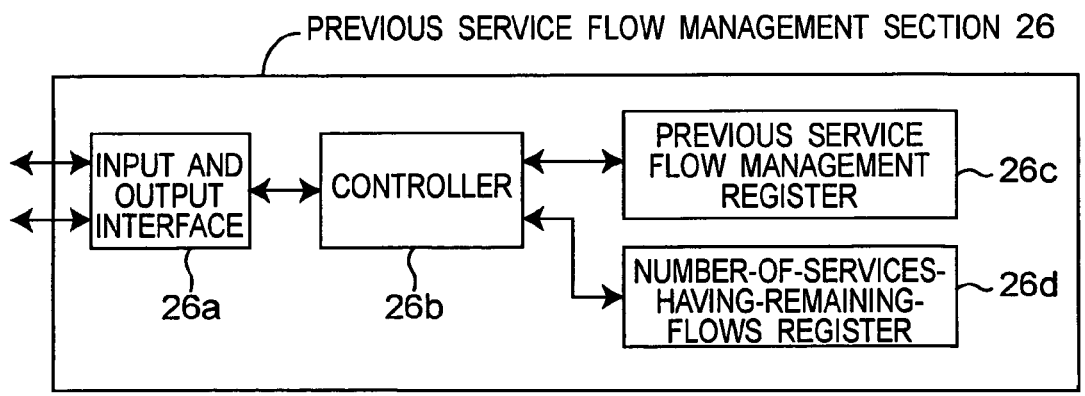
FIG. 32 is a block diagram illustrating a detailed configuration of the previous service flow management section 26 shown in FIG. 2.

FIG. 32 is a block diagram illustrating a detailed configuration of the previous service flow management section 26 shown in FIG. 2. Referring to FIG. 32, a previous service flow management register 26c and a number-of-flow-remaining-services register 26d are connected with a controller 26b. The controller 26b controls these internal registers 26c and 26d to input and output data into and from an external circuit through an input and output interface 26a. The size of the previous service flow management register 26c in the previous service flow management section 26 is F bits×($2^F$−1) rows and the size of the number-of-flow-remaining-services register 26d managed simultaneously with the register 26c is W bits×($2^c$−1) rows. The previous service flow management register 26c in the previous service flow management section 26 stores and manages a previously serviced flow for each class. Upon deciding a block to be serviced, a flow ID of the previously serviced flow is decided by referring to the register 26c after deciding a class to be serviced. By inputting the flow ID to the WRR flow order management section 28, the flow ID of the flow to be serviced is decided. Further, the number-of-flow-remaining-services register 26d stores and manages the number of currently serviced blocks which can service flows for each class. If this value is "0", the next flow is serviced.

Figure 33:
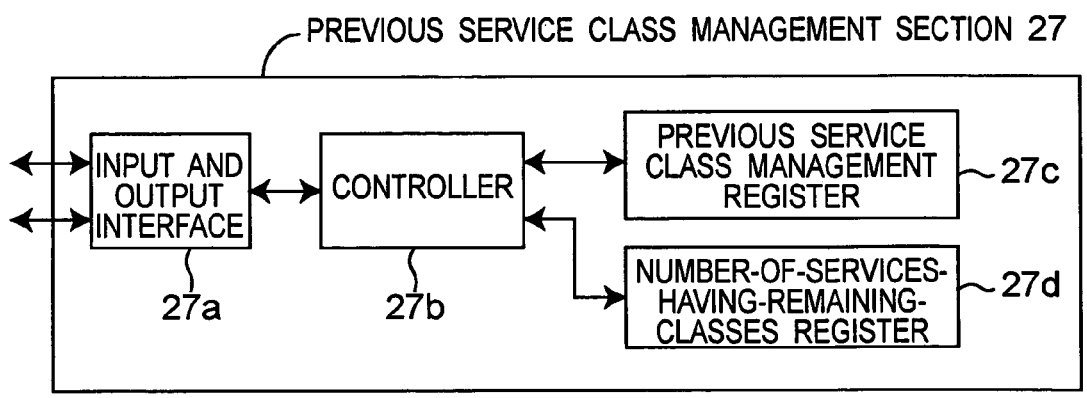
FIG. 33 is a block diagram illustrating a detailed configuration of the previous service class management section 27 shown in FIG. 2.

FIG. 33 is a block diagram illustrating a detailed configuration of the previous service class management section 27 shown in FIG. 2. A previous service class management register 27c and a number-of-class-remaining-services register 27d are connected with a controller 27b. The controller 27b controls the internal circuits such as the registers 27c and 27d to input and output data into and from an external circuit through an input and output interface 27a. The size of the previous service class management register 27c managed by the previous service class management section 27 is C bits, and the size of the number-of-class-remaining-services register 27d managed simultaneously with the section 27 is F bits. The previous service class management register 27c in the previous service management section 27 stores and manages a previously serviced class. By inputting this value to the WRR class order management section 29, a class ID of a class to be serviced is decided. The number-of-class-remaining-services register 27*d* stores and manages the number of currently serviced blocks that can service classes. If this number is "0", the next class is serviced.

Figures 34, 35:
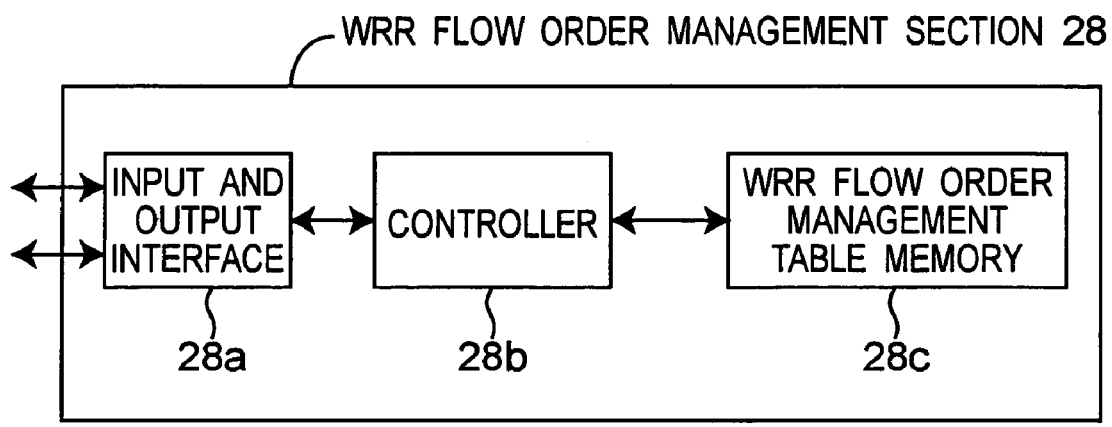
FIG. 34 is a block diagram illustrating a detailed configuration of the WRR flow order management section 28 shown in FIG. 2.
FIG. 35 shows one example of a WWR flow order management table stored in a WRR flow order management table memory 28c shown in FIG. 34.

FIG. 34 is a block diagram illustrating a detailed configuration of the WRR flow order management section 28 shown in FIG. 2. A WRR flow order management table memory 28*c* is connected with a controller 28*b*. The controller 28*b* controls the internal circuit, that is, the WRR flow order management table memory 28*c* to input and output data into and from an external circuit through an input and output interface 28*a*.

The WRR flow order management table memory 28*c* shown in FIG. 34, as shown in FIG. 35 as one example of the contents thereof, stores and manages a flow ID of a flow to be serviced next to a flow ID for each flow ID and performs a basic operation, that is, outputs a flow ID of a flow to be serviced in response to an input flow ID. This outputted flow ID is used when it is decided which flow is to be serviced first upon transmission of a packet. The WRR flow order management section 28 outputs a resulting output signal, one clock after the input signal in response to the input signal in an operation cycle. The size of the WRR flow order management table stored in the WRR flow order management table memory 28*c* is F bits×($2^F-1$) rows. The WRR flow order management table stores and manages a "flow ID of an ID to be serviced next" for each flow ID. In the example of FIG. 35, the ID of the flow to be serviced next to the flow having a flow ID "0" is "1" and the ID of a flow to be serviced next to the flow having the flow ID "1" is "5". Further, the flow ID of the flow to be serviced next to the flow having the flow ID "5" is "0". This indicates that flow ID's "0", "1" and "5" are present in a certain class and that a service order of flows having these flow ID's is "0→1→5→0→. . . ". If a value on the WRR flow order management table is "−1", this indicates that the flow is not present.

Figures 36, 37:
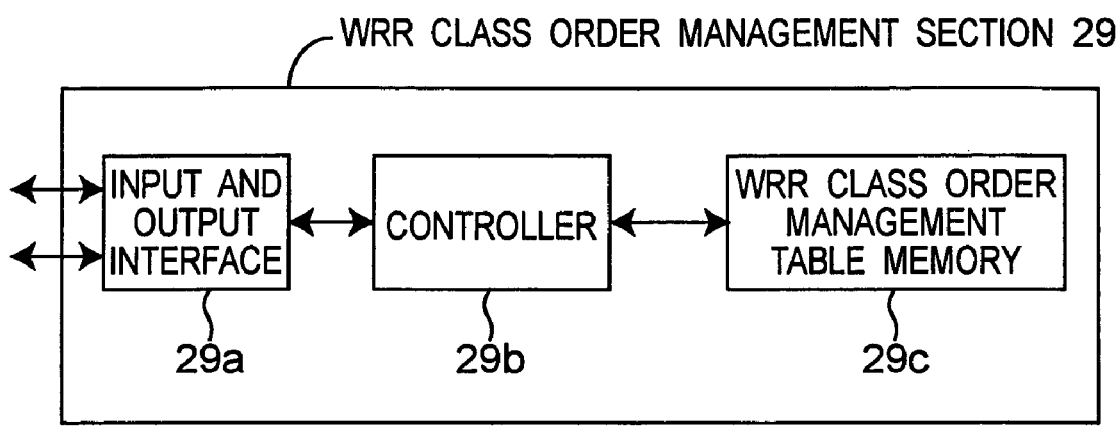
FIG. 36 is a block diagram illustrating a detailed configuration of a WRR class order management section 29 shown in FIG. 2.
FIG. 37 shows one example of a WRR class order management table stored in a WRR class order management table memory 29c shown in FIG. 36.

FIG. 36 is a block diagram illustrating a detailed configuration of the WRR class order management section 29 shown in FIG. 2. A WRR class order management table memory 29*c* is connected with a controller 29*b*. The controller 29*b* controls the internal circuit, i.e., the WRR class order management table memory 29*c* to input and output data into and from an external circuit through an input and output interface 29*a*.

The WRR class order management table memory 28*c* is shown in FIG. 36 as one example, and the WRR class order management table memory 28*c* stores and manages a class ID of a class to be serviced next to a class for each class ID and performs a basic operation, that is, outputs the class ID of the class to be serviced next in response to the input class ID. The output class ID is used when it is decided which class is to be serviced upon transmission of a packet. The WRR class order management table memory 28*c* outputs a resulting output signal, one clock after the input signal in response to the input signal in an operation cycle. The size of the WRR class order management table stored in the WRR class order management section 29 is C bits×($2^c-1$) rows. As shown in FIG. 36, the WRR class order management table stores and manages a "class ID to be serviced next" for each class. It is noted that the meaning of a value on the WRR class order management table is equal to that of a value on the "WRR flow order management table".

The output port controller 20 performs the following arithmetic processings using an access processing for accessing all the management tables mentioned above and an output processing for these management tables. When a packet arrives, a flow ID of a flow to which the arrived packet belongs or the like is inputted to decide a storage block number. When a packet is transmitted, a service request signal is inputted so as to output a block number to be transmitted. To perform these processings, four clocks are required per block. Table 2 shows input and output signals for the output port controller 20. Table 3 shows a list of the respective memories and registers that store the management tables mentioned above.

TABLE 2

Input and output signals for output port controller 20

| Signal name | Input or Output | Bit width |
|---|---|---|
| Flow ID | Input | F |
| Class ID | Input | C |
| Priority | Input | W |
| Arrival flag | Input | 1 |
| Transmitted flag | Input | 1 |
| Clock CLK | Input | 1 |
| Reset RST | Input | 1 |
| Output data DOUT | Output | F |

As shown in the Table 2, the output port controller 20 outputs a storage block signal as the output data DOUT if the arrived packet is stored and outputs a transmitted block number as the output data DOUT if the packet is transmitted.

TABLE 3

Memories and registers managed by output port controller 20

Free-space management table memory 21c
Storage location management table memory 22c
Basic volume management table memory 23c
Flow used volume management table memory 23d
Head block management table memory 23e
Tail block management table memory 23f
Class used volume management table memory 24g
Number-of-class-flows management table memory 24h
Most excessive flow excessively used volume management table memory 24i
WRR flow order management table memory 28c
WRR class order management table memory 29c
Previous service flow management register 26c: F bits × ($2^C - 1$) rows
Previous service class management register 27c: C bits
Most excessive flow register 24c: F bits × ($2^C - 1$) rows
Most excessive class register 24d: C bits
Class priority register 24e: W bits × ($2^C - 1$) rows
Number-of-flow-remaining-services register 26d: W bits × ($2^C - 1$) rows
Number-of-class-remaining-services register 27d: F bits
BE class basic volume register 24f: F bits If the output port circuits 3 of the present preferred embodiment are installed as hardware, it is necessary to carry out four-clock processings for a time interval from outputting of a resulting output signal to completion of change of each management table. In order to explain this, FIGS. 38A, 38B, 39A, 39B, 40A, 40B, 41A and 41B show timing charts for the processings which are carried out when a packet arrives and which are executed by the output controller 20 shown in FIG. 2. In the processings upon arrival of a packet shown in FIGS. 38A, 38B, 39A, 39B, 40A, 40B, 41A and 41B and processings upon transmission of a packet shown in FIGS. 45, 46A and 46B which will be described later, data is transmitted and received among the pushout object block decision section 15, the storage block decision section 16, the storage location decision section 17, the scheduler 18, and the respective management tables and registers through the input and output interfaces 21a to 24a and 26a to 29a and the controllers 21b to 24b and 26b to 29b in the respective management sections 21 to 24 and 26 to 29. For brief description, the input and output interfaces and controllers will not be described hereinafter.

Figure 38A:
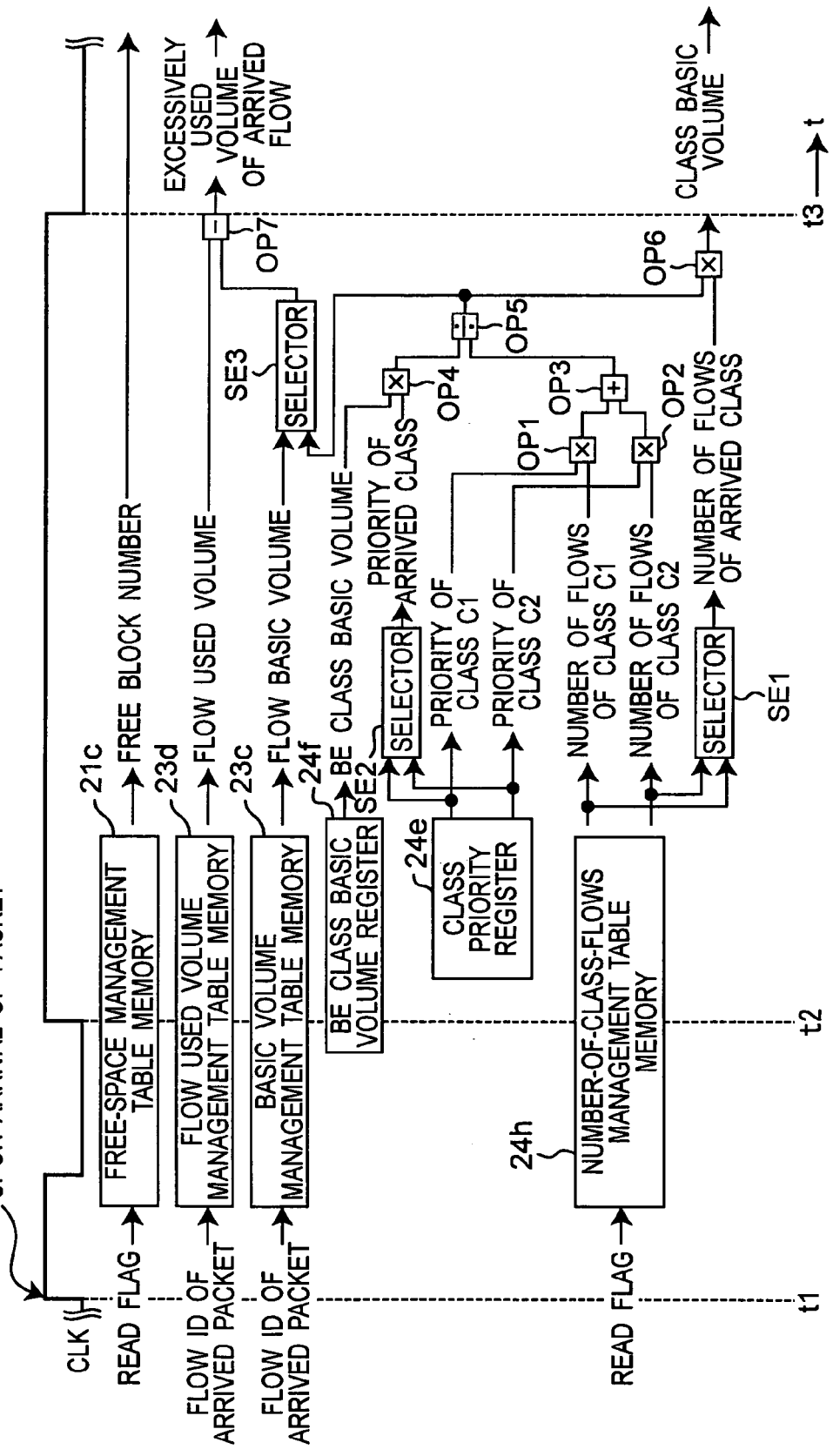
FIG. 38A is a timing chart illustrating a first part of processings upon arrival of a packet, which are executed by an output port controller 20 shown in FIG. 2.
Figure 38B:
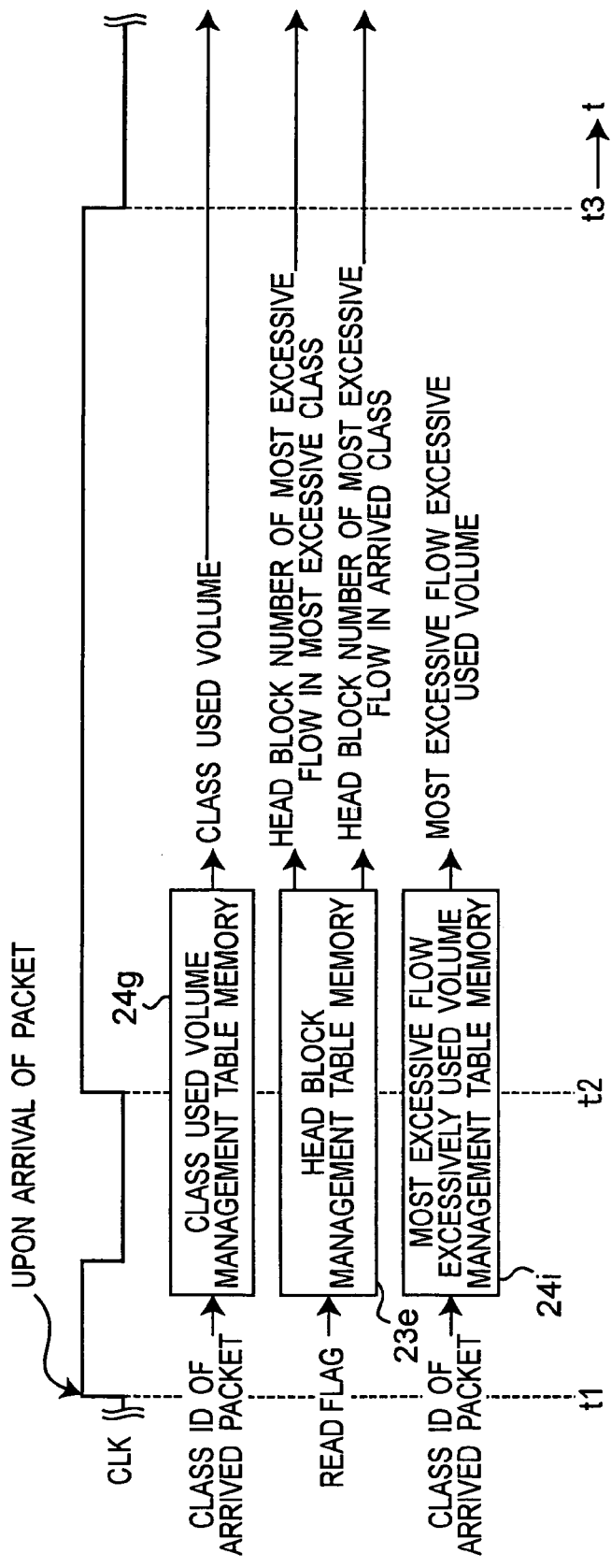
FIG. 38B is a timing chart illustrating a second part of processings upon arrival of the packet, which are executed by the output port controller 20 shown in FIG. 2.

In the first clock interval from the timing t1 to the timing t2 shown in FIGS. 38A and 38B, data is inputted to the free-space management section 21, the flow management section 23, and the class management section 24 that hold the respective management tables of the output port controller 20. The storage block decision section 16 inputs a read flag to the free-space management table memory 21c. In response to the input of the read flag, the free-space management table memory 21c outputs a free block number to the storage location decision section 17 at the timing t2. In addition, the pushout object block decision section 15 inputs the flow ID of the flow to which the arrived packet belongs, to the flow used volume management table memory 23d and the basic volume management table memory 23c. In response to the input of the flow ID, the flow used volume management table memory 23d outputs the present flow used volume of the flow in the buffer memory 13 to the pushout object block decision section 15 at the timing t2. Further, at the timing t2, the basic volume management table memory 23c outputs the present flow basic volume of the flow in the BG class in the buffer memory 13 to the pushout object block decision section 15.

Further, the pushout object block decision section 15 inputs the read flag of the arrived packet to the number-of-class-flows management table memory 24h, and inputs the class ID of the class to which the arrived packet belongs to the class used volume management table memory 24g. In response to the input of the read flag, the number-of-class-flows management table memory 24h outputs the number of flows included in each BE class to the pushout object block decision section 15 at the timing t2. The class used volume management table memory 24g outputs the present class used volume of the class in the buffer memory 13 to the pushout object block decision section 15 at the timing t2. The pushout object block decision section 15 inputs the flow ID of the most excessive flow upon arrival of a packet, as the read flag, to the head block management table memory 23e. In response to the input of the flow ID, the head block management table memory 23e outputs the head bock number of the most excessive flow in the most excessive class in the buffer memory 13 and the head block number of the most excessive flow in the class to which the arrived packet belongs, to the pushout object block decision section 15 at the timing t2. If a flow stored in the buffer memory 13 is pushed out, the output (i.e., the head block number of the most excessive flow) is adopted as the storage location of the arrived packet. Furthermore, the post-processing front-end processing section 36 inputs the class ID of the arrived packet to the most excessive flow excessively used volume management table memory 24i, and the most excessive flow excessively used volume management table memory 24i outputs the most excessive flow excessively used volume to the packet storage post-processing section 37 at the timing t2.

Next, in the second clock interval from the timing t2 to the timing t4, a processing for deciding the storage location of the arrived packet is carried out using the values on the management tables output in the first clock interval. Referring to FIGS. 38A and 38B, the pushout object block decision section 15 first calculates the excessively used volume of the flow to which the arrived packet belongs, using the data output from the flow used volume management table memory 23d, the basic volume management table memory 23c, and the number-of-class-flows management table memory 24h and the data in the BE class basic volume register 24f and the class priority register 24e. Concrete examples of the configurations of arithmetic operation circuits for the operation are shown in FIGS. 42 and 43.

Figure 42:
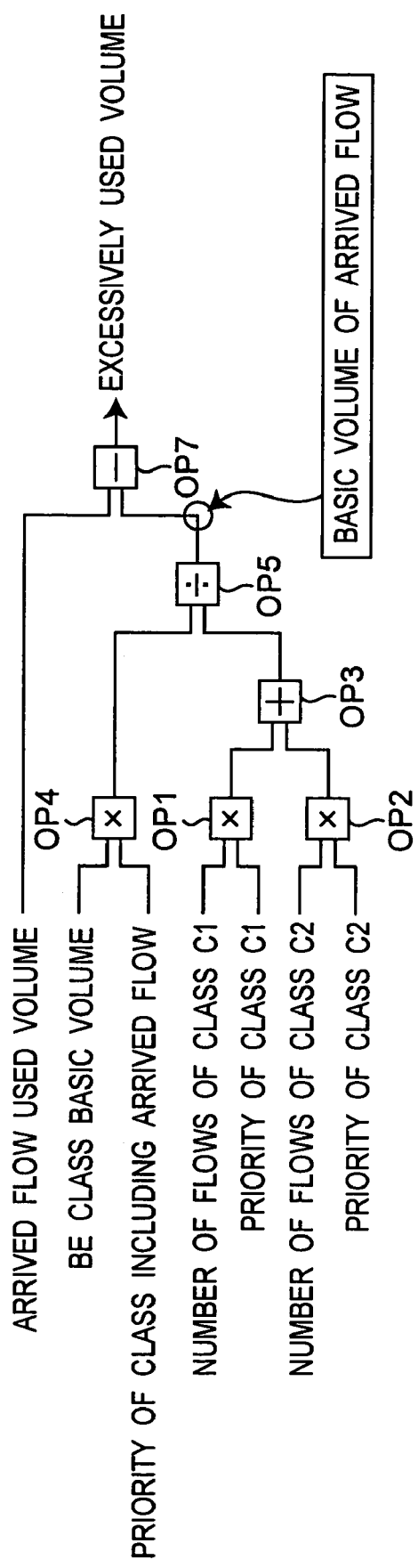
FIG. 42 is a block diagram of a circuit which is included in a pushout object block decision section 15 shown in FIG.

FIG. 42 is a block diagram of the circuit which is included in the pushout object block decision section 15 and which executes an excessively used volume arithmetic operation for the flow belonging to the BE class. The pushout object decision section 15 includes a circuit which is constituted by including multiplier OP1, OP2, OP4 and OP6, an adder OP3, a divider OP5, subtracter OP7 and OP8, and selectors SE1 to SE6. Further, since the basic volume of the flow to which the arrived packet belongs can be calculated as expressed by the Equations (5) and (6), the basic volume can be calculated using the circuit configuration as schematically shown in FIG. 42.

If two BE classes C1 and C2 are present, for example, the pushout object block decision section 15 multiplies the numbers of flows of the classes C1 and C2 output from the number-of-class-flows management table memory 24h by the priorities of the classes C1 and C2 acquired from the class priority register 24e using the multiplier OP1 and OP2, respectively and adds up the multiplication results using the adder OP3. The selector SE2 shown in FIG. 38A selects the priority of the arrived class from among the priorities of respective classes output from the class priority register 24e and outputs the selected priority of the arrived class. The pushout object block decision section 15 multiplies the priority of the arrived class by the BE class basic volume acquired from the BE class basic volume register 24f using the multiplier OP4, and divides the multiplication result by the addition result of the adder OP3 using the divider OP5. The division result of the divider OP5 corresponds to the basic volume of the arrived flow belonging to the BE class. The flow basic volume thus calculated is subtracted from the present flow used volume output from the flow used volume management table memory 23d using the subtracter OP7. As a result, the excessively used volume of the arrived flow is calculated.

FIG. 43 is a block diagram of the circuit which is included in the pushout object block decision section 15 and which executes an excessively used volume arithmetic operation processing for the flow belonging to the BG class. If the arrived packet belongs to the BG class, the excessively used volume is calculated using the output of the basic volume management table memory 23c. This is because the BG flow basic volume is stored and managed by the basic volume management table memory 23c.

In the processing shown in FIG. 38A, the selector SE3 selects the flow basic volume which is to be subtracted from the flow used volume of the arrived packet, depending on whether the arrived flow is a BG class flow or a BE class flow. In addition, the selector SE1 selects the number of flows of the arrived class from among the numbers of flows of the respective classes output from the number-of-class-flows management table memory 24h and outputs the selected number of flows of the arrived class. The pushout object block decision section 15 multiplies the number of flows of the arrived class by the division result of the divider OP5 using the multiplier OP6 and outputs the multiplication result as the class basic volume of the class to which the BE arrived packet belongs. The storage location of the arrived packet is decided based on (a) the excessively used volume thus calculated, (b) the output of the head block management table memory 23e, and (c) the output of the free-space management table memory 21.

Figure 39A:
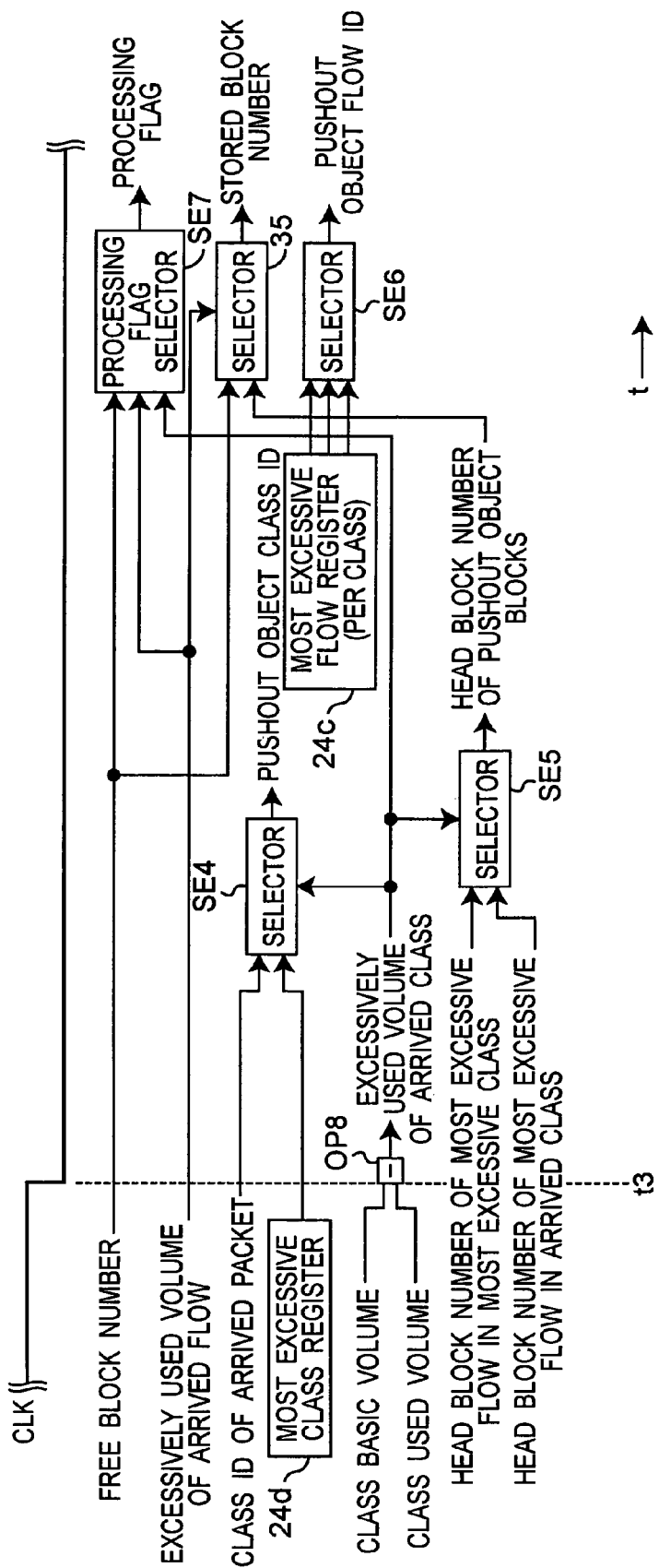
FIG. 39A is a timing chart illustrating a third part of processings upon arrival of the packet, which are executed by the output port controller 20 shown in FIG. 2.
Figure 39B:
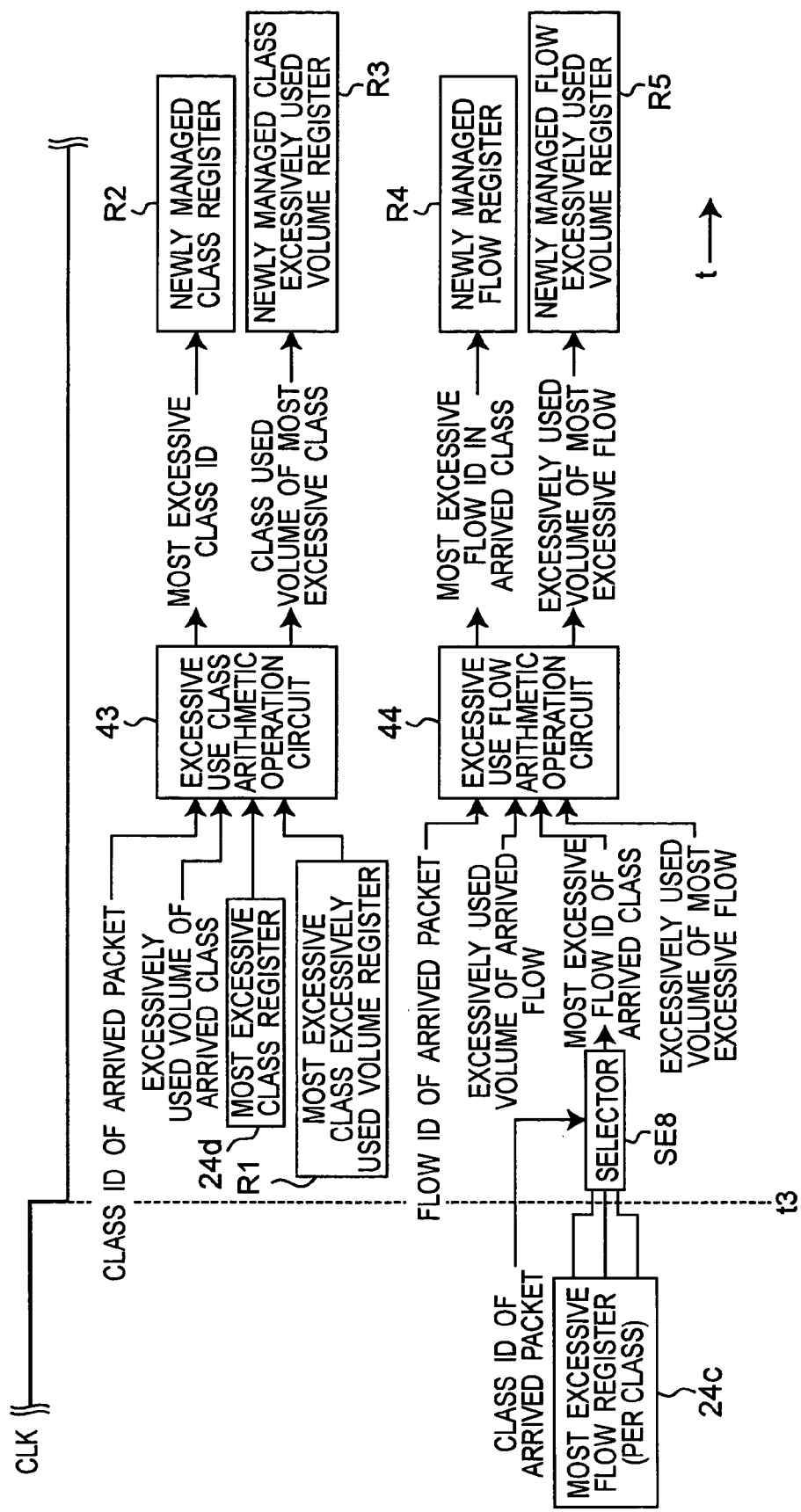
FIG. 39B is a timing chart illustrating a fourth part of processings upon arrival of the packet, which are executed by the output port controller 20 shown in FIG. 2.

In the second half of the second clock interval from the timing t3 to the timing t4 shown in FIGS. 39A and 39B, the pushout object block decision section 15 subtracts the class used volume from the class basic volume using the subtracter OP8, and then outputs the subtraction result, i.e., the excessively used volume of the arrived class to the selectors SE4 and SE5 and a processing flag selector SE7. The selector SE4 decides a pushout object class ID based on the class ID of the arrived packet, the data acquired from the most excessive class register 24d, and the excessively used volume of the arrived class output from the subtracter OP8, and outputs a signal which indicates the decision result to the selector SE6. The selector SE6 decides a pushout object flow based on the flow ID of the most excessive flow in each class acquired from the most excessive flow register 24c and the class ID of the pushout object class inputted from the selector SE4, and outputs the flow ID of the decided pushout object flow. The selector SE5 decides the head block number of the pushout object block based on the head block numbers of the most excessive flows in the most excessive class and the arrived class output from the head block management table memory 23e and the excessively used volume of the arrived class output from the subtracter OP8, and then outputs a signal which indicates the decision result to the selector 35.

FIG. 44 is a schematic explanatory view for explaining storage location decision for the arrived packet executed by the selector 35 shown in FIG. 20.

Referring to FIG. 44, if the calculated, excessively used volume (a signal A shown in FIG. 44) of the arrived flow is equal to or smaller than 0, (i.e., if the used volume of arrived flow, by which the arrived flow uses the storage area of the buffer memory 13, does not exceed the basic volume thereof) and no free space is present in the buffer memory 13, the arrived packet may possibly cause a packet already stored in the buffer memory 13 to be pushed out. In that case, a selector SE11 in the selector 35 selects, as the block number of the pushout object block, data (a signal B shown in FIG. 44) outputted from the head block management table memory 23e and then selected and output from the selector SE5. If the excessively used volume of the flow to which the arrived packet belongs (the signal A shown in FIG. 44) is equal to or greater than "1", pushout of the other flow cannot be applied. Therefore, the selector SE11 outputs "−1" as the pushout object block number (a signal D shown in FIG. 44).

A selector SE12 in the selector 35 shown in FIG. 44 compares the pushout object block number calculated as mentioned above with the free block number as a result of the output of the free-space management table memory 21c, and decides a storage block number. Concretely speaking, if an output signal (a signal C shown in FIG. 44) of the free-space management table memory 21c is "−1", this indicates that no free space is present in the buffer memory 13. Therefore, the selector SE12 selects the pushout object block number (the signal D shown in FIG. 44) as the storage block number. If the output signal (the signal C in FIG. 44) of the free-space management table memory 21c is other than "−1", this signifies that a free space is present in the buffer memory 13. Therefore, the selector SE12 adopts the output signal (the signal C shown in FIG. 44) as the storage block number. As apparent from above, if a free space is present in the buffer memory 13, the free block number is outputted as the storage block number. If no free space is present in the buffer memory 13 and the flow to which the arrived packet belongs does not excessively use the storage area of the buffer memory 13 beyond its basic volume, the pushout object block number is outputted as the storage block number. If no free space is present in the buffer memory 13 and the flow to which the arrived packet belongs excessively uses the storage area of the buffer memory 13 beyond its basic volume, a discard signal (111 . . . ) is outputted as the storage block number.

Referring to FIG. 39A, the processing flag selector SE7 generates and outputs a processing flag based on the free block number, the excessively used volume of the arrived flow, and the excessively used volume of the arrived class. The processing flag has a size of two bits. The processing flag is inputted to all the management tables during a post processing from the timing. t5 to the timing t6, and the meaning of the processing flag is shown in the following Table 4.

TABLE 4

| Processing flag | Meaning |
| --- | --- |
| 00 | Normally store (a free space is present in the buffer memory 13). |
| 01 | Discard (the arrived packet is not stored). |
| 10 | Push out a flow in the class to which the arrival flag belongs. |
| 11 | Push out a flow in a class other than the class to which the arrival flag belongs. |

As shown in the Table 4, by judging the number of bits of the processing flag, an update content of each management table during the post processing changes. In an implemental example, the value to be updated and the processing flag are simultaneously inputted to each management table and each management section determines whether to update the table based on the processing flag. The processing flag selector SE7 decides the processing flag based on the free block number, the excessively used volume of the arrived flow, and the excessively used volume of the arrived class. Concretely speaking, the processing flag selector SE7 calculates as shown in the following Table 5.

TABLE 5

(1) If the free block number is other than "−1", the processing flag "00" is outputted.
(2) If the free block number is "−1" and the excessively used volume of the arrived flow is equal to or larger than 1, the processing flag "01" is outputted.
(3) If the free block number is "−1", the excessively used volume of the arrived flow is smaller than 1 and the excessively used volume of the arrived class is equal to or larger than 1, the processing flag "10" is outputted.
(4) If the free block number is "−1", the excessively used volume of the arrived flow is smaller than 1 and the excessively used volume of the arrived class is smaller than 1, the processing flag "11" is outputted.

Further, the packet storage post-processing section 37 shown in FIG. 39B manages the most excessive class and the most excessive flow. A selector SE8 decides the most excessive flow in the arrived class based on the flow ID of the most excessive flow in each class acquired from the most excessive flow register 24c and the class ID of the arrived packet, and outputs the flow ID of the decided most excessive flow to the excessive use flow arithmetic operation circuit 44 in the packet storage post-processing section 37. The excessive use flow arithmetic operation circuit 44 compares the excessively used volume of the arrived flow with the managed, excessively used volume based on the flow ID of the arrived packet, the excessively used volumes of both of the arrived flow and the most excessive flow, and the most excessive flow ID of the arrived class, and decides a flow ID to be newly managed and an excessively used volume. The flow ID of the most excessive flow in the arrived class thus decided is temporarily stored in the newly managed flow register R4, and the excessively used volume of the most excessive flow is temporarily stored in the newly managed flow excessively used volume register R5. In a later update phase, update is conducted using the flow ID and the excessively used volume. Likewise, the excessive use class arithmetic operation circuit 43 decides a class ID and an excessively used volume to be newly managed based on the class ID of the arrived packet, the excessively used volume of the arrived class, and the data acquired from the most excessive class register 24d and the most excessive class excessively used volume register R1, stores the class ID of the most excessive class, as the decision result, in the newly managed class register R2, and stores the class used volume of the most excessive class in the newly managed class excessively used volume register R3.

Figure 40A:
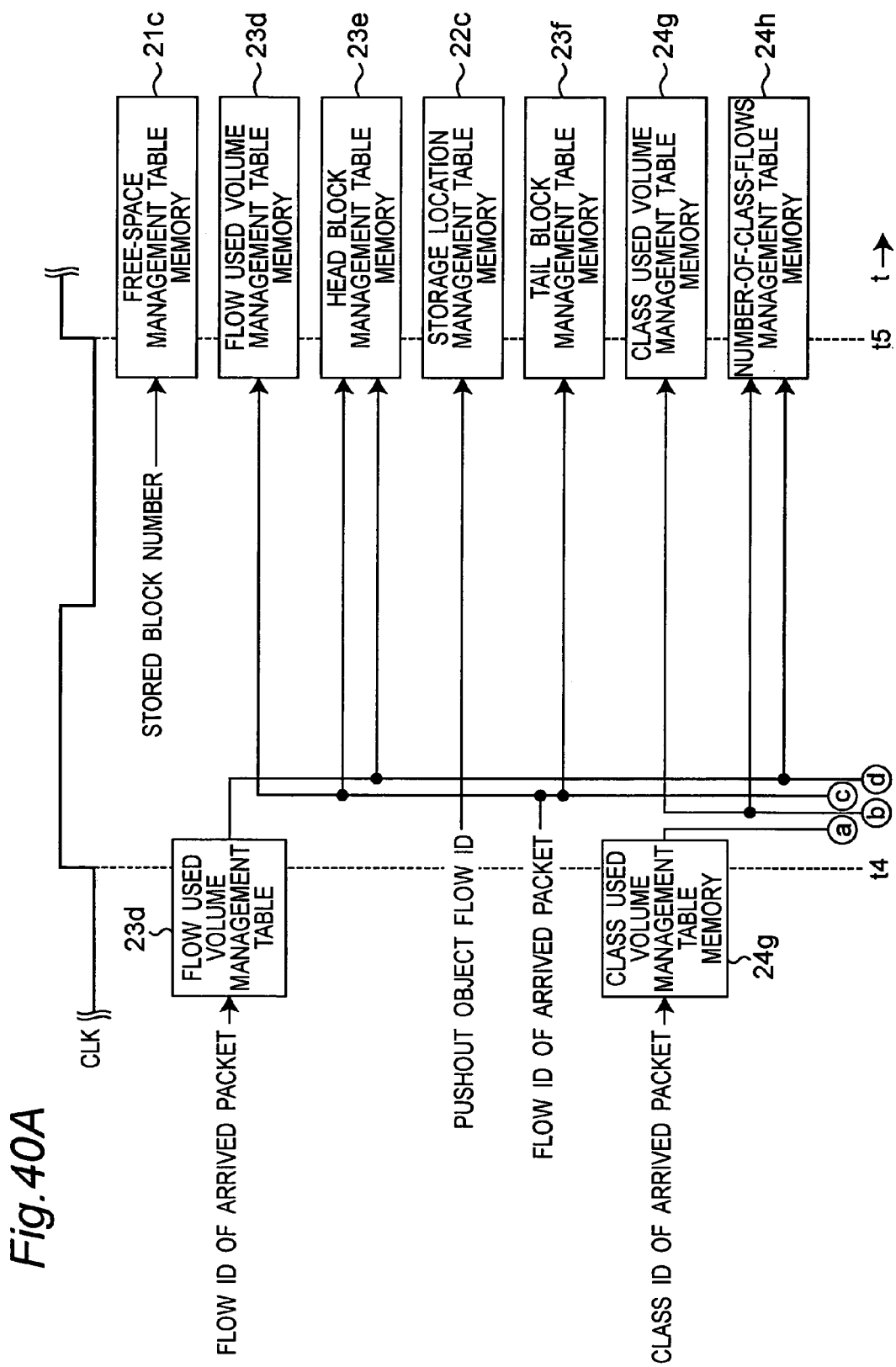
FIG. 40A is a timing chart illustrating a fifth part of processings upon arrival of the packet, which are executed by the output port controller 20 shown in FIG. 2.
Figure 40B:
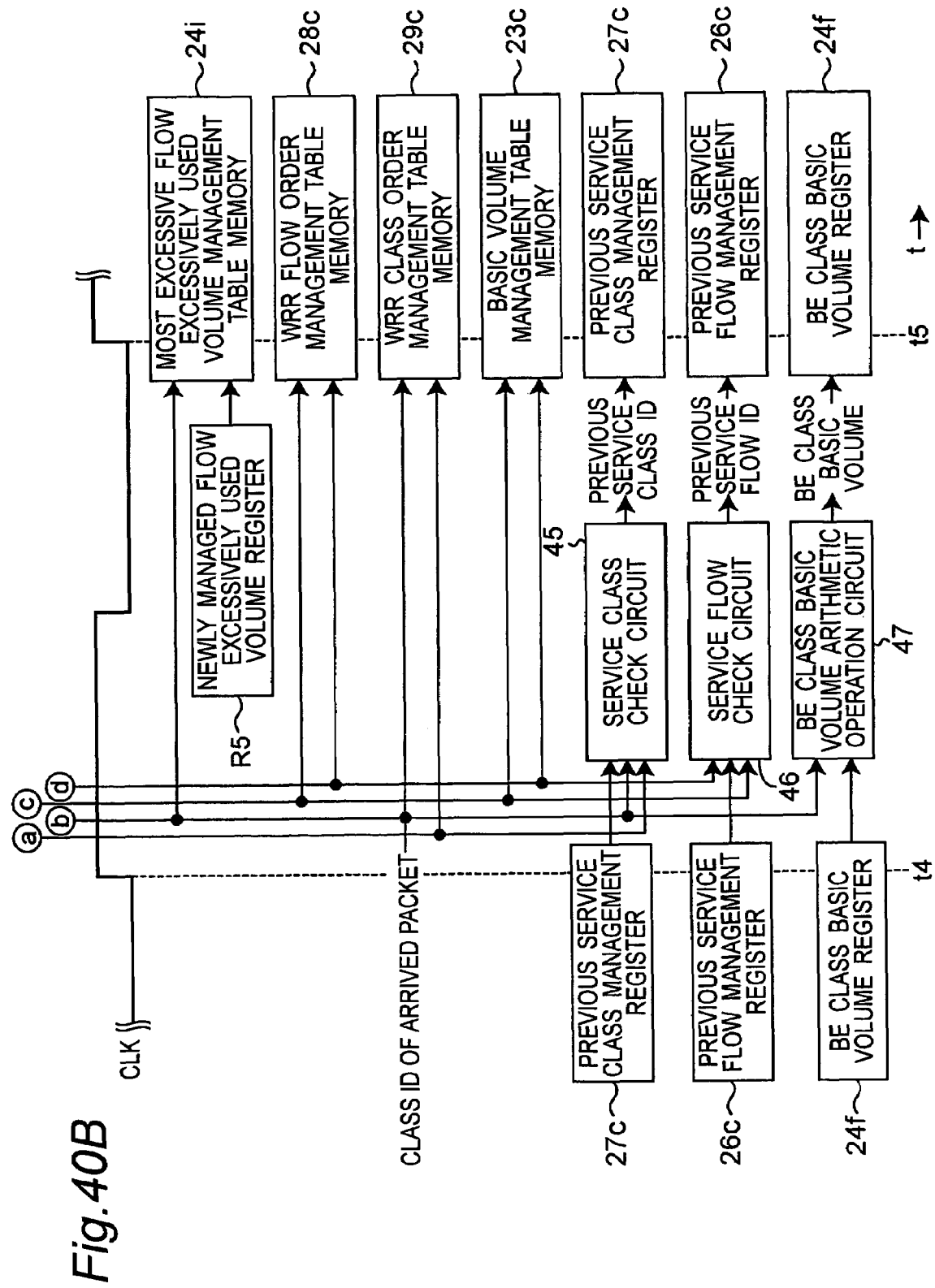
FIG. 40B is a timing chart illustrating a sixth part of processings upon arrival of the packet, which are executed by the output port controller 20 shown in FIG. 2.
Figure 41B:
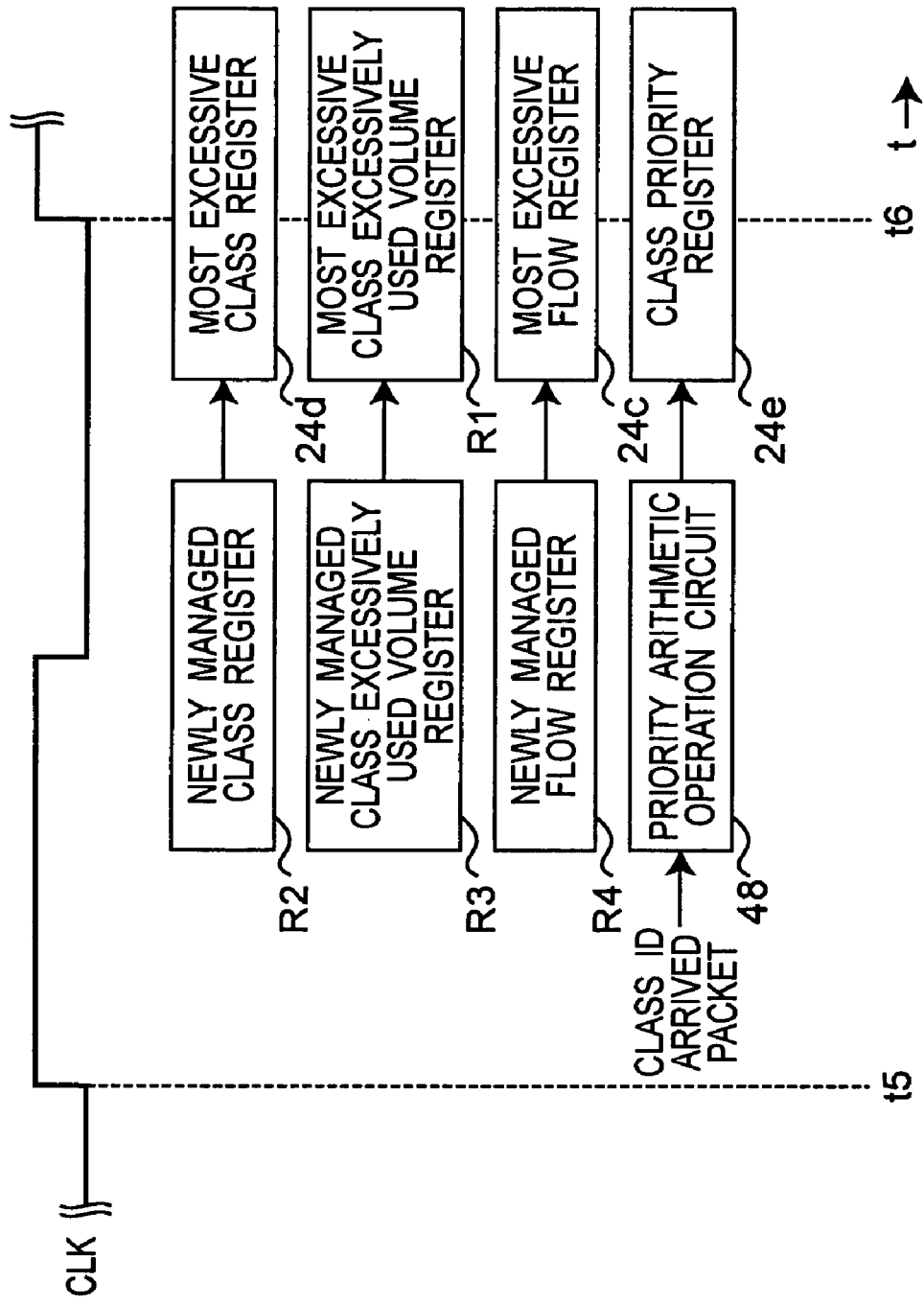
FIG. 41B is a timing chart illustrating an eighth part of processings upon arrival of the packet, which are executed by the output port controller 20 shown in FIG. 2.

Next, in the third clock interval from the timing t4 to the timing t5 shown in FIGS. 40A and 40B and the fourth clock interval from the timing t5 to the timing t6 shown in FIGS. 41A and 41B, the packet storage post-processing section 37 updates values on the respective management tables.

First of all, at the timing t4 shown in FIGS. 40A and 40B, the packet storage post-processing section 37 inputs the flow ID of the arrived packet in the flow used volume management table memory 23d. In response to the input of the flow ID, the flow used volume management table memory 23d outputs data on a flow used volume to the head block management table memory 23e, the number-of-class-flows management table memory 24h, the WRR flow order management table memory 28c, the basic volume management table memory 23c, and the service flow check circuit 46. Further, the packet storage post-processing section 37 inputs the class ID of the arrived packet in the class used volume management table memory 24g. In response to the input of the class ID, the class used volume management table memory 24g outputs data on a class used volume to the WRR class order management table memory 29c and the service check circuit 45. If the class of the arrived packet is a new class, the service check circuit 45 updates the previous service class management register 27c based on the class ID of the arrived packet, the data on the class used volume inputted from the class used volume management table memory 24g, and the class ID of the previous service class acquired from the previous service class management register 27c at the timing t5. In addition, the service flow check circuit 46 updates the previous service flow management register 26c based on the flow ID of the arrived packet, the data on the flow used volume inputted from the flow used volume management table memory 23d, and the flow ID of the previous service class acquired from the previous service flow management register 26c at the timing t5. Furthermore, if the arrived flow is a new flow, the BE class basic volume arithmetic operation circuit 47 updates the BE class basic volume register 24f based on the class ID of the arrived packet and the data indicating the BE class basic volume and acquired from the BE class basic volume register 24f.

Referring to FIGS. 40A and 40B, the packet storage post-processing section 37 updates the free-space management table memory 21c using the storage block number and also updates the flow used volume management table memory 23d using the flow ID of the arrived packet at the timing t5. If the arrived flow is a new flow, the packet storage post-processing section 37 further updates the head block management table memory 23e, the tail block management table memory 23f, the WRR flow order management table memory 28c, and the basic volume management table memory 23c using the flow ID of the arrived packet and also updates the number-of-class-flows management table memory 24h at the timing t5. Moreover, the packet storage post-processing section 37 updates the class used volume management table memory 24g using the class ID of the arrived packet and the most excessive flow excessively used volume management table memory 24i using the class ID of the arrived packet and the data in the newly managed flow excessively used volume register R5 at the timing t5. If the arrived class is a new class, the packet storage post-processing section 37 updates the WRR class order management table memory 29c and the previous service class management register 27c.

At the timing t5 shown in FIGS. 41A and 41B, the packet storage post-processing section 37 inputs the flow ID of the pushout object flow to the storage location management table memory 22c so as to update the respective management tables in the next fourth clock interval from the timing t5 to the timing t6. In response to the input of the flow ID, the storage location management table memory 22c outputs a new head block number of the pushout object flow. Further, the packet storage post-processing section 37 inputs the flow ID of the arrived packet, to the tail block management table memory 23f. In response to the input of the flow ID, the tail block management table memory 23f outputs the tail block number of the arrived flow. As mentioned above, the processing flag output from the processing flag selector SE7 is inputted to all the management tables at the timing t5.

In the fourth clock interval from the timing t5 to the timing t6 shown in FIGS. 41A and 41B, the packet storage post-processing section 37 updates the storage location management table memory 22c based on the tail block number of the arrived flow, the tail block management table memory 23f using the flow ID of the arrived packet, the flow used volume management table memory 23d using the pushout object flow ID, and the head block management table memory 23e using the new head block number of the pushout object flow at the timing t6. Further, the packet storage post-processing section 37 updates the class used volume management table memory 24g using the pushout object class ID. At the same time, the packet storage post-processing section 37 updates the most excessive class register 24d using the data acquired from the newly managed class register R2, the most excessive class excessively used volume register R1 using the data acquired from the newly managed class excessively used volume register R3, and the most excessive flow register 24c using the data acquired from the newly managed flow register R4. Furthermore, the priority arithmetic operation circuit 48 updates the class priority register 24e based on the class ID of the arrived packet. The processing flag output from the processing flag selector SE7 is inputted to all the management tables at the timing t6.

FIGS. 45, 46A and 46B show timing charts for the processings upon transmission of a packet, which are executed by the output port controller 20 shown in FIG. 2. The processings for storing and managing each management table upon transmission of a packet are finished within three clocks. However, since the processings upon arrival of a packet requires four clocks, the processings upon transmission of a packet are assumed to be carried out within four clocks of the present preferred embodiment.

FIG. 45 is a timing chart illustrating two clock intervals from the timing t11 to timing t13 for the first half of a time interval during transmission of a packet.

Referring to FIG. 45, the scheduler 18 inputs the class ID of the previous service class to the WRR class order management table memory 29c in advance. In the first clock interval from the timing t11 to the timing t12 during transmission of a packet, the WRR class order management table memory 29c inputs the class ID of a service class to the WRR flow order management table memory 28c and the service class holding register R11. At the same time, the scheduler 18 inputs the managed previous service flow ID to the WRR flow order management table memory 28c in advance. As a result, the WRR flow order management table memory 28c outputs a flow ID of a flow to be serviced. In the second clock interval from the timing t12 to the timing t13, the WRR flow order management table memory 28c inputs the flow ID of the service flow to the head block management table memory 23c and the service flow holding register 12. As a result, the head block management table memory 23e outputs a block number to be serviced to the free-space management table memory 21c and the storage location management table memory 22c at the timing t13.

Next, FIGS. 46A and 46B are timing charts illustrating a one-clock interval from the timing t13 to the timing t14 for the second half of a time interval during transmission of a packet. In the third clock interval from the timing t13 to the timing t14 shown in FIGS. 46A and 46B, the scheduler 18 simultaneously changes the management tables by packet transmission and the processings during the packet transmission are finished.

Concretely speaking, the flow used volume management table memory 23d outputs data indicating the flow used volume to the number-of-class-flows management table memory 24d and the number-of-flow-services management arithmetic operation circuit 64 based on the flow ID of the service flow. The class used volume management table memory 24g outputs data indicating the class used volume to the number-of-class-services arithmetic operation circuit 63 and the priority arithmetic operation circuit 65 based on the class ID of the service class. In response to the output of the data, the number-of-class-services arithmetic operation circuit 63 outputs the class ID of the previous service class the service of which is finished and the number of remaining services for the class to be serviced next and stores them in the previous service class management register 27c and the number-of-class-remaining-services register 27d based on the class ID of the service class, the class used volume, the data acquired from the previous service class management register 27c and the number-of-class-remaining-services register 27d when the number of remaining services is 0 or the class used volume is 0. Likewise, the number-of-flow-services arithmetic operation circuit 64 updates the previous service flow management register 26c and the number-of-flow-remaining-services register 26d based on the flow ID of the service flow, the flow used volume, and the data acquired from the previous service flow management register 26c and the number-of-flow-remaining-services register 26d. Further, the priority arithmetic operation circuit 65 calculates a new class priority if flows disappear based on the class ID and the class used volume of the service class, and outputs the operation result to the class priority register 24e.

The most excessive class excessively used volume arithmetic operation circuit 66 refers to the class ID of the service class and the data acquired from the most excessive class excessively used volume register R13 and the most excessive class register 24d, and updates the excessively used volume and stores the updated excessively used volume in the most excessive class excessively used volume register R13 if the service class ID is equal to the stored and managed, most excessive class ID. Likewise, the most excessive flow excessively used volume arithmetic operation circuit 67 refers to the flow ID of the service flow and the data acquired from the most excessive flow excessively used volume register R14 and the most excessive flow register 24c, and updates the most excessive flow excessively used volume register R14. The scheduler 18 updates the class used volume management table memory 24g, the number-of-class-flows management table memory 24h, and the WRR class order management table memory 29c using the class ID of the service class, updates the flow used volume management table memory 23d, the head block management table memory 23e, the tail block management table memory 23f, the WRR flow order management table memory 28c, and the basic volume management table memory 23c using the flow ID of the service flow, and updates the most excessive flow excessively used volume management table memory 24i using the class ID and the flow ID.

As mentioned above, in the buffer memory management by the output port controller 20 of the preferred embodiment according to the present invention, the minimum buffer memory volume (i.e., the basic volume) which can be used by each flow is logically secured. In a state in which a buffer memory utilization rate is low, each flow is permitted to use the buffer memory irrespective of its basic volume. If this state changes to a state in which the utilization rate is high and the buffer memory 13 turns full, the flow that uses the buffer memory 13 beyond its basic volume is discarded as it is. However, when a flow having a used volume that does not exceed its basic volume arrives, the pushout mechanism is adopted to permit the arrived packet to use the buffer memory 13. When a pushout object packet search is finished, the arrived packet is overwritten on a packet at a position of the buffer memory 13 and the overwritten packet is discarded. If the pushout object packet search reveals that there is no flow that uses the buffer memory 13 beyond its basic volume, the arrived packet is discarded. Such a mechanism can prevent a buffer memory space from being excessively and dominantly used for specific connections and realize a method of securing a minimum rate of each flow. The significant feature of the present preferred embodiment is the basic volume decision method. In the method according to the present preferred embodiment, this basic volume is hierarchically stored and managed in the order of ports, classes, and flows. It is thus possible to secure the traffic QoS for each port more efficiently in an environment in which one buffer memory 13 is shared among a plurality of ports.

Further, the WRR is adopted as the packet service criterion of the present preferred embodiment. If the WRR is used, a weighting factor for each flow needs to be decided. In the weighting factor decision method, a bandwidth guaranteed for the bandwidth-guaranteed (BG) class among a total link capacity is preferentially allocated first to the BG class. The remaining bandwidth is allocated to the other classes according to the weighting factors decided in advance. The allocated bandwidth is converted to a simple integer ratio, which serves as each weighting factor. By using these procedures, it is possible to ensure securing the reserved bandwidth for the BG class and preferentially control the reserved bandwidth over the other classes. In the present preferred embodiment, by cooperatively utilizing the basic volume allocation, the discard control by the pushout mechanism, and the bandwidth allocation method, it is possible to provide a service suitable for each class and realize high-level QoS guarantee even if a high load is imposed on the buffer memory 13.

Moreover, the present preferred embodiment is characterized by providing means for solving the following two problems for designing a logic circuit to allow the router apparatus to operate at a high speed.

The first problem is related to the basic volume management. In the present preferred embodiment, the basic volume is managed per flow. The basic volume allocated to the BG flow is fixed according to the priority of the flow. The basic volume allocated to the best-effort (BE) flow is allocated as follows. The remaining buffer volume, which is obtained by subtracting total basic volumes allocated to BG flows from the total buffer volume, is allocated to BE flows according to priorities of the respective flows. Namely, the basic volume of the BE flow changes when a new flow occurs or when a flow is discarded. If basic volumes of the entire flows are recalculated whenever the number of flows changes, the processing speed disadvantageously and extremely decreases. In order to solve the problem, in the present preferred embodiment, the basic volume management is carried out so that the basic volume is managed per flow for the flows in the BG class and that only the volume obtained by subtracting the total basic volumes allocated to the BG class from the total buffer volume is stored and managed as the basic volume of the BE class for the flows in the BE class. To this end, it is necessary to calculate the basic volume whenever the excessively used volume is calculated. However, since it is unnecessary to change the basic volumes of the entire flows, the management mechanism can be accelerated.

The second problem is related to the most excessive use flow management. The pushout object flow is the flow that most excessively uses the buffer memory 13 beyond its basic volume. In order to decide the pushout object flow at a high speed when a packet arrives, it is necessary to store and manage the most excessive use class and the most excessive use flow of each class. However, in the management method by checking excessively used volumes of the entire flows and deciding the most excessive flow, processing time disadvantageously lengthens even if the controller operates periodically. Therefore, in the present preferred embodiment, the most excessive use flow management is proposed as follows. First of all, when the packet arrives, the excessively used volume of the arrived flow is compared with the stored and managed, excessively used volume of the most excessive use flow. If the excessively used volume of the arrived flow is larger, the most excessive flow ID and the excessively used volume of the flow are changed. Conversely, if the excessively used volume of the managed flow is larger, the management data is not changed. When a packet is transmitted, if the flow ID of the transmitted packet coincides with the stored and managed, most excessive use flow ID, the excessively used volume of the managed most excessive use flow is updated. Conversely, if the flow IDs do not coincide with each other, the management data is not changed. By adopting this method, it is unnecessary to check the excessively used volumes of the entire flows, and the acceleration of the management mechanism can be attained.

As mentioned above, according to the basic volume management method of the present preferred embodiment, when the basic volume that is a criterion of a memory size which can be stored in the buffer memory 13 is allocated to each flow to which the packet to be transmitted belongs, the basic volume of each flow of the packet belonging to the bandwidth-guaranteed class is managed by individually allocating the basic volume by as much as the memory size required by each flow, and the basic volume of each flow of the packet belonging to the best-effort class is managed by collectively allocating the memory size obtained by subtracting the sum of the basic volumes allocated to the bandwidth-guaranteed class from the entire memory size of the buffer memory 13. In this case, it is preferable to calculate the product of a priority and the number of flows belonging to a class for each best-effort class, calculate a total priority of the best-effort classes by calculating the sum of the products for the number of best-effort classes, calculate a basic volume allocation ratio for the received packet by dividing the priority of the class to which the flow of the received packet belongs by the calculated total priority, and then calculate the basic volume of the flow of the received packet by calculating the product of the calculated basic volume allocation ratio and the basic volume of the best-effort class. Accordingly, while it is necessary to calculate the basic volume whenever the excessively used volume is calculated, it is unnecessary to change the basic volumes of the entire flows, and therefore, the processing speed of the output port controller 20 can be accelerated as compared with that of the prior art.

According to the excessively used volume management method of the present preferred embodiment, the basic volume that is a criterion of a memory size which can be stored in the buffer memory 13 is allocated to each flow to which the packet to be transmitted belongs, an excessively used volume of the packet to be transmitted relative to the basic volume of the flow is calculated based on an actual used volume of the flow by which the flow uses the buffer memory 13, and flow information on only the flow that most excessively uses the buffer memory 13 relative to the basic volume and the excessively used volume of the flow are managed, and when a packet belonging to a predetermined flow is received and a flow having the excessively used volume larger than the managed excessively used volume occurs, the flow information and the excessively used volume are respectively updated to flow information on the predetermined flow to which the newly received packet belongs and the excessively used volume of the flow. It is preferable herein that when the packet belonging to the flow that most excessively uses the buffer memory 13 relative to the allocated basic volume is transmitted from the router apparatus, only the managed excessively used volume is updated to the excessively used volume after transmission of the flow. Accordingly, it is unnecessary to check the excessively used volumes of the entire flows, and therefore, the processing speed of the output port controller 20 can be accelerated as compared with that of the prior art.

According to the service order management method of the present preferred embodiment, the management table 28c that stores flow information on a flow to be transmitted next to the flow for each flow is further provided in order to manage a flow transmission order when a plurality of flows are stored in the buffer memory 13, and the management table 28c is updated so as to designate a turn of a new flow to be transmitted next to the flow before the currently transmitted flow when the new flow to be transmitted is stored in the buffer memory 13. Since the management table 28c is provided, it is unnecessary to search the flow to be transmitted next, and therefore, the processing speed of the output port controller 20 can be accelerated as compared with that of the prior art.

Further, according to the method of dividing the buffer memory 20 to blocks and for connecting and managing the blocks of the buffer memory 20 of the present preferred embodiment, the buffer memory 20 is divided to a plurality of blocks each having a predetermined block length, and the management table 22c that stores information on one of the blocks which stores the packet and information on the other one of the blocks to be connected next to the block that stores the packet while making the information correspond to each other is provided is provided, and the packet connection state of each flow is managed. Since the buffer memory 20 can be efficiently used and the management table 22c is provided, it is possible to facilitate searching the block to be connected next, and therefore, the processing speed of the output port controller 20 can be accelerated as compared with that of the prior art.

Furthermore, the router apparatus of the present preferred embodiment includes the output port circuit 3 having the output port controller 20 shown in FIG. 1. Therefore, it is possible to provide a service suitable for each class, solve the problem of the occupation of the buffer memory 20 by specific flows, and accelerate packet input and output processings for the buffer memory 20 of the output port circuit 3.

ADVANTAGEOUS EFFECTS OF PREFERRED EMBODIMENTS

As mentioned above in detail, according to one aspect of the preferred embodiments of the present invention, there is provided an output port circuit of a router apparatus that routes and transmits a packet received through an input port circuit to each of adjacent nodes through the output port circuit by a switch fabric circuit. Each of flows is constituted by a plurality of continuous packets and belongs to either one of a bandwidth-guaranteed class and a best-effort class. The output port circuit includes a storage unit for temporarily storing a packet to be transmitted, and a controller for controlling storage and reading out of the packet into and from the storage unit. Upon allocating a basic volume that is a criterion of a memory size which can be stored in the storage unit to each of the flows to which the packet to be transmitted belongs, the controller manages the basic volume of each flow of the packet belonging to the bandwidth-guaranteed class by individually allocating the basic volume by as much as the memory size required by each of the flows, and manages the basic volume of each of the flows of the packets belonging to the best-effort class by collectively allocating the memory size obtained by subtracting a sum of each the basic volume allocated to the bandwidth-guaranteed class from an entire memory size of the storage unit. In the above-mentioned output port circuit, the controller preferably calculates a product of a priority and a number of flows belonging to a class for the each best-effort class, calculates a total priority of the best-effort class by calculating a sum of each the product for the number of best-effort classes, calculates a basic volume allocation ratio for the received packet by dividing the priority of the class to which the flow of the received packet belongs by the calculated total priority, and calculates the basic volume of the flow of the received packet by calculating the product of the calculated basic volume allocation ratio and the basic volume of the best-effort class. Accordingly, it is necessary to calculate the basic volume upon calculating the excessively used volume, and it is unnecessary to change the basic volumes of the entire flows. Therefore, the processing speed of the controller can be accelerated as compared with that of the prior art.

Further, according to another aspect of the preferred embodiments of the present invention, there is provided an output port circuit of a router apparatus that routes and transmits a packet received through an input port circuit to each of adjacent nodes through the output port circuit by a switch fabric circuit. Each of flows is constituted by a plurality of continuous packets and belongs to either one of a bandwidth-guaranteed class and a best-effort class. The output port circuit includes a storage unit for temporarily storing a packet to be transmitted, and a controller for controlling storage and reading out of the packet into and from the storage unit. The controller preferably allocates a basic volume that is a criterion of a memory size which can be stored in the storage unit to each of the flows to which the packet to be transmitted belongs, calculates an excessively used volume of the packet to be transmitted relative to the basic volume of the flow based on an actual used volume of each of the flows by which the flow uses the storage unit, and manages (a) flow information on only the flow that most excessively uses the storage unit relative to the basic volume and (b) the excessively used volume thereof. Further, upon receiving a packet belonging to a flow having an excessively used volume larger than the managed excessively used volume, the controller updates (a) the flow information and (b) the excessively used volume to (a) flow information on the flow to which the received packet belongs and (b) the excessively used volume of the flow thereof. In the above-mentioned output port circuit, upon transmission of a packet belonging to a flow that most excessively uses the storage unit relative to the allocated basic volume from the router apparatus, the controller preferably updates only the managed excessively used volume to the excessively used volume after transmission of the flow. Accordingly, it is unnecessary to check the excessively used volumes of the entire flows. Therefore, the processing speed of the controller can be accelerated as compared with that of the prior art.

Still further, according to a further aspect of the preferred embodiments of the present invention, there is provided an output port circuit of a router apparatus that routes and transmits a packet received through an input port circuit to each of adjacent nodes through the output port circuit by a switch fabric circuit. Each of flows is constituted by a plurality of continuous packets and belonging to either one of a bandwidth-guaranteed class and a best-effort class. The output port circuit includes a storage unit for temporarily storing a packet to be transmitted, and a controller for controlling storage and reading out of the packet into and from the storage unit. The controller preferably further includes a first management table memory that stores flow information on a flow to be transmitted next to the flow for each of the flows to manage a flow transmission order upon storing a plurality of flows in the storage unit, and the controller preferably updates the first management table memory so as to designate an order of a new flow to be transmitted next to the flow before the currently transmitted flow upon storing the new flow to be transmitted in the storage unit. Since the first management table is provided, it is unnecessary to search the flow to be transmitted next and the processing speed of the controller can be accelerated as compared with that of the prior art.

According to a still further aspect of the present invention, there is provided an output port circuit of a router apparatus that routs and transmits a packet received through an input port circuit to each of adjacent nodes through the output port circuit by a switch fabric circuit. Each of flows is constituted by a plurality of continuous packets and belongs to either one of a bandwidth-guaranteed class and a best-effort class. The output port circuit includes a storage unit for temporarily storing a packet to be transmitted, and a controller for controlling storage and reading out of the packet into and from the storage unit. The storage unit is preferably divided to a plurality of blocks each having a predetermined block length, and the controller further includes a second management table memory that stores information on one of the blocks which stores the packet and information on the other one of the blocks to be connected next to the block that stores the packet while making these information correspond to each other, thereby managing a packet connection state of each of the flows. Since the storage unit can be efficiently used and the second management table is provided, it is possible to facilitate searching the block to be connected next, and therefore, the processing speed of the controller can be accelerated as compared with that of the prior art.

According to a still more further aspect of the present invention, there is provided a router apparatus that routes and transmits a packet received through an input port circuit to each of adjacent nodes through the output port circuit by a switch fabric circuit. The router apparatus preferably the above-mentioned output port circuit. Accordingly, it is possible to provide a service suitable for each class, solve the problem of the occupation of the buffer memory by specific flows, and accelerate packet input and output processings for the storage unit of the output port circuit.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said output port circuit comprising:
 a storage unit for temporarily storing a packet to be transmitted; and
 a controller for controlling storage and reading out of the packet into and from said storage unit,
 wherein upon allocating a basic volume that is a criterion of a memory size which can be stored in said storage unit to each of the flows to which the packet to be transmitted belongs, said controller is configured to manage the basic volume of each flow of the packet belonging to the bandwidth-guaranteed class by individually allocating the basic volume by as much as the memory size required by each of the flows, and to manage the basic volume of each of the flows of the packets belonging to the best-effort class by collectively allocating the memory size obtained by subtracting a sum of each the basic volume allocated to said bandwidth-guaranteed class from an entire memory size of said storage unit,
 wherein said controller is configured to calculate a product of a priority and a number of flows belonging to a class for the each best-effort class, calculates a total priority of the best-effort class by calculating a sum of the products for the number of best-effort classes, calculate a basic volume allocation ratio for the received packet by dividing the priority of the class to which the flow of the received packet belongs by said calculated total priority, and calculate the basic volume of the flow of the received packet by calculating the product of said calculated basic volume allocation ratio and the basic volume of the best-effort class.

2. An output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said output port circuit comprising:
 a storage unit for temporarily storing a packet to be transmitted; and
 a controller for controlling storage and reading out of the packet into and from said storage unit,
 wherein said controller is configured to allocate a basic volume that is a criterion of a memory size which can be stored in said storage unit to each of the flows to which the packet to be transmitted belongs, calculate an excessively used volume of the packet to be transmitted relative to the basic volume of the flow based on an actual used volume of each of the flows by which the flow uses the storage unit, and manage (a) flow information on only the flow that most excessively uses said storage unit relative to said basic volume and (b) the excessively used volume thereof, and
 wherein upon receiving a packet belonging to a flow having an excessively used volume larger than the managed excessively used volume, said controller is configured to update (a) the flow information and (b) the excessively used volume to (a) flow information on the flow to which the received packet belongs and (b) the excessively used volume of the flow thereof.

3. The output port circuit as claimed in claim 2,
 wherein upon transmission of a packet belonging to a flow that most excessively uses the storage unit relative to the allocated basic volume from the router apparatus, said controller is configured to update only the managed excessively used volume to the excessively used volume after transmission of the flow.

4. The output port circuit as claimed in claim 1,
 wherein said controller is configured to calculate an excessively used volume relative to the basic volume of the flow of the packet to be transmitted based on an actual used volume of the flow by which the flow uses the storage unit, and manage (a) flow information on only the flow that most excessively uses said storage unit relative to said basic volume and (b) the excessively used volume thereof, and
 wherein upon receiving a packet belonging to a flow and having an excessively used volume larger than the managed excessively used volume occurs, said controller is configured to update (a) the flow information and (b) the excessively used volume to (a) flow information on the flow to which the newly received packet belongs and (b) the excessively used volume thereof.

5. The output port circuit as claimed in claim 4,
 wherein upon transmission of a packet belonging to a flow that most excessively uses the storage unit relative to the allocated basic volume from the router apparatus, said controller is configured to update only said managed excessively used volume to the excessively used volume after transmission of the flow.

6. An output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said output port circuit comprising:

a storage unit for temporarily storing a packet to be transmitted; and a controller for controlling storage and reading out of the packet into and from said storage unit, wherein said controller further comprises a first management table memory configured to store flow information on a flow to be transmitted next to the flow for each of the flows to manage a flow transmission order upon storing a plurality of flows in said storage unit, and said controller is configured to update said first management table memory so as to designate an order of a new flow to be transmitted next to the flow before said currently transmitted flow upon storing the new flow to be transmitted in said storage unit, wherein said controller is configured to calculate a product of a priority and a number of flows belonging to a class for the each best-effort class, calculate a total priority of the best-effort class by calculating a sum of the products for the number of best-effort classes, calculate a basic volume allocation ratio for the received packet by dividing the priority of the class to which the flow of the received packet belongs by said calculated total priority, and calculate the basic volume of the flow of the received packet by calculating the product of said calculated basic volume allocation ratio and the basic volume of the best-effort class.

7. The output port circuit as claimed in claim 1, wherein said controller further comprises a first management table memory that configured to store flow information on a flow to be transmitted next to the flow for each of the flows to manage a flow transmission order upon storing a plurality of flows in said storage unit, and said controller is configured to update said first management table memory so as to designate an order of a new flow to be transmitted next to the flow before said currently transmitted flow upon storing the new flow to be transmitted in said storage unit.

8. An output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said output port circuit comprising:

a storage unit for temporarily storing a packet to be transmitted; and a controller for controlling storage and reading out of the packet into and from said storage units, wherein said storage unit is divided to a plurality of blocks each having a predetermined block length, and said controller further comprises a first management table memory configured to store information on one of the blocks which stores the packet and information on the other one of the blocks to be connected next to the block that stores the packet while making these information correspond to each other, thereby managing a packet connection state of each of the flows, wherein said controller is configured to calculate a product of a priority and a number of flows belonging to a class for the each best-effort class, calculate a total priority of the best-effort class by calculating a sum of the products for the number of best-effort classes, calculate a basic volume allocation ratio for the received packet by dividing the priority of the class to which the flow of the received packet belongs by said calculated total priority, and calculate the basic volume of the flow of the received packet by calculating the product of said calculated basic volume allocation ratio and the basic volume of the best-effort class.

9. The output port circuit as claimed in claim 1, wherein said storage unit is divided to a plurality of blocks each having a predetermined block length, and said controller further comprises a second management table memory that stores information on one of the blocks which stores the packet and information on the other one of the blocks to be connected next to the block that stores the packet while making these information correspond to each other, thereby managing a packet connection state of each of the flows.

10. A router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said router apparatus comprising said output port circuit, said output port circuit comprising:

a storage unit for temporarily storing a packet to be transmitted; and a controller for controlling storage and reading out of the packet into and from said storage unit, wherein upon allocating a basic volume that is a criterion of a memory size which can be stored in said storage unit to each of the flows to which the packet to be transmitted belongs, said controller manages the basic volume of each flow of the packet belonging to the bandwidth-guaranteed class by individually allocating the basic volume by as much as the memory size required by each of the flows, and manages the basic volume of each of the flows of the packets belonging to the best-effort class by collectively allocating the memory size obtained by subtracting a sum of each the basic volume allocated to said bandwidth-guaranteed class from an entire memory size of said storage unit, wherein said controller is configured to calculate a product of a priority and a number of flows belonging to a class for the each best-effort class, calculate a total priority of the best-effort class by calculating a sum of the products for the number of best-effort classes, calculate a basic volume allocation ratio for the received packet by dividing the priority of the class to which the flow of the received packet belongs by said calculated total priority, and calculate the basic volume of the flow of the received packet by calculating the product of said calculated basic volume allocation ratio and the basic volume of the best-effort class.

11. A router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said router apparatus comprising said output port circuit, said output port circuit comprising:

a storage unit for temporarily storing a packet to be transmitted; and a controller for controlling storage and reading out of the packet into and from said storage unit, wherein said controller allocates a basic volume that is a criterion of a memory size which can be stored in said storage unit to each of the flows to which the packet to be transmitted belongs, calculates an excessively used volume of the packet to be transmitted relative to the basic volume of the flow based on an actual used volume of each of the flows by which the flow uses the storage unit, and manages (a) flow information on only the flow that most excessively uses said storage unit relative to said basic volume and (b) the excessively used volume thereof, and wherein upon receiving a packet belonging to a flow having an excessively used volume larger than the managed excessively used volume, said controller updates (a) the flow information and (b) the excessively used volume to (a) flow information on the flow to which the received packet belongs and (b) the excessively used volume of the flow thereof.

12. A router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said router apparatus comprising said output port circuit, said output port circuit comprising:

a storage unit for temporarily storing a packet to be transmitted; and a controller for controlling storage and reading out of the packet into and from said storage unit, wherein said controller further comprises a first management table memory configured to flow information on a flow to be transmitted next to the flow for each of the flows to manage a flow transmission order upon storing a plurality of flows in said storage unit, and said controller is configured to update said first management table memory so as to designate an order of a new flow to be transmitted next to the flow before said currently transmitted flow upon storing the new flow to be transmitted in said storage unit, wherein said controller is configured to calculate a product of a priority and a number of flows belonging to a class for the each best-effort class, calculate a total priority of the best-effort class by calculating a sum of the products for the number of best-effort classes, calculate a basic volume allocation ratio for the received packet by dividing the priority of the class to which the flow of the received packet belongs by said calculated total priority, and calculate the basic volume of the flow of the received packet by calculating the product of said calculated basic volume allocation ratio and the basic volume of the best-effort class.

13. A router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said router apparatus comprising said output port circuit, said output port circuit comprising:

a storage unit for temporarily storing a packet to be transmitted; and a controller for controlling storage and reading out of the packet into and from said storage unit, wherein said storage unit is divided to a plurality of blocks each having a predetermined block length, and said controller further comprises a second management table memory configured to store information on one of the blocks which stores the packet and information on the other one of the blocks to be connected next to the block that stores the packet while making these information correspond to each other, thereby managing a packet connection state of each of the flows, wherein said controller is configured to calculate a product of a priority and a number of flows belonging to a class for the each best-effort class, calculate a total priority of the best-effort class by calculating a sum of the products for the number of best-effort classes, calculate a basic volume allocation ratio for the received packet by dividing the priority of the class to which the flow of the received packet belongs by said calculated total priority, and calculate the basic volume of the flow of the received packet by calculating the product of said calculated basic volume allocation ratio and the basic volume of the best-effort class.

14. A method of controlling an output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said method including the following steps of:

temporarily storing in a storage unit a packet to be transmitted; and controlling storage and reading out of the packet into and from said storage unit, wherein upon allocating a basic volume that is a criterion of a memory size which can be stored in said storage unit to each of the flows to which the packet to be transmitted belongs, said controlling step includes:

managing the basic volume of each flow of the packet belonging to the bandwidth-guaranteed class by individually allocating the basic volume by as much as the memory size required by each of the flows, managing the basic volume of each of the flows of the packets belonging to the best-effort class by collectively allocating the memory size obtained by subtracting a sum of each the basic volume allocated to said bandwidth-guaranteed class from an entire memory size of said storage unit, calculating a product of a priority and a number of flows belonging to a class for the each best-effort class, calculating a total priority of the best-effort class by calculating a sum of the products for the number of best-effort classes, calculating a basic volume allocation ratio for the received packet by dividing the priority of the class to which the flow of the received packet belongs by said calculated total priority, and calculating the basic volume of the flow of the received packet by calculating the product of said calculated basic volume allocation ratio and the basic volume of the best-effort class.

15. A method of controlling an output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said method including the following steps of:

temporarily storing in a storage unit a packet to be transmitted; and controlling storage and reading out of the packet into and from said storage unit, wherein said controlling step includes steps of allocating a basic volume that is a criterion of a memory size which can be stored in said storage unit to each of the flows to which the packet to be transmitted belongs, calculating an excessively used volume of the packet to be transmitted relative to the basic volume of the flow based on an actual used volume of each of the flows by which the flow uses the storage unit, and managing (a) flow information on only the flow that most excessively uses said storage unit relative to said basic volume and (b) the excessively used volume thereof, and wherein upon receiving a packet belonging to a flow having an excessively used volume larger than the managed excessively used volume, said controlling step further includes a step of updating (a) the flow information and (b) the excessively used volume to (a) flow information on the flow to which the received packet belongs and (b) the excessively used volume of the flow thereof.

16. The method as claimed in claim 15, wherein upon transmission of a packet belonging to a flow that most excessively uses the storage unit relative to the allocated basic volume from the router apparatus, said controlling step further includes a step of updating only the managed excessively used volume to the excessively used volume after transmission of the flow.

17. The method as claimed in claim 14, wherein said controlling step further includes steps of calculating an excessively used volume relative to the basic volume of the flow of the packet to be transmitted based on an actual used volume of the flow by which the flow uses the storage unit, and managing (a) flow information on only the flow that most excessively uses said storage unit relative to said basic volume and (b) the excessively used volume thereof, and wherein upon receiving a packet belonging to a flow and having an excessively used volume larger than the managed excessively used volume occurs, said controlling step further includes a step of updating (a) the flow information and (b) the excessively used volume to (a) flow information on the flow to which the newly received packet belongs and (b) the excessively used volume thereof.

18. The method as claimed in claim 17, wherein upon transmission of a packet belonging to a flow that most excessively uses the storage unit relative to the allocated basic volume from the router apparatus, said controlling step further includes a step of updating only said managed excessively used volume to the excessively used volume after transmission of the flow.

19. A method of controlling an output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said method including the following steps of:

temporarily storing in a storage unit a packet to be transmitted; and controlling storage and reading out of the packet into and from said storage unit, wherein said output port circuit further comprises a first management table memory that stores flow information on a flow to be transmitted next to the flow for each of the flows to manage a flow transmission order upon storing a plurality of flows in said storage unit, and wherein said controlling step further includes:

updating said first management table memory so as to designate an order of a new flow to be transmitted next to the flow before said currently transmitted flow upon storing the new flow to be transmitted in said storage unit, calculating a product of a priority and a number of flows belonging to a class for the each best-effort class, calculating a total priority of the best-effort class by calculating a sum of the products for the number of best-effort classes, calculating a basic volume allocation ratio for the received packet by dividing the priority of the class to which the flow of the received packet belongs by said calculated total priority, and calculating the basic volume of the flow of the received packet by calculating the product of said calculated basic volume allocation ratio and the basic volume of the best-effort class.

20. The output port circuit as claimed in claim 14, wherein said output port circuit further comprises a first management table memory that stores flow information on a flow to be transmitted next to the flow for each of the flows to manage a flow transmission order upon storing a plurality of flows in said storage unit, and wherein said controlling step further includes a step of updating said first management table memory so as to designate an order of a new flow to be transmitted next to the flow before said currently transmitted flow upon storing the new flow to be transmitted in said storage unit.

21. A method of controlling an output port circuit of a router apparatus for routing and transmitting a packet received through an input port circuit to each of adjacent nodes through the output port circuit by a switch fabric circuit, each of flows being constituted by a plurality of continuous packets and belonging to either one of a bandwidth-guaranteed class and a best-effort class, said method including the following steps of:

temporarily storing in a storage unit a packet to be transmitted; and controlling storage and reading out of the packet into and from said storage means, wherein said storage unit is divided to a plurality of blocks each having a predetermined block length, wherein said output port circuit further comprises a second management table memory that stores information on one of the blocks which stores the packet and information on the other one of the blocks to be connected next to the block that stores the packet while making these information correspond to each other, said controlling step further including:

managing a packet connection state of each of the flows, calculating a product of a priority and a number of flows belonging to a class for the each best-effort class, calculating a total priority of the best-effort class by calculating a sum of the products for the number of best-effort classes, calculating a basic volume allocation ratio for the received packet by dividing the priority of the class to which the flow of the received packet belongs by said calculated total priority, and calculating the basic volume of the flow of the received packet by calculating the product of said calculated basic volume allocation ratio and the basic volume of the best-effort class.

* * * * *